United States Patent
Lewis et al.

(10) Patent No.: US 10,760,739 B2
(45) Date of Patent: *Sep. 1, 2020

(54) HYDROSTATICALLY COMPENSATED COMPRESSED GAS ENERGY STORAGE SYSTEM

(71) Applicant: Hydrostor Inc., Toronto (CA)

(72) Inventors: Cameron Lewis, Toronto (CA); Andrew McGillis, Toronto (CA); Davin Young, Toronto (CA); Curtis Vanwalleghem, Toronto (CA)

(73) Assignee: Hydrostor Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/528,353

(22) Filed: Jul. 31, 2019

(65) Prior Publication Data

US 2019/0353302 A1    Nov. 21, 2019

Related U.S. Application Data

(63) Continuation of application No. PCT/CA2018/050112, filed on Jan. 31, 2018.
(Continued)

(51) Int. Cl.
*F17C 1/00* (2006.01)
*F17C 13/06* (2006.01)
*B65G 5/00* (2006.01)

(52) U.S. Cl.
CPC ................ *F17C 1/007* (2013.01); *B65G 5/00* (2013.01); *F17C 13/06* (2013.01);
(Continued)

(58) Field of Classification Search
CPC .................................................. Y02E 60/322
See application file for complete search history.

(56) References Cited

U.S. PATENT DOCUMENTS 3,643,426 A    2/1972    Janelid
3,988,897 A    11/1976   Strub
(Continued)

FOREIGN PATENT DOCUMENTS

CA    2785004 A1    6/2011
CA    2807502 A1    2/2012
(Continued)

OTHER PUBLICATIONS

Wang, J. et al., Overview of Compressed Air Energy Storage and Technology Development; Energies; 2017; 10, 991; 22 pages; http://wrap.warwick.ac.uk/91858/7/WRAP-overview-compressed-air-energy-storage-technology-development-Wang-2017.pdf.
(Continued)

*Primary Examiner* — Sean D Andrish
(74) *Attorney, Agent, or Firm* — Young Basile Hanlon & MacFarlane, P.C.

(57) ABSTRACT

A compressed gas energy storage system may include an accumulator for containing a layer of compressed gas atop a layer of liquid. A gas conduit may have an upper end in communication with a gas compressor/expander subsystem and a lower end in communication with accumulator interior for conveying compressed gas into the compressed gas layer of the accumulator when in use. A shaft may have an interior for containing a quantity of a liquid and may be fluidly connectable to a liquid source/sink via a liquid supply conduit. A partition may cover may separate the accumulator interior from the shaft interior. An internal accumulator force may act on the inner surface of the partition and the liquid within the shaft may exert an external counter force on the outer surface of the partition, whereby a net force acting on the partition is less than the accumulator force.

20 Claims, 29 Drawing Sheets

Related U.S. Application Data

(60) Provisional application No. 62/453,278, filed on Feb. 1, 2017, provisional application No. 62/453,300, filed on Feb. 1, 2017, provisional application No. 62/453,306, filed on Feb. 1, 2017, provisional application No. 62/453,315, filed on Feb. 1, 2017.

(52) U.S. Cl.
CPC .. *F17C 2201/052* (2013.01); *F17C 2203/066* (2013.01); *F17C 2203/0636* (2013.01); *F17C 2203/0678* (2013.01); *F17C 2221/014* (2013.01); *F17C 2221/016* (2013.01); *F17C 2221/031* (2013.01); *F17C 2223/0123* (2013.01); *F17C 2223/035* (2013.01); *F17C 2223/043* (2013.01); *F17C 2223/047* (2013.01); *F17C 2225/013* (2013.01); *F17C 2227/0157* (2013.01); *F17C 2227/0192* (2013.01); *F17C 2270/0142* (2013.01); *F17C 2270/0581* (2013.01)

(56) References Cited

U.S. PATENT DOCUMENTS

| | | | |
|---|---|---|---|
| 3,996,741 | A | 12/1976 | Herberg |
| 4,147,204 | A | 4/1979 | Pfenninger |
| 4,150,547 | A | 4/1979 | Hobson |
| 4,454,721 | A | 6/1984 | Hurlimann et al. |
| 4,523,432 | A | 6/1985 | Frutschi |
| 7,663,255 | B2 | 2/2010 | Kim et al. |
| 8,739,522 | B2 | 6/2014 | Anikhindi et al. |
| 9,803,803 | B1 | 10/2017 | Adams et al. |
| 2003/0021631 | A1* | 1/2003 | Hayashi ............ B65G 5/00 405/55 |
| 2011/0094242 | A1* | 4/2011 | Koerner ............ F02C 3/22 60/780 |
| 2011/0100010 | A1 | 5/2011 | Freund et al. |
| 2012/0102954 | A1 | 5/2012 | Ingersoll et al. |
| 2013/0061591 | A1* | 3/2013 | Bove ............ F02C 6/16 60/645 |
| 2015/0000248 | A1 | 1/2015 | del Omo |
| 2015/0015210 | A1 | 1/2015 | Bradwell et al. |
| 2015/0267612 | A1 | 9/2015 | Bannari |
| 2017/0138674 | A1 | 5/2017 | Pourima |
| 2017/0159503 | A1 | 6/2017 | Plais et al. |
| 2018/0017213 | A1 | 1/2018 | Deleau et al. |
| 2018/0094581 | A1 | 4/2018 | Teixeira |
| 2019/0346082 | A1* | 11/2019 | Lewis .................. F17C 1/00 |

FOREIGN PATENT DOCUMENTS

| | | |
|---|---|---|
| CA | 2824798 A1 | 7/2012 |
| CA | 2982255 A1 | 10/2016 |
| CA | 3052080 A1 | 8/2018 |
| CA | 3055620 A1 | 9/2018 |
| CN | 107842392 A | 3/2018 |
| CN | 207847852 U | 9/2018 |
| EP | 566868 A1 | 10/1993 |
| EP | 1443177 A1 | 8/2004 |
| EP | 2447501 A2 | 5/2012 |
| EP | 2450549 A2 | 5/2012 |
| EP | 2530283 A1 | 12/2012 |
| EP | 2559881 A2 | 2/2013 |
| FR | 3019854 A1 | 10/2015 |
| GB | 2013318 A | 8/1979 |
| JE | 2636417 A1 | 2/1978 |
| JP | H07330079 A | 12/1995 |
| JP | H09154244 A | 6/1997 |
| JP | 2016211515 | * 12/2016 |
| WO | 2011053411 A1 | 5/2011 |
| WO | 2013131202 A1 | 9/2013 |
| WO | 2015015184 A2 | 2/2015 |
| WO | 2015019096 A1 | 2/2015 |
| WO | 2016012764 A1 | 1/2016 |
| WO | 2017093768 A1 | 6/2017 |
| WO | 2017140481 A1 | 8/2017 |
| WO | 2017194253 A1 | 11/2017 |
| WO | 2017198397 A1 | 11/2017 |
| WO | 2018141057 A1 | 8/2018 |
| WO | 2019011593 A1 | 1/2019 |

OTHER PUBLICATIONS

RWE Power AG: Essen/Koln, "ADELE—Adiabatic Compressed-Air Energy Storage for Electricity Supply", Feb. 3, 2011; http://www.rwe.com/web/cms/mediablob/en/391748/data/235554/1/rwe-power-ag/press/company/Brochure-ADELE.pdf.

* cited by examiner

HYDROSTATICALLY COMPENSATED COMPRESSED GAS ENERGY STORAGE SYSTEM

CROSS-REFERENCE TO RELATED APPLICATIONS

This application is a continuation of International Patent Application Serial No. PCT/CA2018/050112, filed on Jan. 31, 2018, which claims priority to U.S. Provisional Patent Application Ser. No. 62/453,278 filed on Feb. 1, 2017 entitled "Integrated Air And Water Temperature Control For Underground CAES System"; U.S. Provisional Patent Application Ser. No. 62/453,300 filed on Feb. 1, 2017 entitled "Water Pressurized Isobaric Compressed Air Energy Accumulator With Low Pressure Bulkhead and Density Change Prevention Line"; U.S. Provisional Patent Application Ser. No. 62/453,306 filed on Feb. 1, 2017 entitled "Integrated Thermal Storage in Isobaric Compressed Air Energy Storage System" and U.S. Provisional Patent Application Ser. No. 62/453,315 filed on Feb. 1, 2017 entitled "Multi Point Energy Storage Method". The entirety of each of these applications is incorporated by reference herein.

FIELD OF THE DISCLOSURE

The present disclosure relates generally to compressed gas energy storage, and more particularly to a compressed gas energy storage system such as, for example, one including a hydrostatically compensated, substantially isobaric compressed air energy storage accumulator located underground, the use thereof, as well as a method of storing compressed gas.

BACKGROUND

Electricity storage is highly sought after, in view of the cost disparities incurred when consuming electrical energy from a power grid during peak usage periods, as compared to low usage periods. The addition of renewable energy sources, being inherently of a discontinuous or intermittent supply nature, increases the demand for affordable electrical energy storage worldwide.

Thus there exists a need for effectively storing the electrical energy produced at a power grid or a renewable source during a non-peak period and returning it to the grid upon demand. Furthermore, to the extent that the infrastructural preparation costs and the environmental impact from implementing such infrastructure are minimized, the utility and desirability of a given solution is enhanced.

Furthermore, as grids transform and operators look to storage in addition to renewables to provide power and remove traditional forms of generation that also provide grid stability, such as voltage support, a storage method that offers inertia based synchronous storage is highly desirable.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In accordance with an aspect, there is provided a compressed gas energy storage system comprising: an underground substantially horizontal accumulator; a shaft extending upwards from the accumulator through the ground; a bulkhead separating the interior of the accumulator from the interior of the shaft; when in operation a quantity of liquid within the shaft bearing against the outside of the bulkhead at a first pressure level; when in operation the accumulator containing a layer of compressed gas atop a layer of liquid, the compressed gas bearing against the inside of the bulkhead at a second pressure level; a gas conduit for conveying compressed gas between the compressed gas layer and a gas compressor/expander subsystem; and a liquid conduit for conveying liquid between the layer of liquid within the accumulator and the shaft, wherein a differential between the first and second pressure levels is maintained below a threshold level by conveying compressed gas between the compressor/expander subsystem and the compressed gas layer and by conveying liquid between the shaft and the water layer.

In an embodiment, the gas conduit conveys compressed gas between the compressed gas layer and the gas compressor/expander subsystem via a thermal storage subsystem.

In an embodiment, the compressed gas energy storage system further comprises a gas release subsystem. In an embodiment said gas release subsystem comprises as least one valve, preferably comprising at least one one-way valve associated with the bulkhead permitting selective release of compressed gas from the gas layer through the bulkhead into the shaft.

In accordance with one broad aspect of the teachings described herein, which may be used alone or in combination with any other aspects, a compressed gas energy storage system may include an accumulator having a primary opening, an upper wall, a lower wall and an accumulator interior at least partially bounded the upper wall and lower wall, the accumulator for containing a layer of compressed gas atop a layer of liquid when in use. A gas compressor/expander subsystem may be spaced apart from the accumulator and may include a gas conduit having an upper end in communication with the gas compressor/expander subsystem and a lower end in communication with the accumulator interior for conveying compressed gas into the compressed gas layer of the accumulator when in use. A shaft may have a lower end adjacent the primary opening, an upper end spaced apart from the lower end, and a shaft sidewall extending upwardly from the lower end to the upper end and may at least partially bound a shaft interior for containing a quantity of a liquid, the shaft being fluidly connectable to a liquid source/sink via a liquid supply conduit. A partition may cover the primary opening and may separate the accumulator interior from the shaft interior. The partition may have an outer surface in communication with the shaft interior and an opposing inner surface in communication with the accumulator interior. An auxiliary gas release subsystem may include an auxiliary gas release conduit having an inlet in communication with the accumulator interior and an outlet. The auxiliary gas release conduit may be spaced apart from gas conduit and may be configured to facilitate release of gas from the layer of gas within the accumulator. When in use, at least one of the layer of compressed gas and the layer of liquid can bear against and exert an internal accumulator force on the inner surface of the partition and the quantity of liquid within the shaft may bear against and exerts an external counter force on the outer surface of the partition, whereby a net force acting on the partition while the compressed gas energy storage system is in use is a difference between the accumulator force and the counter force and may be less than the accumulator force.

The auxiliary gas release conduit may extend through the partition.

The auxiliary gas release conduit may be in fluid communication with the shaft interior, such that gas exiting the auxiliary gas release conduit may be released into the quantity of liquid contained in the shaft.

A gas release valve may be positioned in the auxiliary gas release conduit and may be selectably openable to permit the release of gas.

The gas release valve may be a one-way valve that permits the release of gas from the layer of gas into the shaft and does not permit liquid from the shaft to flow through the auxiliary gas release valve and into the accumulator.

The gas release valve may be a pressure actuated valve that is biased toward a closed configuration and is automatically opened when a pressure in the layer of compressed gas reaches a pre-set pressure threshold limit.

The auxiliary gas release valve may be a remotely actuatable and may be controlled by an auxiliary release system controller.

A liquid conduit may provide fluid communication between the liquid in the shaft interior and the layer of liquid in the accumulator, whereby liquid can flow between the shaft interior and the layer of liquid in the accumulator in response to changes in the pressure of the layer of compressed gas.

The liquid conduit may include the auxiliary gas release conduit.

A guide conduit may have an inlet end positioned proximate the auxiliary gas release conduit outlet to receive the gas exiting via the auxiliary gas release conduit, an outlet end spaced apart from the inlet end and a conduit sidewall extending therebetween.

At least a portion of the guide conduit may be disposed within the shaft.

An interior of the guide conduit ay be in fluid communication with the shaft interior whereby the interior of the gas release conduit contains a first portion of the quantity of liquid within the shaft.

When gas is released from the gas release conduit, the gas that is released may travel upwardly through the guide conduit and displace at least some of the first portion liquid from within the guide conduit into the shaft interior.

When gas is released from the auxiliary gas release conduit the gas may be constrained within the guide conduit when travelling upwardly through the shaft and does not expand into portions of the shaft interior that are external the guide conduit.

The outlet end of the guide conduit may be disposed above a free surface of the quantity of liquid within the shaft.

The outlet end of the guide conduit may be in communication with the ambient atmosphere.

In accordance with one broad aspect of the teachings described herein, which may be used alone or in combination with any other aspects, a compressed gas energy storage system may include an accumulator having a primary opening, an upper wall, a lower wall and an accumulator interior at least partially bounded the upper wall and lower wall. The accumulator may contain a layer of compressed gas atop a layer of liquid when in use. A gas compressor/expander subsystem may be spaced apart from the accumulator and a gas supply conduit may have an upper end in communication with the gas compressor/expander subsystem and a lower end in communication with accumulator interior for conveying compressed gas into the compressed gas layer of the accumulator when in use. A shaft may have a lower end adjacent the primary opening, an upper end spaced apart from the lower end, and a shaft sidewall extending upwardly from the lower end to the upper end and at least partially bounding a shaft interior for containing a quantity of a liquid. The shaft may be fluidly connectable to a liquid source/sink via a liquid supply conduit. A partition may cover the primary opening and may separate the accumulator interior from the shaft interior. The partition may have an outer surface in communication with the shaft interior and an opposing inner surface in communication with the accumulator interior.

At least one of the layer of compressed gas and the layer of liquid may bear against and exert an internal accumulator force on the inner surface of the partition and the quantity of liquid within the shaft bears against and exerts an external counter force on the outer surface of the partition, whereby a net force acting on the partition while the compressed gas energy storage system is in use is a difference between the accumulator force and the counter force and is less than the accumulator force.

A liquid conduit may provide fluid communication between the liquid in the shaft interior and the layer of liquid in the accumulator, whereby liquid can flow between the shaft interior and the layer of liquid in the accumulator in response to changes in the pressure of the layer of compressed gas.

A first end of the liquid conduit may be proximate the outer surface of the partition and may be in fluid communication with the shaft.

The liquid conduit may pass through the partition.

A second end of the liquid conduit may be submerged in the layer of liquid and may remain fluidly isolated from the layer of gas when the compressed gas energy storage system is in use.

When a pressure of the layer of compressed gas is increased by conveying additional gas into the layer of compressed gas a magnitude of the internal accumulator force may be increased and liquid may be conveyed through the liquid conduit from the layer of liquid in the accumulator to the shaft interior. When the pressure of the layer of compressed gas is decreased be releasing gas from the layer of compressed gas the magnitude of the internal accumulator force may be decreased and may be conveyed through the liquid conduit from the shaft interior to the layer of liquid in the accumulator.

A pressure difference across the partition may be between about 0.3 atm and about 6 atm when the compressed gas energy storage system is in use.

Tithe compressor/expander subsystem may include: a) a gas compressor with at least a first compression stage configured to drawn in air from an air source, compress the air, and convey the compressed air into the compressed gas layer via the gas conduit; b) a gas expander with at least a first expansion stage; and c) a first electrical generator driven by the gas expander for receiving compressed air from the compressed gas layer of the accumulator and generating electricity from expansion of the compressed air.

The first expansion stage may be in fluid communication with the gas supply conduit.

A secondary gas conduit may be spaced apart from the gas supply conduit and may fluidly connect the first expansion stage and the layer of compressed gas within the accumulator.

The air source may include the ambient atmosphere.

Air exiting the first expansion stage may be released to the ambient atmosphere.

The gas supply conduit may pass through the shaft interior and may be at least partially submerged in the quantity of the liquid.

The gas supply conduit may be external the shaft.

The upper wall of the accumulator may be substantially planar, and may be oriented substantially horizontally.

The lower end of the gas supply conduit may be positioned at a high point of the upper wall of the accumulator.

The gas supply conduit may pass through the partition.

The liquid conduit may pass beneath the partition.

The gas supply conduit may be at least partially disposed within the liquid conduit.

The liquid conduit may include a flow channel that passes beneath the partition, and wherein the gas supply conduit is disposed within the flow channel and passes beneath the partition.

The accumulator may be at least partially buried under ground, and the upper end of the shaft may be above ground.

The liquid source may include a body of water.

The liquid supply conduit may be in fluid communication with the shaft interior toward the upper end of the shaft.

A flow control valve may be disposed in the liquid supply conduit. The flow control valve may be movable to a closed position in which fluid communication between the shaft and the liquid source is interrupted.

The upper end of the shaft may be open to the ambient atmosphere.

The partition further may include an openable and re-sealable access manway that is openable to provide access accumulator interior.

The partition may include a bulkhead positioned to seal the primary opening.

The partition ay be formed at least partially from at least one of concrete, stone, metal, composite material, and plastic.

The accumulator may be at least partially buried under ground and the may be at least partially comprised of the ground.

In accordance with one broad aspect of the teachings described herein, which may be used alone or in combination with any other aspects a compressed gas energy storage system may include an accumulator having a primary opening, an upper wall, a lower wall and an accumulator interior at least partially bounded the upper wall and lower wall. The accumulator may be configured for containing a layer of compressed gas atop a layer of liquid when in use. A gas compressor/expander subsystem may be spaced apart from the accumulator and a gas conduit may have an upper end in communication with the gas compressor/expander subsystem and a lower end in communication with accumulator interior for conveying compressed gas between the compressed gas layer in the accumulator and the compressor/expander subsystem. A shaft may have a lower end adjacent the primary opening, an upper end spaced apart from the lower end, and a shaft sidewall extending upwardly from the lower end to the upper end and at least partially bounding a shaft interior for containing a quantity of a liquid. The shaft may be fluidly connectable to a liquid source/sink via a liquid supply conduit. At least a first compression heat exchanger may be configured to exchange heat between gas being conveyed into the gas compressor/expander subsystem and the quantity of liquid contained within the shaft. A partition may cover the primary opening and may separate the accumulator interior from the shaft interior. The partition may have an outer surface in communication with the shaft interior and an opposing inner surface in communication with the accumulator interior. At least one of the layer of compressed gas and the layer of liquid may bear against and may exert an internal accumulator force on the inner surface of the partition and the quantity of liquid within the shaft bears against and exerts an external counter force on the outer surface of the partition, whereby a net force acting on the partition while the compressed gas energy storage system is in use is a difference between the accumulator force and the counter force and may be less than the accumulator force.

The gas compressor/expander subsystem may include at least a first compression stage and a second compression stage. The first compression heat exchanger may be fluidly connected between the gas source and the first compressions stage, and may be configured to exchange heat between gas being conveyed into the first compressor stage and the quantity of liquid contained within the shaft. A second compression heat exchanger may be fluidly connected between first compression stage and may be configured to exchange heat between gas being conveyed into the second compressor stage and the quantity of liquid contained within the shaft.

The first compression heat exchanger may be disposed at least partially within the shaft.

The gas compressor/expander subsystem may include a first expansion stage and a second expansion stage, and wherein a first expansion heat exchanger is fluidly connected between the accumulator and the first expansion stage, and is configured to exchange heat between gas being conveyed into the first expansion stage and the quantity of liquid contained within the shaft. A second expansion heat exchanger may be fluidly connected between first expansion stage and the second expansion stage and may be disposed at least partially within the shaft interior. The second expansion heat exchanger may be configured to exchange heat between gas being conveyed into the second expansion stage and the quantity of liquid contained within the shaft.

The first compression heat exchanger may function as the second expansion heat exchanger.

first compression heat exchanger is spaced apart from the second expansion heat exchanger.

The first heat exchanger may include a radiator having at least one air path immersed in the quantity of liquid contained in the shaft, an air input conduit extending from outside the quantity of liquid to an inlet end of the radiator and an air outlet conduit fluidly connecting an outlet end of the radiator and the gas compressor/expander subsystem.

The gas compressor/expander subsystem may include pairs of associated expansion and compression stages, wherein each pair of expansion and compression stages is provided with a respective heat exchanger that is configured to, during a compression cycle, exchange heat between the quantity of liquid contained in the shaft and gas to be compressed by the compression stage, and during an expansion cycle to exchange heat between the quantity of liquid contained in the shaft and gas that has been expanded by the expansion stage.

The gas source may be the ambient atmosphere.

The first compression heat exchanger may removably mounted within the shaft.

A liquid conduit may provide fluid communication between the liquid in the shaft interior and the layer of liquid in the accumulator, whereby liquid can flow between the shaft interior and the layer of liquid in the accumulator in response to changes in the pressure of the layer of compressed gas.

An upper end of the liquid conduit may be proximate the outer surface of the partition.

The liquid conduit may pass through the partition.

A lower end of the liquid conduit may be submerged in the layer of liquid within the accumulator and may remain fluidly isolated from the layer of gas within the accumulator when the compressed gas energy storage system is in use.

When a pressure of the layer of compressed gas is increased by conveying additional gas into the layer of compressed gas a magnitude of the gas force may be increased and liquid may be conveyed through the liquid conduit from the layer of liquid in the accumulator to the shaft interior. When the pressure of the layer of compressed gas is decreased by releasing gas from the layer of compressed gas the magnitude of the gas force is decreased and liquid is conveyed through the liquid conduit from the shaft interior to the layer of liquid in the accumulator.

The gas supply conduit passes through the shaft interior and is at least partially submerged in the quantity of the liquid.

The gas supply conduit ay be external the shaft.

The gas supply conduit may pass through the partition.

The first compression heat exchanger may include at least one direct contact heat exchanger.

Water entering the first compression heat exchanger may be drawn from the shaft and water exiting the first compression heat exchanger may be returned to the shaft.

In accordance with one broad aspect of the teachings described herein, which may be used alone or in combination with any other aspects, a compressed gas energy storage system may include an accumulator having a primary opening, an upper wall, a lower wall and an accumulator interior at least partially bounded the upper wall and lower wall. The accumulator may be configured for containing a layer of compressed gas atop a layer of liquid when in use. A gas compressor/expander subsystem may be spaced apart from the accumulator and a gas conduit may have an upper end in communication with the gas compressor/expander subsystem and a lower end in communication with accumulator interior for conveying compressed gas between the compressed gas layer in the accumulator and the compressor/expander subsystem. A shaft may have a lower end adjacent the primary opening, an upper end spaced apart from the lower end, and a shaft sidewall extending upwardly from the lower end to the upper end and at least partially bounding a shaft interior for containing a quantity of a liquid. The shaft may be fluidly connectable to a liquid source/sink via a liquid supply conduit. A thermal storage subsystem may be provided in fluid communication between the gas compressor/expander subsystem and the accumulator, whereby thermal energy may be extracted from the compressed gas exiting the gas compressor/expander subsystem at an exit temperature and stored in the thermal storage subsystem and the temperature of the gas exiting the thermal storage subsystem may be reduced to a storage temperature that is less than the exit temperature. A partition may be positioned at the lower end of the shaft and covering the primary opening and separating the accumulator interior from the shaft interior, the partition having an outer surface in communication with the shaft interior and an opposing inner surface in communication with the accumulator interior. At least one of the layer of compressed gas and the layer of liquid may bear against and may exert an internal accumulator force on the inner surface of the partition and the quantity of liquid within the shaft bears against and exerts an external counter force on the outer surface of the partition, whereby a net force acting on the partition while the compressed gas energy storage system is in use is a difference between the accumulator force and the counter force and may be less than the accumulator force.

The thermal storage subsystem may include a multiple-stage thermal storage apparatus.

At least a portion of the thermal storage subsystem may be located underground.

An upper portion of the gas conduit may extend between the compressor/expander subsystem and the thermal storage subsystem, and a lower portion of the gas conduit may extend between thermal storage subsystem and accumulator and may extend at least partially within the shaft interior.

The upper portion of the gas conduit may be external the shaft.

The thermal storage subsystem may include at least one of a sensible thermal storage stage and a latent thermal storage stage.

The thermal storage subsystem may include one or more phase change materials.

The thermal storage subsystem may include a first latent thermal storage stage utilizing a first phase change material, and a second thermal storage stage utilizing a different, second phase change material.

During an expansion process gas exiting the accumulator may pass through the thermal storage subsystem before reaching the gas compressor/expander subsystem, whereby at least a portion of the thermal energy that was extracted from the compressed gas entering the accumulator may be re-introduced into the gas exiting the accumulator to raise the temperature of the gas from the storage temperature to a higher, exit temperature prior to expansion.

A capacity of the thermal storage subsystem may be selected based on either the compression phase duration or the expansion phase duration of the compressed gas energy storage system.

At least a portion of the thermal storage subsystem may be disposed within the shaft and it may be a least partially submerged in the quantity of liquid contained in the shaft.

The thermal storage subsystem may be submerged in the quantity of liquid contained in the shaft.

At least a portion of the thermal storage subsystem may be disposed within the accumulator.

The entire thermal storage subsystem may be disposed within the accumulator.

The thermal storage subsystem may be at least partially submerged in the layer of liquid within the accumulator.

The thermal storage subsystem may be disposed within a pressurized chamber.

The pressurized may be is underground.

The pressurized chamber may be in fluid communication with the layer of gas in the accumulator.

A regulator valve may be fluid communication with an interior of the thermal storage subsystem and the pressurized chamber, the regulator valve may be configured to maintain a threshold pressure differential between the interior of the thermal storage subsystem and the pressurized chamber.

The gas compressor/expander subsystem may include a first compression stage and at least a second compression stage downstream from the first compression stage. The thermal storage subsystem may include a first thermal storage stage in fluid communication between the first compression stage and the second compression stage, and a second thermal storage stage in fluid communication the second compression stage and the layer of gas in the accumulator.

The gas compressor/expander subsystem may include a first expansion stage and at least a second expansion stage downstream from the first expansion stage. The thermal storage subsystem may include a third thermal storage stage in fluid communication between the layer of gas in the accumulator and the first expansion stage, and a fourth thermal storage stage in fluid communication between the first expansion stage and the second expansion.

The gas compressor/expander subsystem may include a first compression stage, at least a second compression stage downstream from the first compression stage, a first expansion stage and at least a second expansion stage downstream from the first expansion stage. The thermal storage subsystem may include a first thermal storage stage that is in fluid communication between the first compression stage and the second compression stage and that is in fluid communication between the first expansion stage and the second expansion stage.

The thermal storage subsystem may include a second thermal storage stage that is in fluid communication between the second compression stage and the accumulator and that is in fluid communication between the accumulator and the first expansion stage.

A liquid conduit may provide fluid communication between the liquid in the shaft interior and the layer of liquid in the accumulator, whereby liquid can flow between the shaft interior and the layer of liquid in the accumulator in response to changes in the pressure of the layer of compressed gas.

A first end of the liquid conduit may be proximate the outer surface of the partition and in fluid communication with the shaft.

The liquid conduit may pass through the partition.

A second end of the liquid conduit may be submerged in the layer of liquid and may remain fluidly isolated from the layer of gas when the compressed gas energy storage system is in use.

When a pressure of the layer of compressed gas is increased by conveying additional gas into the layer of compressed gas a magnitude of the gas force may be increased and liquid may be conveyed through the liquid conduit from the layer of liquid in the accumulator to the shaft interior. When the pressure of the layer of compressed gas is decreased by releasing gas from the layer of compressed gas the magnitude of the gas force may be decreased and liquid may be conveyed through the liquid conduit from the shaft interior to the layer of liquid in the accumulator.

The gas supply conduit may pass through the shaft interior and may be at least partially submerged in the quantity of the liquid.

The gas supply conduit may be external the shaft.

The gas supply conduit may pass through the partition.

In accordance with one broad aspect of the teachings described herein, which may be used alone or in combination with any other aspects, a compressed gas energy storage system may include an accumulator having a primary opening, an upper wall, a lower wall and an accumulator interior at least partially bounded the upper wall and lower wall. The accumulator may contain a layer of compressed gas atop a layer of liquid. A gas compressor/expander subsystem may have a least a first compressor that is spaced apart from the accumulator and a first expansion stage. A first gas conduit may have an upper end in communication with the first compression stage and a lower end in communication with a first location in the accumulator interior for conveying compressed gas into the compressed gas layer. A shaft may have a lower end adjacent the primary opening, an upper end spaced apart from the lower end, and a shaft sidewall extending upwardly from the lower end to the upper end and at least partially bounding a shaft interior containing a quantity of a liquid. The shaft may be fluidly connectable to a liquid source/sink via a liquid supply conduit. A partition may be positioned at the lower end of the shaft and covering the primary opening and separating the accumulator interior from the shaft interior. The partition may have an outer surface in communication with the shaft interior and an opposing inner surface in communication with the accumulator interior. At least one of the layer of compressed gas and the layer of liquid may bear against and exerts an internal accumulator force on the inner surface of the partition and the quantity of liquid within the shaft may bear against and may exert an external counter force on the outer surface of the partition, whereby a net force acting on the partition while the compressed gas energy storage system is in use is a difference between the accumulator force and the counter force and may be less than the accumulator force.

A second gas conduit may be spaced apart from the first gas conduit, and may have a lower end in communication with a second location in the accumulator interior and an upper end that is spaced apart from the upper end of the first gas conduit and is in fluid communication with the first expander.

A third gas conduit may be spaced apart from the first gas conduit and the second gas conduit. The third gas conduit may have a lower end in communication with a third location in the accumulator interior and an upper end that is spaced apart from the upper end of the first gas conduit and the upper end of the second gas conduit and is in fluid communication with a second expander that is spaced apart from the first expander.

At least one of the first gas conduit, second gas conduit and third gas conduit may extend through the shaft interior and may be submerged in the quantity of water contained in the shaft.

Optionally, only the first gas conduit may extend through the shaft interior and ay be submerged in the quantity of water contained in the shaft, and the second gas conduit and third gas conduit may be external the shaft.

The first expander may be operable independently of the second expander.

A third expander may be proximate the first compressor and ay be in fluid communication with the upper end of the first gas conduit.

The first compressor may be proximate the shaft and the first expander may be spaced apart from the shaft.

A liquid conduit may provide fluid communication between the liquid in the shaft interior and the layer of liquid in the accumulator, whereby liquid can flow between the shaft interior and the layer of liquid in the accumulator in response to changes in the pressure of the layer of compressed gas.

An upper end of the liquid conduit may be proximate the upper surface of the partition.

The liquid conduit may pass through the partition.

A lower end of the liquid conduit may be submerged in the layer of liquid within the accumulator and remains fluidly isolated from the layer of gas within the accumulator when the compressed gas energy storage system is in use.

When a pressure of the layer of compressed gas is increased by conveying additional gas into the layer of compressed gas a magnitude of the gas force may be increased and liquid may be conveyed through the liquid conduit from the layer of liquid in the accumulator to the shaft interior, and when the pressure of the layer of compressed gas is decreased be releasing gas from the layer of compressed gas the magnitude of the gas force may be decreased and liquid may be conveyed through the liquid conduit from the shaft interior to the layer of liquid in the accumulator.

At least the first gas supply conduit may pass through the shaft interior and may be at least partially submerged in the quantity of the liquid.

At least the first gas supply conduit may be external the shaft.

At least the first gas supply conduit may pass through the partition.

A thermal storage subsystem may be provided in fluid communication downstream from the gas compressor/expander subsystem and upstream of the accumulator, whereby compressed gas exiting the gas compressor/expander subsystem at an exit temperature passes through the thermal storage subsystem whereby thermal energy is extracted from the compressed gas and stored in the thermal storage subsystem and the temperature of the gas exiting the thermal storage subsystem is reduced to a storage temperature that is less than the exit temperature.

Other aspects and embodiments are described in further detail below.

BRIEF DESCRIPTION OF THE DRAWINGS

Embodiments of the invention will now be described with reference to the appended drawings in which.

DETAILED DESCRIPTION

Figure 1:
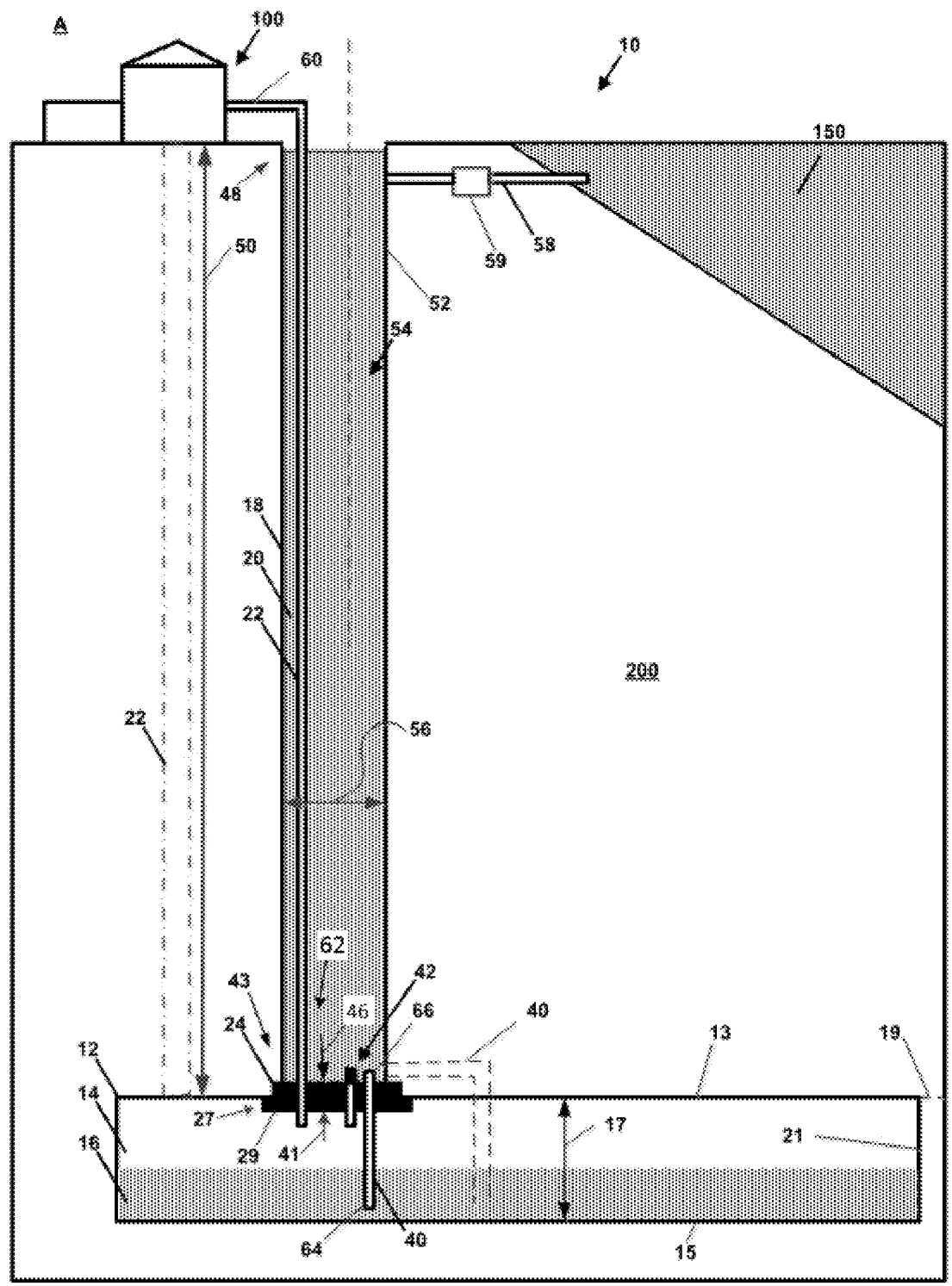
FIG. 1 is a schematic view of components of one example of a hydrostatically compensated compressed gas energy storage system.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Energy produced by some types of energy sources, such as windmills, solar panels and the like may tend to be produced during certain periods (for example when it is windy, or sunny respectively), and not produced during other periods (if it is not windy, or at night, etc.). However, the demand for energy may not always match the production periods, and it may be useful to store the energy for use at a later time. Similarly, it may be helpful to store energy generated using conventional power generators (coal, gas and/or nuclear power plants for example) to help facilitate storage of energy generated during non-peak periods (e.g. periods when electricity supply could be greater than demand and/or when the cost of electricity is relatively high) and allow that energy to be utilized during peak periods (e.g. when the demand for electricity may be equal to or greater than the supply, and/or when the cost of electricity is relatively high).

As described herein, compressing and storing a gas (such as air), using a suitable compressed gas energy storage system, is one way of storing energy for later use. For example, during non-peak times, energy (i.e. electricity) can be used to drive compressors and compress a volume of gas to a desired, relatively high pressure for storage. The gas can then be stored at the relatively high pressure inside any suitable container or vessel, such as a suitable accumulator. To extract the stored energy, the pressurized gas can be released from the accumulator and used to drive any suitable expander apparatus or the like, and ultimately to be used to drive a generator or the like to produce electricity. The amount of energy that can be stored in a given compressed gas energy storage system may be related to the pressure at which the gas is compressed/stored, with higher pressure storage generally facilitating a higher energy storage. However, containing gases at relatively high pressures in conventional systems, such as between about 45-150 atm, can require relatively strong, specialized and often relatively costly storage containers/pressure vessels.

Referring to FIG. 1 one example of a hydrostatically compensated compressed gas energy storage system 10, that can be used to compress, store and release a gas, includes an accumulator 12 that is located underground (although in another embodiment the accumulator may be located above ground). In this example, the accumulator 12 serves as a chamber for holding both compressed gas and a liquid (such as water) and can include any suitable type of pressure vessel or tank, or as in this example can be an underground cave or cavern that is within ground 200. In this embodiment, accumulator 12 is lined, for example using concrete, metal, plastic and combinations thereof or the like, to help make it substantially gas and/or liquid impermeable so as to help prevent unwanted egress of gas or liquid from within the interior 23. In another embodiment, the accumulator is preferably impermeable to gas and or liquid without requiring a lining.

The accumulator 12 may have any suitable configuration, and in this example, includes an upper wall 13 and an opposing lower wall 15 that are separated from each other by an accumulator height 17. The upper and lower walls 13 and 15 may be of any suitable configuration, including curved, arcuate, angle, and the like, and in the illustrated example are shown as generally planar surfaces, that are generally parallel to a horizontal reference plane 19. The accumulator 12 also has an accumulator width (not shown—measured into the page as illustrated in FIG. 1). The upper and lower walls 13 and 15, along with one or more sidewalls 21 at least partially define an interior 23 of the accumulator 12, that has an accumulator volume. The accumulator 12 in a given embodiment of the system 10 can be sized based on a variety of factors (e.g. the quantity of gas to be stored, the available space in a given location, etc.) and may, in some examples may be between about 1,000 m$^3$ and about 2,000,000 m$^3$ or more. For example, in this embodiment the accumulator 12 contains a layer of stored compressed gas 14 atop a layer of liquid 16, and its volume (and thus capacity) can be selected based on the quantity of gas 14 to be stored, the duration of storage required for system 10, and other suitable factors which may be related to the capacity or other features of a suitable power source and/or power load (see power source/load S/L in FIG. 5) with which the system 10 is to be associated. The power source/load S/L may be, in some examples, a power grid, a power source (including renewable and optionally non-renewable sources) and the like.

Preferably, the accumulator 12 may be positioned below ground or underwater, but alternatively may be at least partially above ground. Positioning the accumulator 12 within the ground 200, as shown, may allow the weight of the ground/soil to help backstop/buttress the walls 13, 15 and 21 of the accumulator 12, and help resist any outwardly acting forces that are exerted on the walls 13, 15 and 21 of the interior 23 of the accumulator. Its depth in the ground is established according to the pressures at which the compression/expansion equipment to be used is most efficiently operated.

The gas that is to be compressed and stored in the accumulator 12 may be any suitable gas, including, but not limited to, air, nitrogen, noble gases and combinations thereof and the like. Using air may be preferable in some embodiments as a desired quantity of air may be drawn into the system from the surrounding, ambient environment and gas/air that is released from within the accumulator 12 can similarly be vented to the ambient environment, optionally within requiring further treatment. In this embodiment, the compressed gas 14 is compressed atmospheric air, and the liquid is water.

Optionally, to help provide access to the interior of the accumulator 12, for example for use during construction of the accumulator and/or to permit access for inspection and/or maintenance, the accumulator 12 may include at least one opening that can be sealed in a generally air/gas tight manner when the system 10 is in use. In this example, the accumulator 12 includes a primary opening 27 that is provided in the upper wall 13. The primary opening 27 may be any suitable size, and may have a cross-sectional area (taken in the plane 19) that is adequate based on the specific requirements. In one embodiment the cross-sectional area is between about 0.75 m$^2$ and about 80 m$^2$, but may be larger or smaller in a given embodiment.

Figure 2:
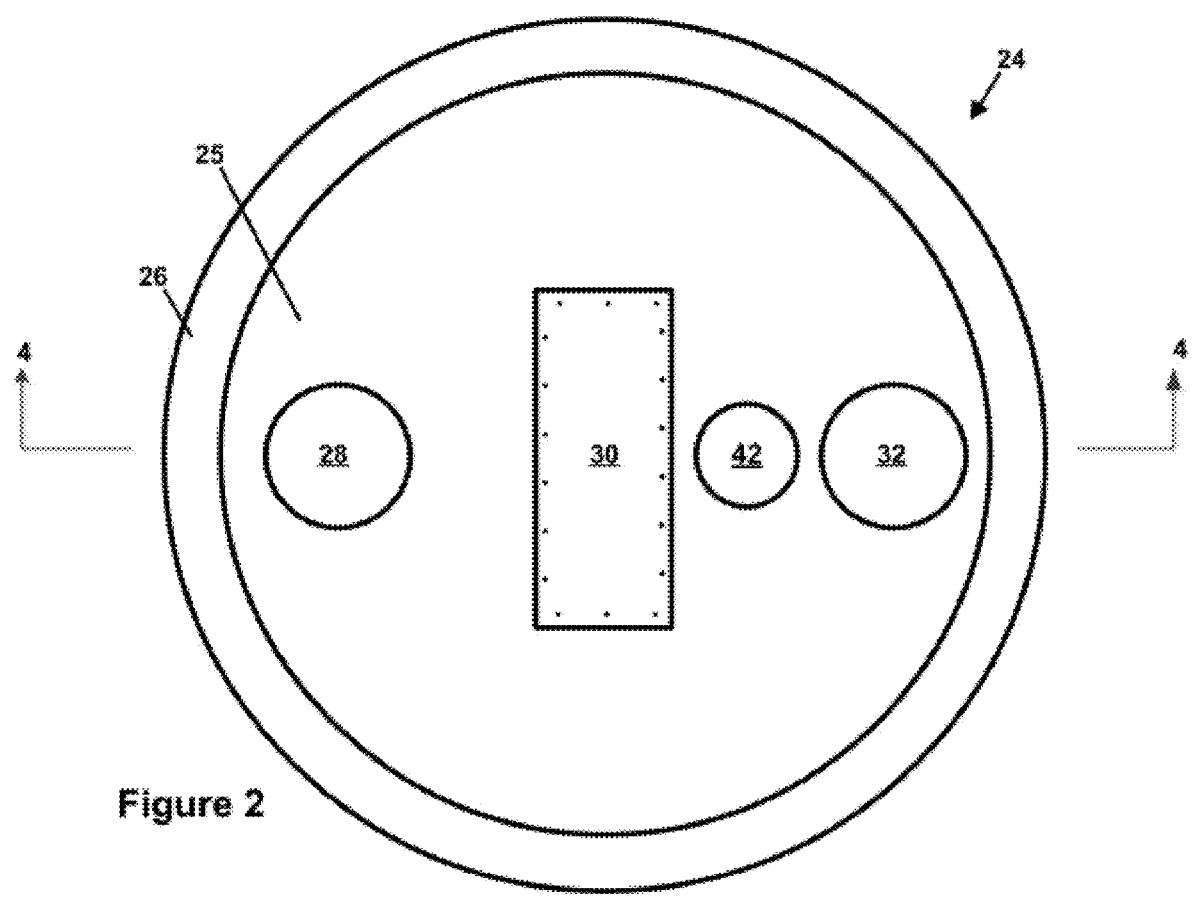
FIG. 2 is a top plan view of components of a bulkhead for the compressed gas energy storage subsystem of FIG. 1.
Figure 3:
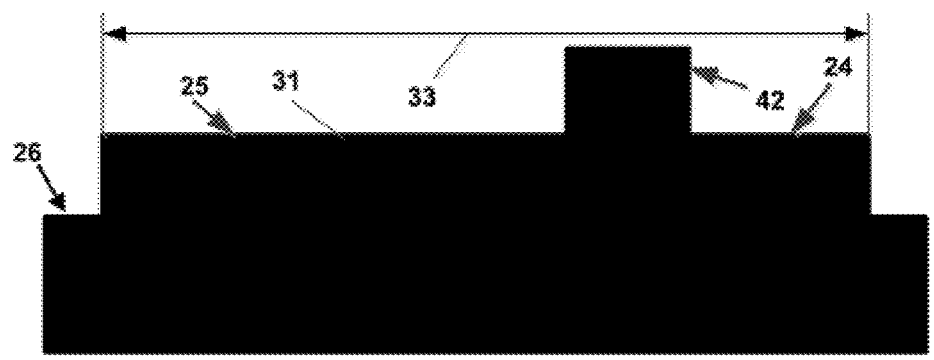
FIG. 3 is a side elevation view of the bulkhead of FIG. 2.
Figure 4:
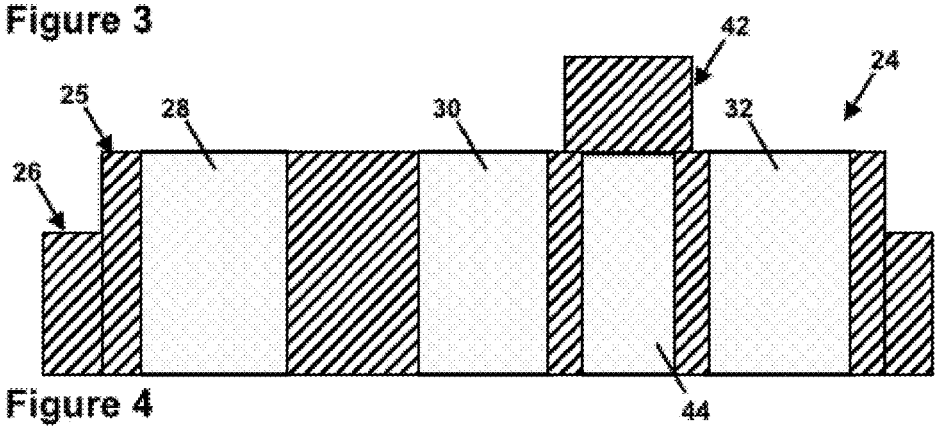
FIG. 4 is a side cross-sectional view of the bulkhead of FIG. 2, taken along line 4-4.

When the system 10 is in use, the primary opening 27 may be sealed using any suitable type of partition that can function as a suitable sealing member. In the embodiment of FIG. 1, the system 10 includes a partition in the form of a bulkhead 24 that covers the primary opening 27. FIG. 2 is a top plan view of components of this embodiment of a bulkhead 24, and FIGS. 3 and 4 are side elevation and side cross-sectional views, respectively, of bulkhead 24. In this example, the bulkhead 24 has a main body 25 that includes an inner surface 29 that faces the interior 23 of the accumulator 12, and in one alternative, is generally exposed to and in fluid communication with the compressed gas layer 14, and an opposing outer surface 31 at an upper end of the body 25 that faces interior 54. A flange 26 extends generally laterally outwardly toward the lower end of the bulkhead, such that the upper end of the bulkhead 24 has an upper width 33 that may be between about 1-8m, and may be sized to fit within the opening 27, and the lower end of the bulkhead 24 has a lower width 35 that is greater than the upper width 33 and can be between about 1.2m and about 10m, for example. In this arrangement, a generally upwardly facing shoulder surface 37 is defined and extends around the periphery of the bulkhead 24. When the bulkhead 24 is in place, as shown in FIG. 1, the shoulder surface 37 can abut the upper surface 13 of the accumulator 12, and can help resist upward movement of the bulkhead 24 through the opening 27. The bulkhead 24 may be secured to, and preferably sealed with the upper wall 13 using any suitable mechanism to help seal and enclose the interior 23. In other embodiments, the bulkhead 24 may have a different, suitable configuration.

The bulkhead 24 may be manufactured in situ, or may be manufactured offsite, and may be made of any suitable material, including, concrete, metal, plastics, composites and the like. In the illustrated embodiment, the bulkhead 24 is assembled in situ at the interface between shaft 18 and accumulator 12 of multiple pieces of reinforced concrete.

In the embodiment of FIG. 1, the primary opening 27 is provided in the upper surface 13 of the accumulator 12. Alternatively, in other embodiments the primary opening 27 and any associated partition may be provided in different portions of the accumulator 12, including, for example, on a sidewall (such as sidewall 21), in a lower surface (such as lower surface 15) or other suitable location. The location of the primary opening 27, and the associated partition, can be selected based on a variety of factors including, for example, the soil and underground conditions, the availability of existing structures (e.g. if the system 10 is being retrofit into some existing spaces, such as mines, quarries, storage facilities and the like), operating pressures, shaft configurations and the like. For example, some aspects of the systems 10 described herein may be retrofit into pre-existing underground chambers, which may have been constructed with openings in their sidewalls, floors and the like. Utilizing some of these existing formations may help facilitate construction and/or retrofit of the chambers used in the system, and may reduce or eliminate the need to form additional openings in the upper surfaces of the chambers. Reducing the total number of openings in the accumulator may help facilitate sealing and may help reduce the chances of leaks and the like.

When the primary opening 27 extends along the sidewall 21 of the accumulator 12, it may be positioned such that is contacted by only the gas layer 14 (i.e. toward the top of the accumulator 12), contacted by only the liquid layer 16 (i.e. submerged within the liquid layer 16 and toward the bottom of the accumulator) and/or by a combination of both the gas layer 14 and the liquid layer 16 (i.e. partially submerged and partially non-submerged in the liquid). The specific position of the free surface of the liquid layer 16 (i.e. the interface between the liquid layer 16 and the gas layer 14) may change while the system 10 is in use as gas is forced into (causing the liquid layer to drop) and/or withdrawn from the accumulator (allowing the liquid level to rise).

Figure 27:
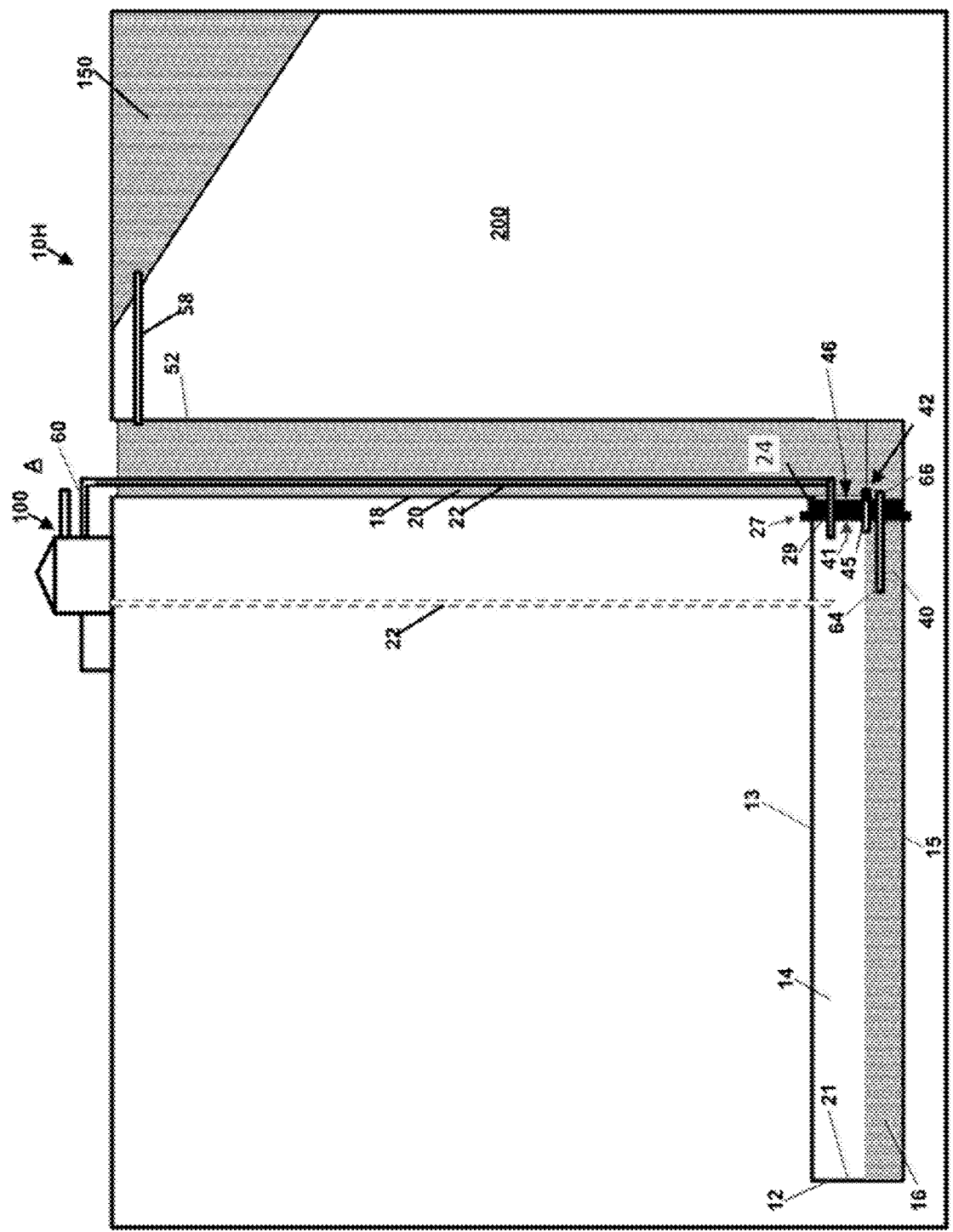
FIG. 27 is a schematic view of components of another example of a compressed gas energy storage system.

As illustrated in the schematic representation in FIG. 27, the primary opening 27 is provided in the sidewall 15 of the accumulator 12, and the bulkhead 24 is positioned such that is generally partially submerged in the liquid layer 16 and partially exposed to the gas layer 14 when the system 10H is in use. In this example, the gas supply conduit 22 passes through the bulkhead 24 and is arranged so that its lower end 62 is located toward the top of the accumulator 12 so that it will remain in communication with the gas layer 14, and fluidly isolated from the liquid layer 16, regardless of the level of the liquid within the accumulator 12. Alternatively, the gas supply conduit 22 may be positioned such that it does not pass through the bulkhead 24 when the system is configured in this manner.

In the embodiments of FIGS. 1 and 27, the partition includes a fabricated bulkhead 24 that is positioned to cover, and optionally seal the primary opening 27 in the accumulator perimeter. Alternatively, in other embodiments, the partition may be at least partially formed from natural materials, such as rock and the like. For example, a suitable partition may be formed by leaving and/or shaping portions of naturally occurring rock to help form at least a portion of the pressure boundary between the interior of the accumulator and the shaft. Such formations may be treated, coated or otherwise modified to help ensure they are sufficiently gas impermeable so as to be able to withstand the desired operating pressure differentials between the accumulator interior and the shaft. This may be done, in some embodiments, by selectively excavating the shaft 18 and accumulator 12 such that a portion of the surrounding rock is generally undisturbed during the excavation and construction of the shaft 18 and accumulator 12. Alternatively, rock or other such material may be re-introduced into a suitable location within the accumulator 12 and/or shaft 18 after having been previously excavated. This may help reduce the need to manufacture a separate bulkhead and install it within the system 10. In arrangements of this nature, the primary opening 27 may be formed as an opening in a sidewall 21 of the accumulator 12, or alternatively one side of the accumulator 12 may be substantially open such that the primary opening 27 extends substantially the entire accumulator height 17, and forms substantially one entire side of the accumulator 12.

Figure 28:
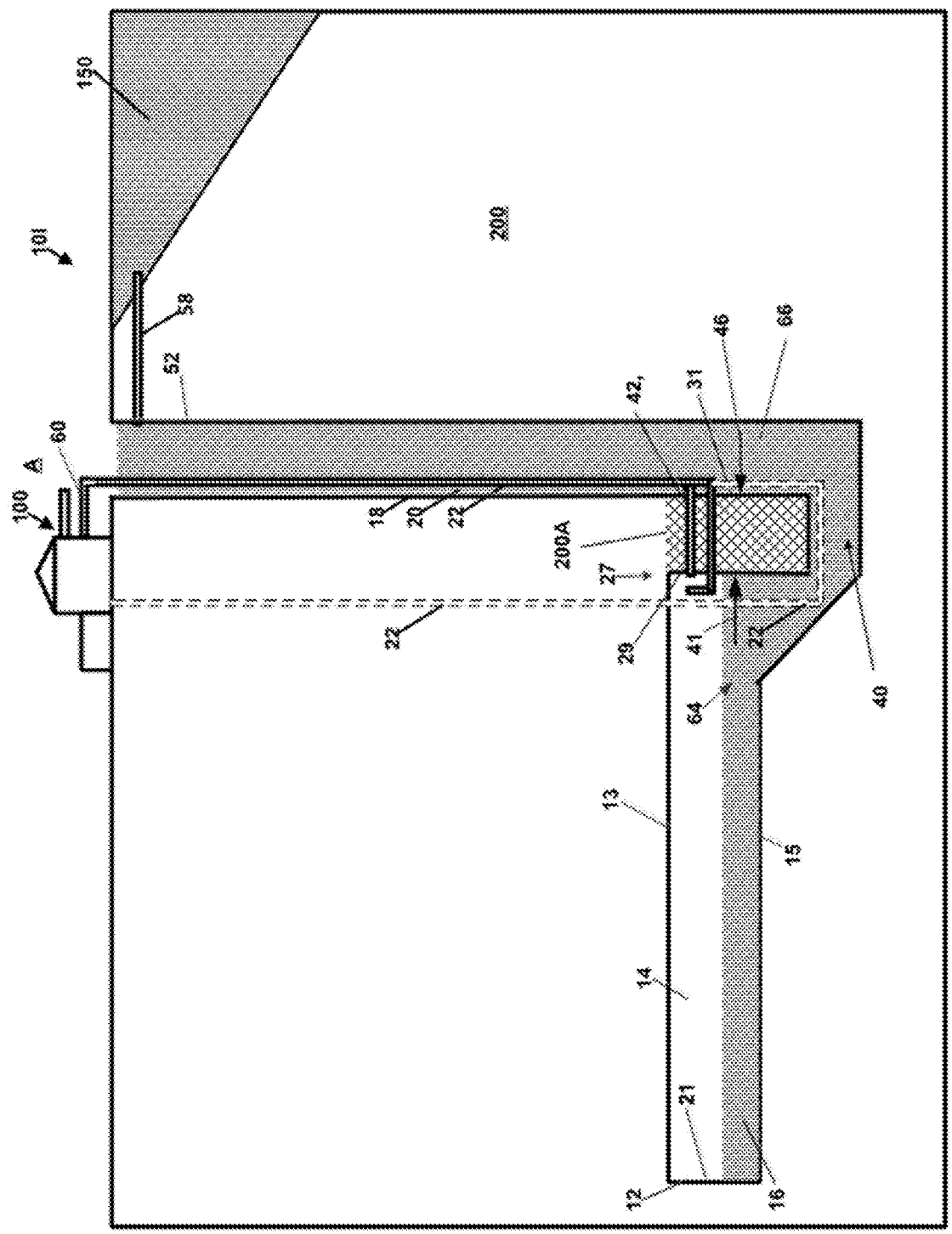
FIG. 28 is a schematic view of components of yet another example of a compressed gas energy storage system.

Referring to FIG. 28, another embodiment of a compressed gas storage system 10I is configured with a partition that includes a projection 200A, identified using cross-hatching in FIG. 28, that is formed from generally the same material as the surrounding ground 200. In this example, the system 10I need not include a separately fabricated bulkhead 24 as shown in other embodiments. The system 10 in this embodiment is configured so that the gas supply conduit 22 is spaced apart from the projection 200A and does not extend through the partition. Instead, a separate shaft or bore can be provided to accommodate the conduit 22. To help provide liquid communication between the interior of the shaft 18 and the liquid layer 16, a liquid supply conduit 40 can be provided to extend through the projection 200A or, as illustrated, at least some of the liquid supply conduit 40 can be provided by a flow channel that passes beneath the projection 200A and fluidly connects the shaft 18 to the liquid layer 16, and in ends 64 and 66 of the liquid supply conduit 40 can be the open ends of the passage.

Optionally, in such embodiments the gas supply conduit 22 may be arranged to pass through the partition/projection 200A as illustrated in FIG. 28. In this arrangement (and in the embodiment shown in FIG. 27), the conduit 22 can be configured so that its end 62 is positioned toward the upper side of the accumulator 12 to help prevent the liquid layer 16 reaching the end 62. Alternatively, the gas supply conduit 22 need not pass through the partition, as schematically illustrated using dashed lines for alternative conduit 22.

Optionally, the system 10I may be arranged so that the gas supply conduit 22 passes at least partially through the liquid supply conduit 40. This may help reduce the number of openings that need to be provided in the partition/projection 200A. In the embodiment of FIG. 28, another optional arrangement of gas supply conduit 22 is shown using dashed lines and passes through the flow channel, from the shaft 18 into the interior of the accumulator 12. In this arrangement, the gas supply conduit 22 is nested in, and passes through the liquid supply conduit 40, and also passes beneath the projection 200A. Optionally, a configuration in which at least some of the gas supply conduit 22 is received within a portion of the liquid supply conduit 40 may also be utilized in other embodiments of the system 10 (including those described and illustrated herein), including those in which both the liquid supply conduit 40 and gas supply conduit 22 pass through the partition.

When the accumulator 12 is in use, at least one of the pressurized gas layer 14 and the liquid layer 16, or both, may contact and exert pressure on the inner-surface 29 of the bulkhead 24, which will result in a generally outwardly, (upwardly in this embodiment) acting internal accumulator force, represented by arrow 41 in FIG. 1, acting on the bulkhead 24. The magnitude of the internal accumulator force 41 is dependent on the pressure of the gas 14 and the cross-sectional area (taken in plane 19) of the inner surface 29. For a given inner surface 29 area, the magnitude of the internal accumulator force 41 may vary generally proportionally with the pressure of the gas 14.

Preferably, an inwardly, (downwardly in this embodiment) acting force can be applied to the outer-surface 31 of the bulkhead 24 to help offset and/or counterbalance the internal accumulator force 41. Applying a counter force of this nature may help reduce the net force acting on the bulkhead 24 while the system 10 is in use. This may help facilitate the use of a bulkhead 24 with lower pressure tolerances than would be required if the bulkhead 24 had to resist the entire magnitude of the internal accumulator force 41. This may allow the bulkhead 24 be relatively smaller, lighter and less costly. This arrangement may also help reduce the chances of the bulkhead 24 failing while the system 10 is in use. Optionally, a suitable counter force may be created by subjecting the outer surface 31 to a pressurized environment, such as a pressurized gas or liquid that is in contact with the outer surface 31, and calibrating the pressure acting on the outer surface 31 (based on the relative cross-sectional area of the upper surface 31 and the pressure acting on the lower surface 29) so that the resulting counter force, shown by arrow 46 in FIG. 1, has a desirable magnitude. In some configurations, the magnitude of the counter force 46 may be between about 80% and about 99% of the internal accumulator force 41, and may optionally be between about 90% and about 97%, and may be about equal to the magnitude of the internal accumulator force 41.

In the present embodiment, the system 10 includes a shaft 18 having a lower end 43 that is in communication with the opening 27 in the upper wall 13 of the accumulator 12, and an upper end 48 that is spaced apart from the lower end 43 by a shaft height 50. At least one sidewall 52 extends from the lower end 43 to the upper end 48, and at least partially defines a shaft interior 54 having a volume. In this embodiment, the shaft 18 is generally linear and extends along a generally vertical shaft axis 51, but may have other configurations, such as a linear or helical decline, in other embodiments. The upper end 48 of the shaft 18 may be open to the atmosphere A, as shown, or may be capped, enclosed or otherwise sealed. In this embodiment, shaft 18 is generally cylindrical with a diameter 56 of about 3 metres, and in other embodiments the diameter 56 may be between about 2m and about 15m or more, or may be between about 5m and 12m, or between about 2m and about 5m. In such arrangements, the interior 54 of the shaft 18 may be able to accommodate about 1,000- 150,000 $m^3$ of water.

In this arrangement, the bulkhead 24 is positioned at the interface between the shaft 18 and the accumulator 12, and the outer surface 31 (or at least a portion thereof) closes and seals the lower end 43 of the shaft 18. Preferably, the other boundaries of the shaft 18 (e.g. the sidewall 52) are generally liquid impermeable, such that the interior 54 can be filled with, and can generally retain a quantity of a liquid, such as water 20. A water supply/replenishment conduit 58 can provide fluid communication between the interior 54 of the shaft 18 and a water source/sink 150 to allow water to flow into or out of the interior of the shaft 18 as required when the system 10 is in use. Optionally, a flow control valve 59 (as shown in FIG. 1) may be provided in the water supply/replenishment conduit 58. The flow control valve 59 can be open while the system 10 is in use to help facilitate the desired flow of water between the shaft 18 and the water source/sink 150. Optionally, the flow control valve 59 can be closed to fluidly isolate the shaft 18 and the water source/sink 150 if desired. For example, the flow control valve 59 may be closed to help facilitate draining the interior 54 of the shaft 18 for inspection, maintenance or the like.

The water source/sink 150 may be of any suitable nature, and may include, for example a connection to a municipal water supply or reservoir, a purposely built reservoir, a storage tank, a water tower, and/or a natural body of water such as a lake, river or ocean, groundwater, or an aquifer. In the illustrated example, the water source/sink 150 is illustrated as a lake. Allowing water to flow through the conduit 58 may help ensure that a sufficient quantity of water 20 may be maintained with shaft 18 and that excess water 20 can be drained from shaft 18. The conduit 58 may be connected to the shaft 18 at any suitable location, and preferably is connected toward the upper end 48. Preferably, the conduit 58 can be positioned and configured such that water will flow from the source/sink 150 to the shaft 18 via gravity, and need not include external, powered pumps or other conveying apparatus. Although the conduit 58 is depicted in the figures as horizontal, it may be non-horizontal.

In this example, the water 20 in the shaft 18 bears against the outside of bulkhead 24 and is thereby supported atop bulkhead 24. The amount of pressure acting on the outer surface 31 of the bulkhead 24 in this example will vary with the volume of water 20 that is supported, which for a given diameter 56 will vary with the height of the water column. In this arrangement, the magnitude of the counter force 46 can then be generally proportional to the amount of water 20 held in the shaft 18. To increase the magnitude of the counter force 46, more water 20 can be added. To reduce the magnitude of the counter force 46, water 20 can be removed from the interior 54.

The layer of stored compressed air 14 underlying bulkhead 24 serves, along with the technique by which bulkhead 24 is stably affixed to the surrounding in the ground, in one alternative to surrounding stone in the ground at the interface between accumulator 12 and shaft 18, to support bulkhead 24 and the quantity of liquid contained within shaft 18.

Preferably, as will be described, the pressure at which the quantity of water 20 bears against bulkhead 24 and can be maintained so that magnitude of the counter force 46 is as equal, or nearly equal, to the magnitude of the internal accumulator force 41 exerted by the compressed gas in compressed gas layer 14 stored in accumulator 12. In the illustrated embodiment, operating system 10 so as to maintain a pressure differential (i.e. the difference between gas pressure inside the accumulator 12 and the hydrostatic pressure at the lower end 43 of the shaft 18) within a threshold amount—an amount preferably between 0 and 4 Bar, such as 2 Bar—the resulting net force acting on the bulkhead 24 (i.e. the difference between the internal accumulator force 41 and the counter force 46) can be maintained below a pre-determined threshold net force limit. Maintaining the net pressure differential, and the related net force magnitude, below a threshold net pressure differential limit may help reduce the need for the bulkhead 24 to be very large and highly-reinforced, and accordingly relatively expensive. In alternative embodiments, using a relatively stronger bulkhead 24 and/or installation technique for affixing the bulkhead 24 to the accumulator 12 may help withstand relatively higher pressure and net pressure differential, but may be more expensive to construct and install, all other things being equal. Furthermore, the height 17 of the accumulator 12 may be important to the pressure differential: if the height 17 is about 10 metres, then the upward pressure on the bulkhead 24 will be 1 Bar higher than the downward pressure on the bulkhead 24 from the water 20 in shaft 18.

Each of shaft 18 and accumulator 12 may be formed in ground 200 using techniques similar to those used for producing mineshafts and other underground structures.

To help maintain substantially equal outward and inward forces 41 and 46 respectively on the bulkhead 24, the system 10 may be utilized to help maintain a desired differential in accumulator and shaft pressures that is below a threshold amount. These pressures may be controlled by adding or removing gas from the compressed gas layer 14 accumulator 12 using any suitable compressor/expander subsystem 100, and water can be conveyed between the liquid layer 16 and the water 20 in shaft 18.

In this embodiment, a gas conduit 22 is provided to convey compressed air between the compressed gas layer 14 and the compressor/expander subsystem 100, which can convert compressed air energy to and from electricity. Similarly, a liquid conduit 40 is configured to convey water between the liquid layer 16 and the water 20 in shaft 18. Each conduit 22 and 40 may be formed from any suitable material, including metal, plastic and the like.

In this example, the gas conduit 22 has an upper end 60 that is connected to the compressor/expander subsystem 100, and a lower end 62 that is in communication with the gas layer 14. The gas conduit 22 is, in this example, positioned inside and extends within the shaft 18, and passes through the bulkhead 24 to reach the gas layer 14. Positioning the gas conduit 22 within the shaft 18 may eliminate the need to bore a second shaft and/or access point from the surface to the accumulator 12. This position may also leave the gas conduit 22 generally exposed for inspection and maintenance, for example by using a diver or robot that can travel through the water 20 within the shaft 18 and/or by draining some or all of the water from the shaft 18. Alternatively, as shown using dashed lines in FIG. 1 and in the embodiment of FIG. 28, the gas conduit 22 may be external the shaft 18. Positioning the gas conduit 22 outside the shaft 18 may help facilitate remote placement of the compressor/expander subsystem 100 (i.e. it need not be proximate the shaft 18) and may not require the exterior of the gas conduit 22 (or its housing) to be submerged in water. This may also eliminate the need for the gas conduit 22 to pass through the partition that separates the accumulator 12 from the shaft 18.

The liquid conduit 40 is, in this example, configured with a lower end 64 that is submerged in the water layer 16 while the system 10 is in use and a remote upper end 66 that is in communication with the interior 54 of the shaft 18. In this configuration, the liquid conduit 40 can facilitate the exchange of liquid between the liquid layer 16 and the water 20 in the shaft 18. As illustrated in FIG. 1, the liquid conduit 40 can pass through the bulkhead 24 (as described herein), or alternatively, as shown using dashed lines, may be configured to provide communication between the liquid layer 16 and the water 20, but not pas through the bulkhead 24.

In this arrangement, as more gas is transferred into the gas layer 14 during an accumulation cycle, and its pressure increases, in this alternative slightly, water in the water layer 16 can be displaced and forced upwards through liquid conduit 40 into shaft 18 against the pressure of the water 20 in the shaft 18. More particularly, water can preferably freely flow from the bottom of accumulator 12 and into shaft 18, and ultimately may be exchanged with the source/sink 150 of water, via a replenishment conduit 58. Alternatively, any suitable type of flow limiting or regulating device (such as a pump, valve, orifice plate and the like) can be provided in the water conduit 40. When gas is removed from the gas layer 14, water can be forced from the shaft 18, through the water conduit 40, to refill the water layer 16. The flow through the replenishment conduit 58 can help ensure that a desired quantity of water 20 may be maintained within shaft 18 as water is forced into and out of the water layer 16, as excess water 20 can be drained from and make-up water can be supplied to the shaft 18. This arrangement can allow the pressures in the accumulator 12 and shaft 18 to at least partially, automatically re-balance as gas is forced into the accumulator 12.

Preferably, the lower end 64 of the liquid conduit 40 is positioned so that it is and generally remains submerged in the liquid layer 16 while the system 10 is in use, and is not in direct communication with the gas layer 14. In the illustrated example, the lower wall 15 is planar and is generally horizontal (parallel to plane 19, or optionally arranged to have a maximum grade of between about 0.01% to about 1%, and optionally between about 0.5% and about 1%, from horizontal), and the lower end 64 of the liquid conduit 40 is placed close to the lower wall 15. If the lower wall 15 is not flat or not generally horizontal, the lower end 64 of the liquid conduit 40 is preferably located in a relative low point of the accumulator 12 to help reduce the chances of the lower end 64 being exposed to the gas layer 14.

Similarly, to help facilitate extraction of gas from the gas layer, the lower end 62 of the gas conduit 22 is preferably located close to the upper wall 13, or at a relative high-point in the interior 23 of the accumulator 12. This may help reduce material trapping of any gas in the accumulator 12. For example, if the upper wall 13 were oriented on a grade, the point at which gas conduit 22 interfaces with the gas layer (i.e. its lower end 62) should be at a high point in the accumulator 12, to help avoid significant trapping of gas.

Figure 5:
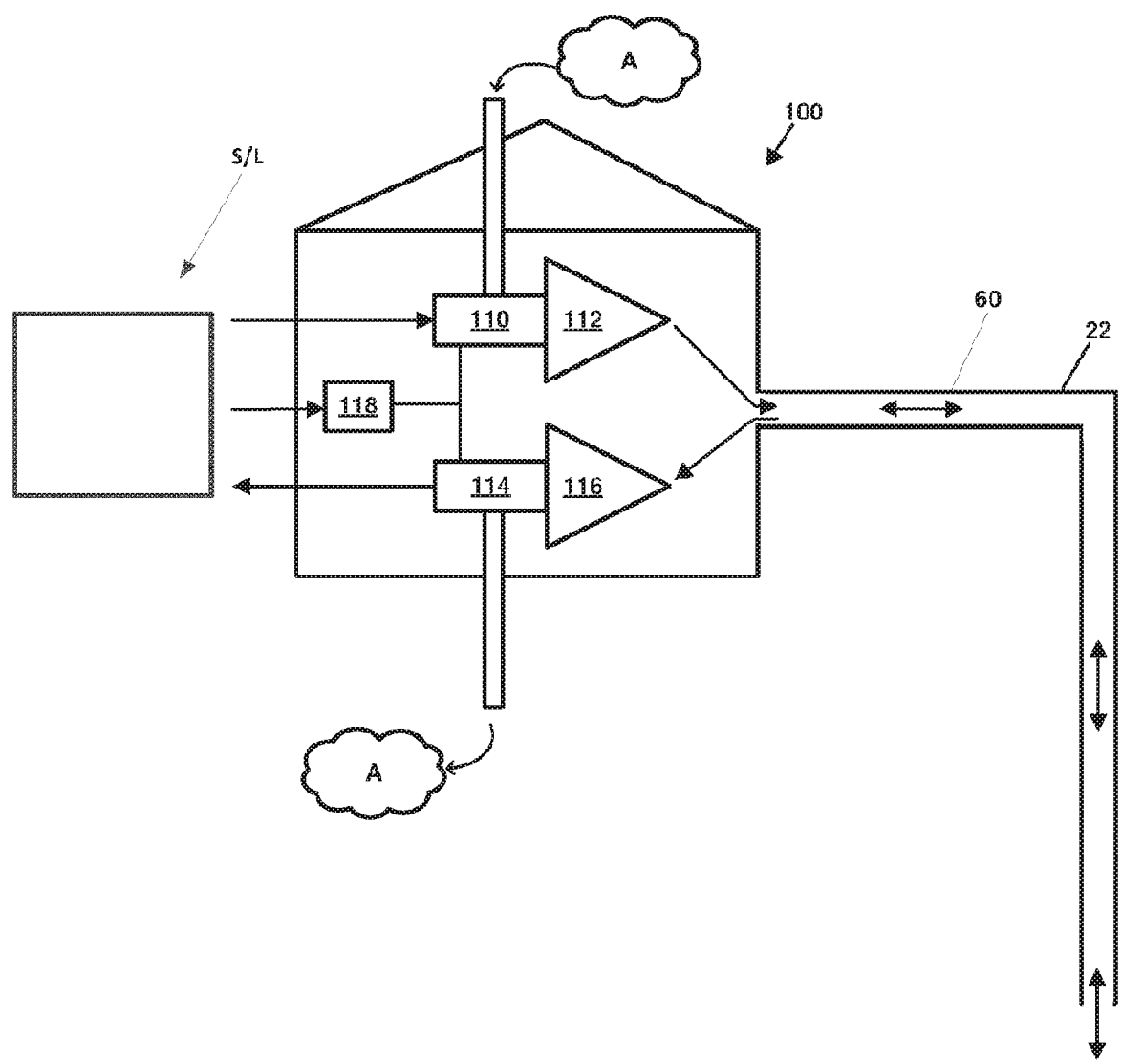
FIG. 5 is a schematic representation of components of one example of a compressor/expander subsystem that is usable with any of the compressed gas energy storage systems, according to an embodiment.

FIG. 5 is a schematic view of components of the compressor/expander subsystem 100 for the compressed gas energy storage system 10 described herein, according to an embodiment. In this example, the compressor/expander subsystem 100 includes a compressor 112 of single or multiple stages, driven by a motor 110 that is powered, in one alternative, using electricity from a power grid or by a renewable power source or the like, and optionally controlled using a suitable controller 118. Compressor 112 is driven by motor 110 during an accumulation stage of operation, and draws in atmospheric air A, compresses the air, and forces it down into gas conduit 22 for storage in accumulator 12 (via thermal storage subsystem 120 (see FIG. 8) in embodiments including same). Compressor/expander subsystem 100 also includes an expander 116 driven by compressed air exiting from gas conduit 22 during an expansion stage of operation and, in turn, driving generator 114 to generate electricity. After driving the expander 116, the expanded air is conveyed for exit to the atmosphere A. While shown as separate apparatuses, the compressor 112 and expander 116 may be part of a common apparatus, as can a hybrid motor/generator apparatus. Optionally, the motor and generator may be provided in a single machine.

It will be understood that air entering or leaving compressor/expander subsystem 100 may be conditioned prior to its entry or exit. For example, air exiting or entering compressor/expander subsystem 100 may be heated and/or cooled to reduce undesirable environmental impacts or to cause the air to be at a temperature suited for an efficient operating range of a particular stage of compressor 112 or expander 116.

Controller 118 operates compressor/expander subsystem 100 so as to switch between accumulation and expansion stages as required, including operating valves for preventing or enabling release of compressed air from gas conduit 22 on demand.

Auxiliary Gas Release

Optionally, the compressed gas energy storage system 10 may include one or more auxiliary gas release subsystem that is separate from the gas conduit 22 to help facilitate the release of gas from the compressed gas layer 14. For example, if the pressure within the accumulator 12 approaches and/or surpasses a desired maximum storage pressure, venting at least some of the gas from the compressed gas layer 14 may help reduce the pressure to a desired range. This can also be used to help prevent the compressed gas layer 14 from reaching a level where it comes into fluid communication with the lower end 64 of the conduit 40. Such an auxiliary gas release subsystem preferably includes at least one auxiliary gas release conduit that is separate from the gas supply conduit 22 and may be configured to vent the gas into the ground, into a separate vent shaft, into the water filled shaft 18 or other desired location. For example, the gas release subsystem may enable further flexibility for regulating pressure within system 10 by being operable to release gas in the event that the differential between the pressure bearing against the outside of bulkhead 24 from within shaft 18 and the pressure bearing against the inside of bulkhead 24 from within accumulator 12 rises to such a level as to threaten the integrity of bulkhead 24 or its installation in place. For example, should the liquid 20 in shaft 18 be reduced to a level that lowers the pressure and thereby reduces the magnitude of the counter force 46 acting on the bulkhead 24 below a desired level, the gas release subsystem can enable release of the pressure within accumulator 12.

In this embodiment, the gas release subsystem includes an auxiliary gas release conduit 45 that is spaced from the gas supply conduit 22 and an optional valve 42 (see FIGS. 1-4) that is in communication with the compressed gas layer 14 and is, in this example, associated with bulkhead 24. The valve 42 may preferably be a one-way or check valve such that it can allow gas to travel from the compressed gas layer 14 into the shaft 18, but impedes or prevents the flow of water 20 from the shaft 18 into the accumulator 12. The valve 42 may be actuated using any suitable mechanism, including being configured as a pressure sensitive valve that can be biased towards a closed configuration and will open, preferably automatically, when the pressure in the compressed gas layer 14 exceeds a pre-set threshold limit, and/or may be configured to be opened and closed remotely (such as through remote hydraulic or electrical actuation) to permit gas from gas layer 14 to escape through bulkhead 24 on demand. Optionally, the valve 42 may be controlled by the controller 118 by using a suitable valve actuating system that may include, for example, mechanical actuators, electromechanical actuators, solenoid actuators and the like. For example, whether the valve 42 is opened to release compressed gas out of accumulator 12, and whether and how compressed gas routed through other portions of the system 10 (such as a thermal storage subsystem 120 (see FIGS. 8-9) during an accumulation or expansion cycle as described herein).

It is preferred that the dimensions of the shaft 18, accumulator 12 and the integrity of bulkhead 24 be related to each other in a way that permits compressed gas layer 14 in accumulator to be maintained within a pressure range that maximizes the efficiency of the equipment used in compressor/expander subsystem 100. Optionally, the system 10 may be configured to store the compressed gas layer at pressures of between about 20 atm and about 40 atm. Over time, for continued efficient operation, such equipment may require that an adjustment in the pressure range be made. This may be done by adjusting the amount of liquid 20 in shaft 18 and the level of compression of gas within accumulator 24, by adjusting conduit sizes, and the like.

Optionally, the bulkhead 24 may include one or more apertures or other suitable structures to accommodate the gas conduit 22, the liquid conduit 40, the auxiliary gas release conduit 45 and other such conduits, such that the conduits pass through the bulkhead 24 in order to enter the interior 23 of the accumulator 12. Passing the conduits and other such structures through the bulkhead 24 may eliminate the need to make additional shafts/bores to reach the accumulator 12, and may reduce the number of individual openings required in the upper wall 13. Referring to FIGS. 2-4, extending through main body 25 is a first aperture 28 for accommodating passage of gas conduit 22 from above bulkhead 24 in shaft 18 through to gas layer 14 within accumulator 12. Gas conduit 22 is preferably sealed to/within first aperture 28 so as to minimize, and preferably prevent, leaks or other uncontrolled release of compressed gas within accumulator 12 into shaft 18 or water 20 within shaft 18 into accumulator 12. Also extending through bulkhead 24 is a second aperture 32 for accommodating passage of liquid conduit 40 from above bulkhead 24 in shaft 18 through to liquid layer 16 within accumulator 12. Liquid conduit 40 is sealed within second aperture 32 so as to minimize, and preferably prevent, uncontrolled release of compressed gas within accumulator 12 into shaft 18 or water 20 within shaft 18 into accumulator 12 (except via conduit 40).

Also extending through bulkhead 24 is, in this example, a third aperture 44 for accommodating passage of gas from the compressed gas layer 14 towards valve 42 and through the auxiliary gas release conduit 45 for release of gas from the compressed gas layer 14 in the event that the pressure differential discussed requires reduction. It will be understood that the valve 42 does not necessarily have to sit atop bulkhead 24 and may in fact be integrated within third aperture 44 or associated with third aperture 44 in some other manner. Valve 42 may also be integrated into the second aperture 32 and the liquid conduit 40, thus eliminating the need for the third aperture 44.

In this embodiment, an openable and re-sealable access manway 30 is provided for enabling maintenance access by maintenance personnel to the interior of accumulator 12, for inspection and cleaning. This would be done by closing flow control valve 59 (FIG. 1) and emptying shaft 18 of liquid 20, and emptying accumulator 12 of compressed gas thereby to enable manway 30 to be opened and personnel to pass back and forth. As for bulkhead 24, variations are possible. For example, in an alternative embodiment, bulkhead 24 may only have first and second apertures 28, 32 but no manway 30. In an alternative embodiment, bulkhead 24 may include a manway 30, but need not contain first and second apertures 28, 32 and the conduits 22 and 40 do not pass through bulkhead 24. In yet another alternative embodiment, bulkhead 24 contains no manway and no apertures, such that fluid communication with accumulator 12 does not pass through bulkhead 24. Optionally, a manway or the like may also be provided in other types of partitions, including for example the projection 200A as shown in the embodiment of FIG. 28.

Figure 6A:
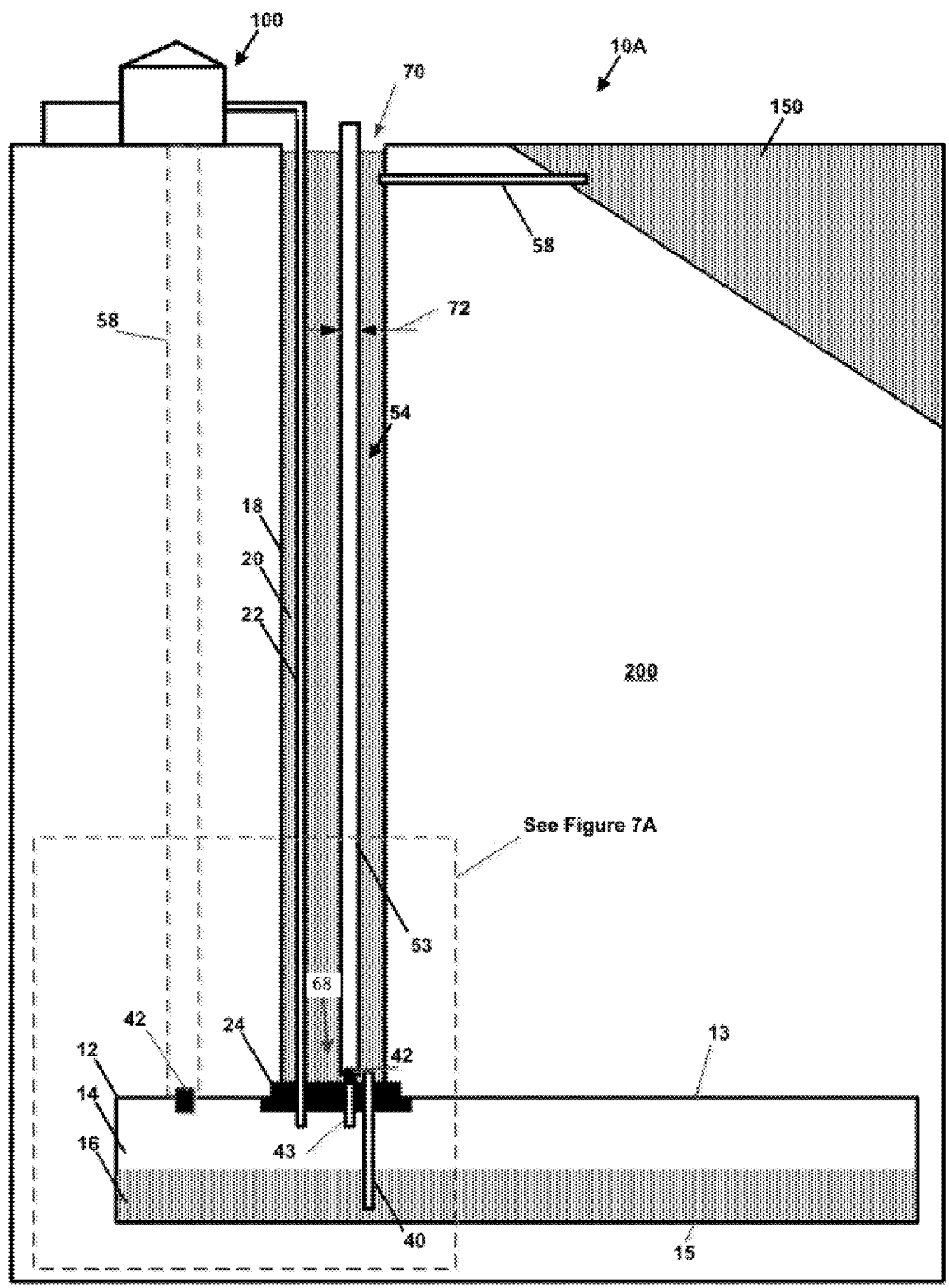
FIG. 6A is a schematic, view of components of another example of a compressed gas energy storage system.

Optionally, a conduit or other type of guide structure can be provided to help channel the gas that is vented from the accumulator 12 via the auxiliary gas release conduit 45, and optionally via the gas release valve 42. For example, in some circumstances it may be desirable to direct the escaping gas along a particular path through the shaft 18, rather than simply releasing the gas freely into the column of water 20. FIG. 6A is a sectional view of components of an alternative embodiment of a compressed gas energy storage system 10A, which is analogous to the compressed gas energy storage system 10 as described above, and like features are identified using like reference characters. However, in this example the gas release subsystem further includes a guide conduit 53 that extends from a lower, inlet end 68 adjacent the output of the auxiliary gas release conduit 45 (in this example, the exit of gas release valve 42) upwards to an upper, outlet end 70 that can be provided toward the upper end of the shaft 18, and optionally may protrude above the free surface of the water 20 retained in the shaft 20.

The guide conduit 53 has a width 72 (which may be also called a diameter if the guide conduit 53 is a cylindrical pipe), and a related cross-sectional area (taken in a plane parallel to the plane 19) may be configured so that it is between about 0.5% and about 5% of the cross-sectional area of the shaft 18. As shown also in FIG. 7A the lower end of 68 of the guide conduit 53 can be positioned close to, and preferably overlying substantially all of the outlet of the auxiliary gas release conduit 45, such that gas exiting the valve 42 tends to enter the lower end 68 of the guide conduit 53 and is then constrained within guide conduit 53 as it continues to travel upwardly through the shaft 18 and until it reaches the outlet end 70.

As the gas exiting the accumulator 12 via the auxiliary gas release conduit 45 may tend to be at a relatively high pressure (and may tend to be released generally in over-pressurization type situations), the gas bubbles within the water 20 may tend to expand as they move upwardly trough the shaft 18. Under some circumstances, the expansion of the gas bubbles may tend to displace water 20 from within the shaft 18 (for example, forcing water through conduit 20 and into the liquid source/sink 150). This may have the effect of reducing the mass of water that is resting on the bulkhead 24 (i.e. may reduce the average density of the interior 54 of the shaft 18), which may reduce the hydrostatic pressure that is acting on the upper surface 31, and in turn reduce the magnitude of the counter force 46. If gas is being vented via the gas release valve 42 because the internal accumulator pressure is too high, and therefore the magnitude of the internal accumulator force 41 is too high, this reduction in the magnitude of the counter force 46 may further increase the force imbalance on the bulkhead 24 and may tend to exacerbate the over loaded condition of the bulkhead 24.

As illustrated, the guide conduit 53, or similar structure to help restrict expansion of the gas bubbles, may function as a density change prevention structure/boundary; that may receive the compressed gas that is released from accumulator 12 via auxiliary gas release conduit 45 and convey it upwards and out of shaft 18 while constraining its maximum expansion to the internal volume of the guide conduit 53. This can help limit the amount of water displaced by the expanding, rising gas bubbles, and can help reduce the lessening of the counter force 46 during a gas release/venting event. That is, guide conduit 53 also serves to physically contain gas bubbles as they leave gas release valve 42 thereby to prevent the gas bubbles, as they rise upwards through water 20 to leave system 10A (or 10J), from displacing very much water 20 beyond the quantity of water 20 that was contained within in guide conduit 53. This additional feature may help further safeguard the amount of water 20 in shaft 18 thereby to safeguard the amount of downward pressure being placed onto bulkhead 24. It would be understood that this may help facilitate faster release of compressed air via the auxiliary gas release conduit 45, should it be needed, than would be advisable using versions of the system 10 that do not include a guide conduit 53. For example, in the absence of guide conduit 53, gas released from gas release valve 42 or auxiliary gas release conduit 45 could rise and spread freely through the shaft 18. As such freely-spreading gas bubbles increase in volume upon rising (decompress), they would displace water 20 from shaft 18 thereby reducing the amount of downward pressure by water 20 onto bulkhead 24. The guide conduit 53 controls this release of gas bubbles, forcing them to expand upward through guide conduit 53 rather than outward into the rest of shaft 18, thereby preserving most of the volume of water 20 in shaft 18. Guide conduit 53 controlling the release of gas bubbles may help prevent catastrophic failure due to density changes causing the bulkhead 24 to release, buckle or otherwise fail due to a relatively sudden net force imbalance.

Preferably, the interior of the guide conduit 53 is in fluid communication with the interior 54 of the shaft 18, such as by having the lower end 68 at least partially open, so that the interior of the guide conduit 53 can be generally filled with water 20 when the system is in normal use (i.e. when the guide conduit 53 is not filled with vented gas), while still being configured to receive the vented gas. In this way, guide conduit 53 displaces less water 20 from the shaft 18 than it would if the guide conduit 53 was sealed to the bulkhead 24 and only contained air/gas. With its interior filled with water, the guide conduit 53 may, in some examples, only displace an amount of water the is about equal to the volume of the sidewalls of the guide conduit 53.

While shown as generally straight, vertical conduit for ease of illustration, the guide conduit 53 may have other configurations, and need not be vertical and/or linear. Optionally, in some examples the upper end 70 of the guide conduit 53 need not be positioned above the surface of the water 20 in the shaft 18, but may be submerged therein. In such arrangements, the expansion-limiting effects of the guide conduit 53 may be somewhat reduced (i.e. more water may ultimately be displaced than if the upper end 70 was above the water), but other factors like expected pressures, gas release rates through valve 42 and the like may be adjusted to compensate for such differences to help ensure the total water displaced from the shaft 18 during an over-pressure venting situation is within an acceptable range. Preferably, the upper end 70 may be in the upper half of the shaft 18 (i.e. above its midway point), and more preferably the upper end 70 may be in the upper 25% of the shaft 18 and most preferably may be generally proximate, if not above, the surface of the water 20.

Figure 7A:
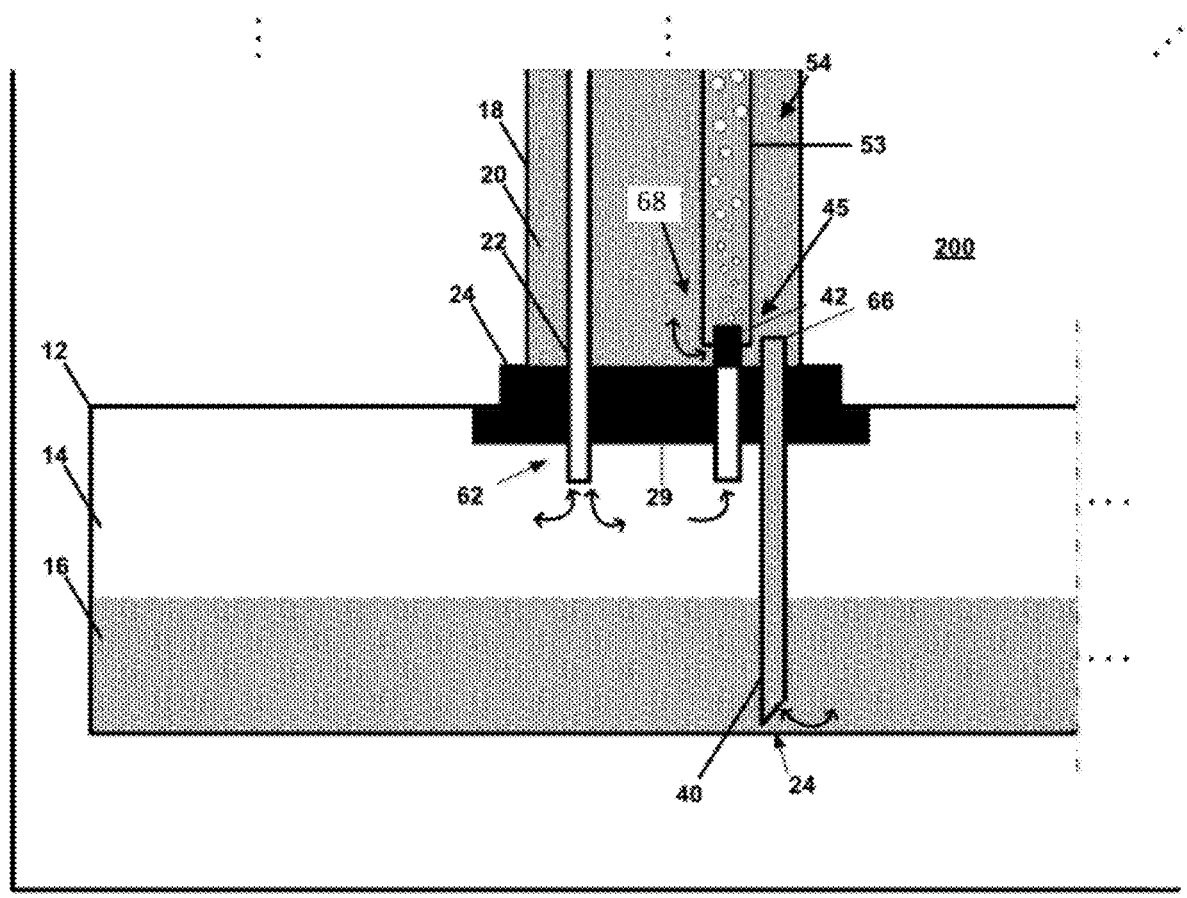
FIG. 7A is an enlarged view of a portion of the components of the compressed gas energy storage system of FIG. 6A.
Figure 6B:
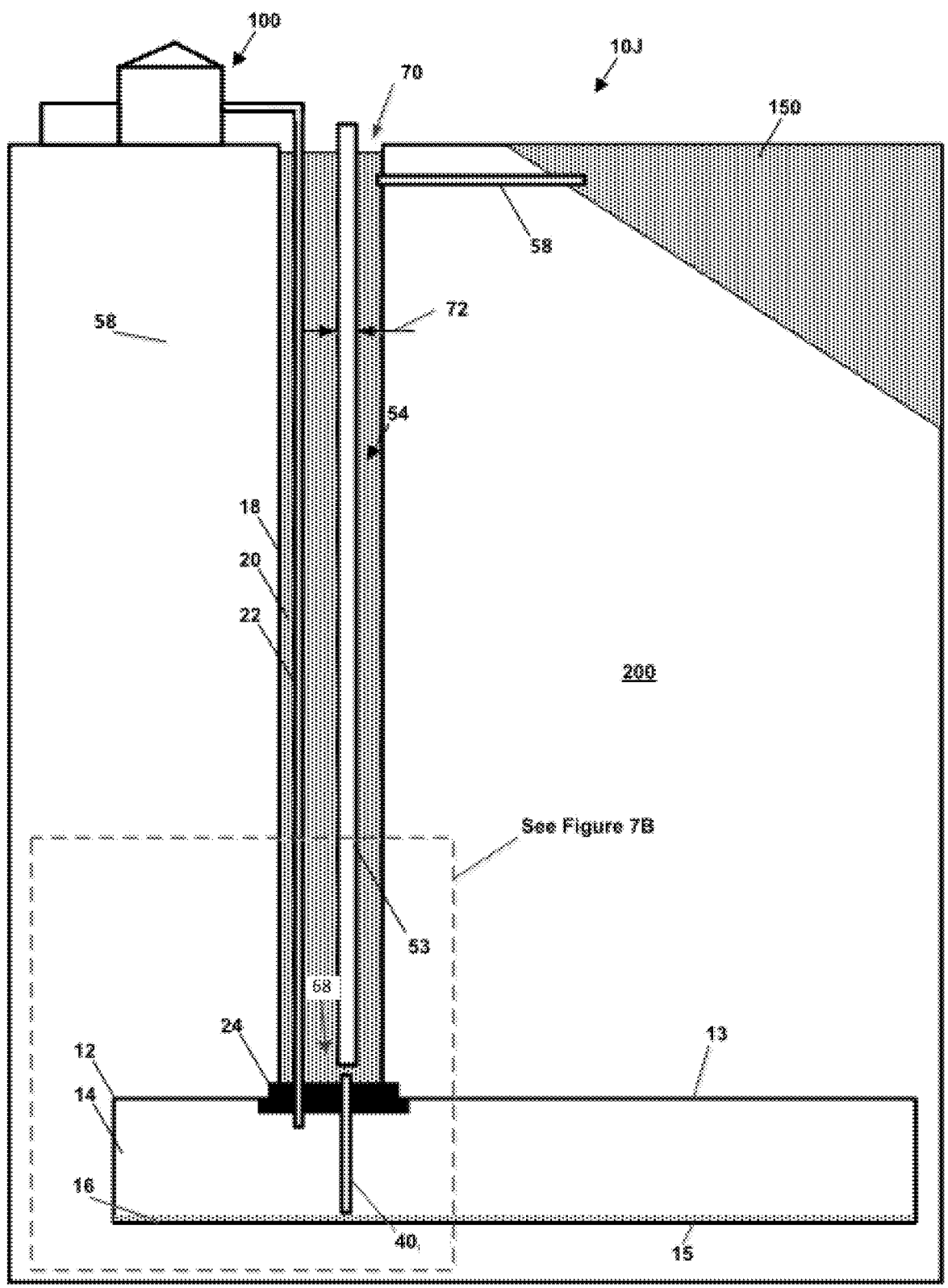
FIG. 6B is a schematic view of components of another example of a compressed gas energy storage system.
Figure 7B:
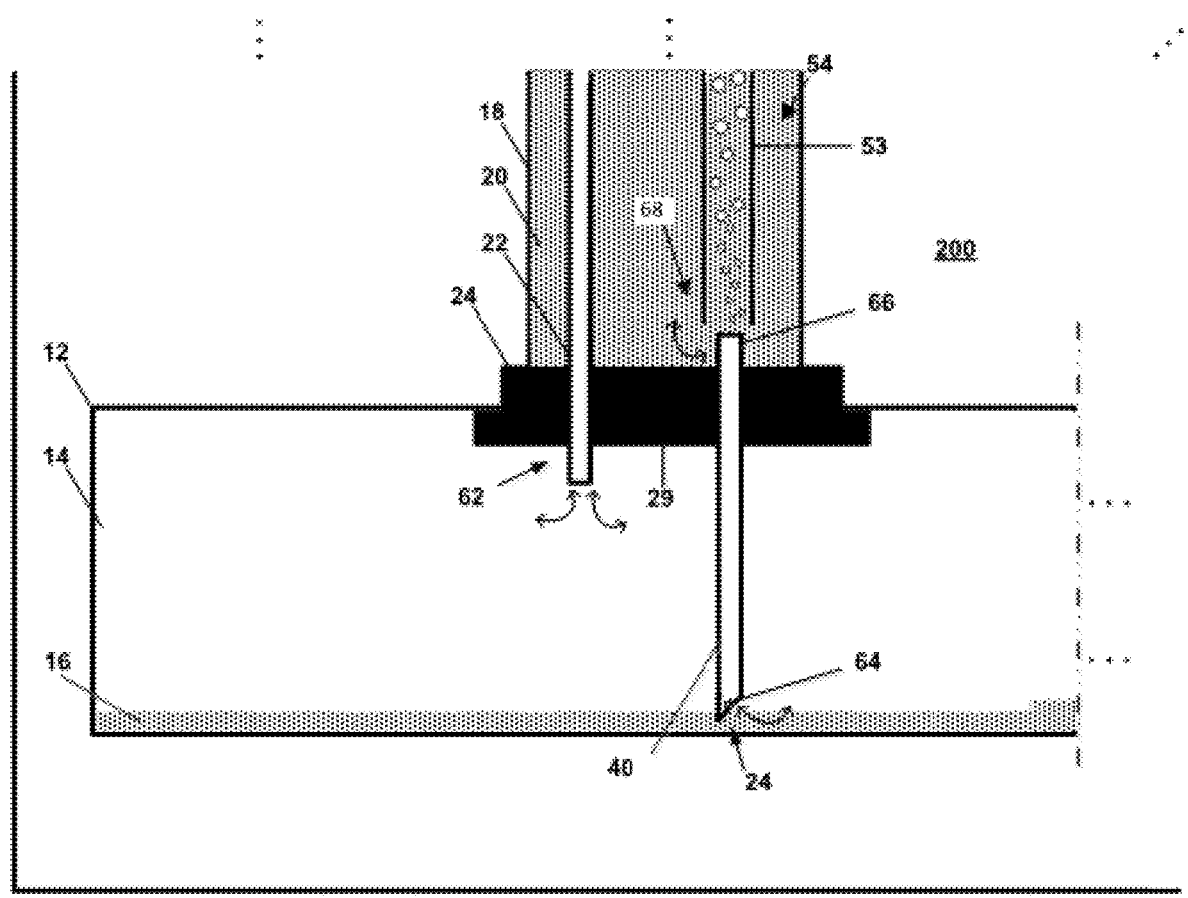
FIG. 7B is an enlarged view of a portion of the components of the compressed gas energy storage system of FIG. 6B.

FIG. 6B is a sectional view of components of an alternative embodiment of a compressed gas energy storage system 10J, which is analogous to the compressed gas energy storage system 10 as described above, and like features are identified using like reference characters. The gas release subsystem in this embodiment is configured such that the auxiliary gas release conduit 45 is substantially coterminous with the liquid supply conduit 40 and also includes a guide conduit 53 that extends from a lower, inlet end 68 to an upper, outlet end 70. In this embodiment, the gas release subsystem need not include a valve 42 as shown in the embodiment of FIGS. 6A and 7A. Instead, excess pressure in the accumulator 12 may be relieved by allowing at least some gas to exit the accumulator 12 via the liquid supply conduit 40.

When the system 10J is operating under normal operating conditions, the lower end 64 of the liquid supply conduit 40 is submerged in the liquid layer 16, which isolates the liquid supply conduit 40 from the gas layer 14. If the pressure within the accumulator 12 increases beyond a desired operating threshold, water may be forced from the accumulator 12 and into the shaft 18 via the liquid supply conduit 40. As water exits the accumulator 12, the height of the liquid layer 16 may drop to a level at which the lower end 64 of the liquid supply conduit 40 is at least partially exposed. This may allow some of the gas from the compressed gas layer 14 to flow into the liquid supply conduit 40 and escape the accumulator 12, thereby reducing the pressure within the accumulator 12. In this arrangement, the liquid supply conduit 40 also functions as the auxiliary gas release conduit 45. Gas flowing through the liquid supply conduit 40/auxiliary gas release conduit 45 may then escape into the interior of the shaft 18 and form expanding gas bubbles as described herein. In this embodiment, the gas release subsystem is configured so that the lower end 68 of the guide conduit 53 is positioned to capture at least some of the gas exiting the liquid supply conduit 40/auxiliary gas release conduit 45, and to contain the gas as described in relation to the embodiment of FIGS. 6A and 7A. This embodiment may eliminate the need to incorporate a separate valve 42, and associated actuators, etc., which may help simplify the system 10J (for example as compared to system 10A) and may help reduce the number of openings that are to be provided in the bulkhead 24.

As the pressure within the accumulator 12 drops as a result of the escaping gas, liquid may flow into the accumulator through the liquid supply conduit 40 and the level of the liquid in the liquid layer 16 may rise to cover the lower end 64 of the liquid supply conduit 40. This can re-isolate the compressed gas layer 14 from the liquid supply conduit 40, and may stop the release of gas via the liquid supply conduit 40.

Optionally, a gas release system and suitably configured guide conduit 53 may also be used with the vertically oriented bulkhead 24 of the embodiment of FIG. 27 and/or with other embodiments of partitions, such as the projection shown in the embodiment of FIG. 28.

Thermal Storage Subsystem

Optionally, some embodiments of the compressed gas energy storage system may include a thermal storage subsystem that can be used to absorb heat from the compressed gas that is being directed into the accumulator 12 (i.e. downstream from the compressor 112), sequester at least a portion of the thermal energy for a period of time, and then, optionally, release the heat back into gas that is being extracted/released from the accumulator 12 (i.e. upstream from the expander 116). In such examples, the gas may exit the compressor/expander subsystem 100, after being compressed, at an exit temperature of between about 180° C. and about 300° C. and may be cooled by the thermal storage subsystem to a storage temperature that is less than the exit temperature, and may be between about 30° C. and about 60° C. in some examples.

Figure 8:
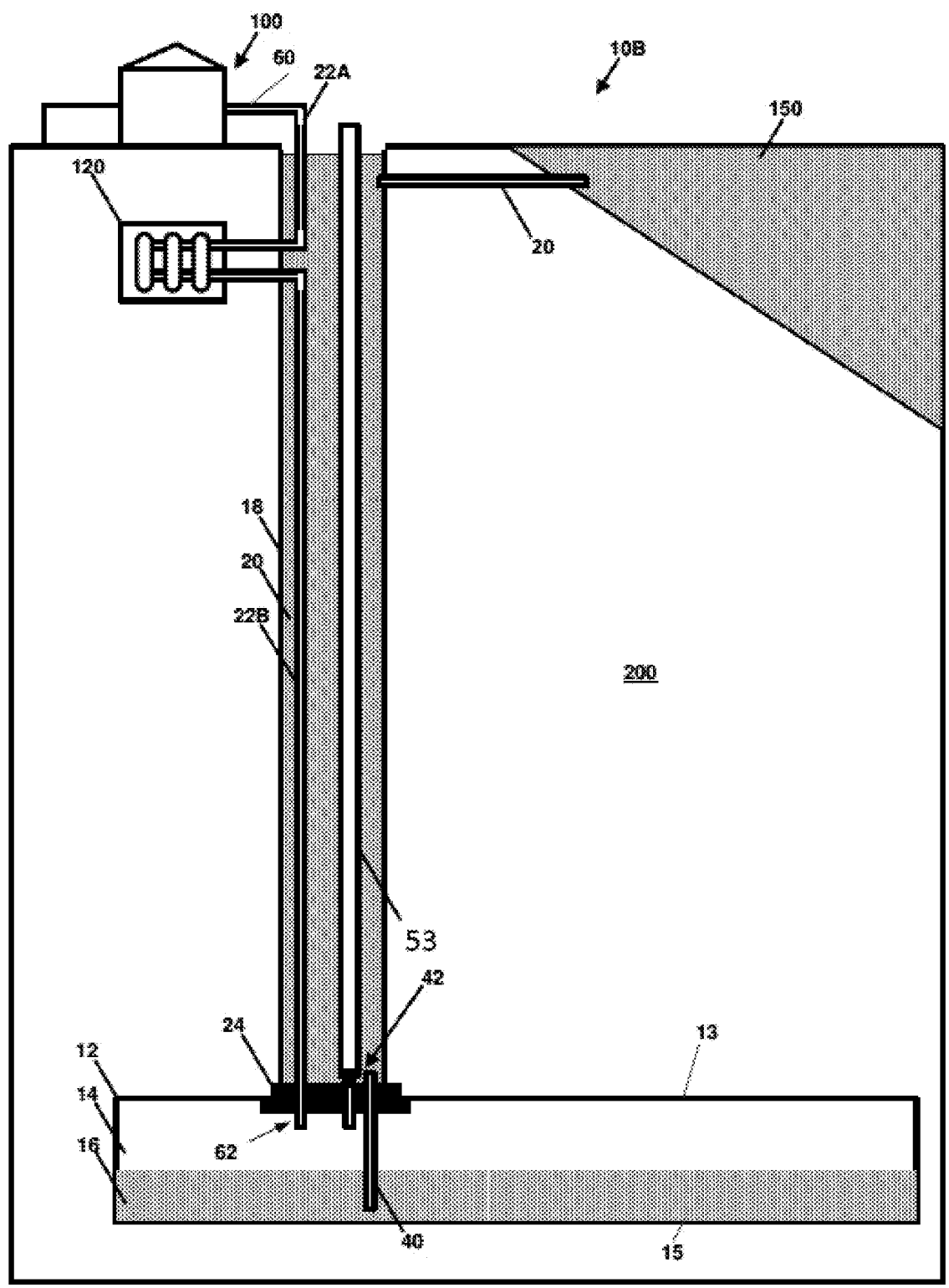
FIG. 8 is a schematic view of components of another example of a compressed gas energy storage system.

FIG. 8 is a sectional view of components of a compressed gas energy storage system 10B, according to an alternative embodiment. Compressed gas energy storage system 10B is similar to compressed gas energy storage systems 10 and/or 10A, with the addition of a thermal storage subsystem 120 that is provided in the gas flow path between the compressor/expander subsystem 100 and the accumulator 12. In this example, the gas conduit 22 that conveys the compressed gas between the compressed gas layer 14 and compressor/expander subsystem 100 includes an upper portion 22A that extends between the compressor/expander subsystem 100 and thermal storage subsystem 120, and a lower portion 22B that extends between thermal storage subsystem 120 and accumulator 12.

The thermal storage subsystem 120 may include any suitable type of thermal storage apparatus, including, for example latent and/or sensible storage apparatuses. The thermal storage apparatus(es) may be configured as single stage, two stage and/or multiple stage storage apparatus(es). The thermal storage subsystem 120, or portions thereof, may be located in any suitable location, including above-ground, below ground, within the shaft 18, within the accumulator 12, and the like. In the illustrated embodiment, the thermal storage subsystem 120 is located underground, which may help reduce the use of above-ground land, and employs multiple stages including, for example, multiple sensible and/or latent thermal storage stages such as stages having one or more phase change materials and/or pressurized water or other heat transfer fluid arranged in a cascade. It will be noted that, if operating the system for partial storage/retrieval cycles, the sizes of the stages may be sized according to the time cycles of the phase change materials so that the phase changes, which take time, take place effectively within the required time cycles.

In general, as gas is compressed by the compressor/expander subsystem 100 during an accumulation cycle and is conveyed for storage towards accumulator 12, the heat of the compressed gas can be drawn out of the compressed gas and into the thermal storage subsystem 120 for sensible and/or latent heat storage. In this way, at least a portion of the heat energy is saved for future use instead of, for example being leached out of the compressed gas into water 20 or in the liquid layer 16, and accordingly substantially lost (i.e. non-recoverable by the system 10).

Similarly, during an expansion cycle as gas is released from accumulator 12 towards compressor/expander subsystem 100 it can optionally be passed through thermal storage subsystem 120 to re-absorb at least some of the stored heat energy on its way to the expander stage of the compressor/expander subsystem 100. Advantageously, the compressed gas, accordingly heated, can reach the compressor/expander subsystem 100 at a desired temperature (an expansion temperature—that is preferably warmer/higher than the storage temperature, and may be within about 10° C. and about 60° C. of the exit temperature in some examples, that may help enable the expander to operate within its relatively efficient operating temperature range(s), rather than having to operate outside of the range with cooler compressed gas.

In some embodiments, the thermal storage subsystem 120 may employ at least one phase change material, preferably multiple phase change materials, multiple stages and materials that may be selected according to the temperature rating allowing for the capture of the latent heat. Generally, phase change material heat can be useful for storing heat of approximately 150 degrees Celsius and higher. The material is fixed in location and the compressed air to be stored or expanded is flowed through the material. In embodiments using multiple cascading phase change materials, each different phase change material represents a storage stage, such that a first type of phase change material may change phase thereby storing the heat at between 200 and 250 degrees Celsius, a second type of phase change material may change phase thereby storing the heat at between 175 and 200 degree Celsius, and a third type of phase change material may change phase thereby storing the heat at between 150 and 175 degrees Celsius. One example of a phase change material that may be used with some embodiments of the system includes a eutectic mixture of sodium nitrate and potassium nitrate, or the HITEC® heat transfer salt manufactured by Coastal Chemical Co. of Houston, Tex.

In embodiments of the thermal storage subsystem 120 employing sensible heat storage, pressurized water, or any other suitable fluid and/or coolant, may be employed as the sensible heat storage medium. Such water is pressurized and maintained at an operating pressure that is sufficient to generally keep the water in its liquid phase during the heat absorption process. Optionally, the pressurized water may be passed through a heat exchanger or series of heat exchangers to capture and return the heat to and from the gas stream that is exiting the accumulator, via conduit 22. Generally, sensible heat storage may be useful for storing heat of temperatures of 100 degrees Celsius and higher.

In some embodiments, a thermal storage subsystem 120 may combine both latent and sensible heat storage stages, and may use phase change materials with multiple stages or a single stage. Preferably, particularly for phase change materials, the number of stages through which air is conveyed during compression and expansion may be adjustable by controller 118. This may help the system 10 to adapt its thermal storage and release programme to match desired and/or required operating conditions.

Optionally, at least some of the gas conduit 22 may be external the shaft 18 so that it is not submerged in the water 20 that is held in the shaft 18. This may help insulate such portions of the gas conduit 22, and may help reduce heat transfer between the gas within the conduit 22 and the water 20. This may be particularly useful for portions of the gas conduit 22 that extend between the compressor/expander subsystem 100 and the thermal storage subsystem 120, as it may be generally desirable in some embodiments to transfer as much excess heat from the gas to the thermal storage subsystem 120, and reduce the likelihood of heat being transferred/lost in the water 20. Similar considerations can apply during the expansion stage, as it may be desirable for the warmed gas to travel from the thermal storage subsystem 120 to the compressor/expander subsystem 100 at a desired temperature, and while reducing the heat lost in transit.

Figure 9:
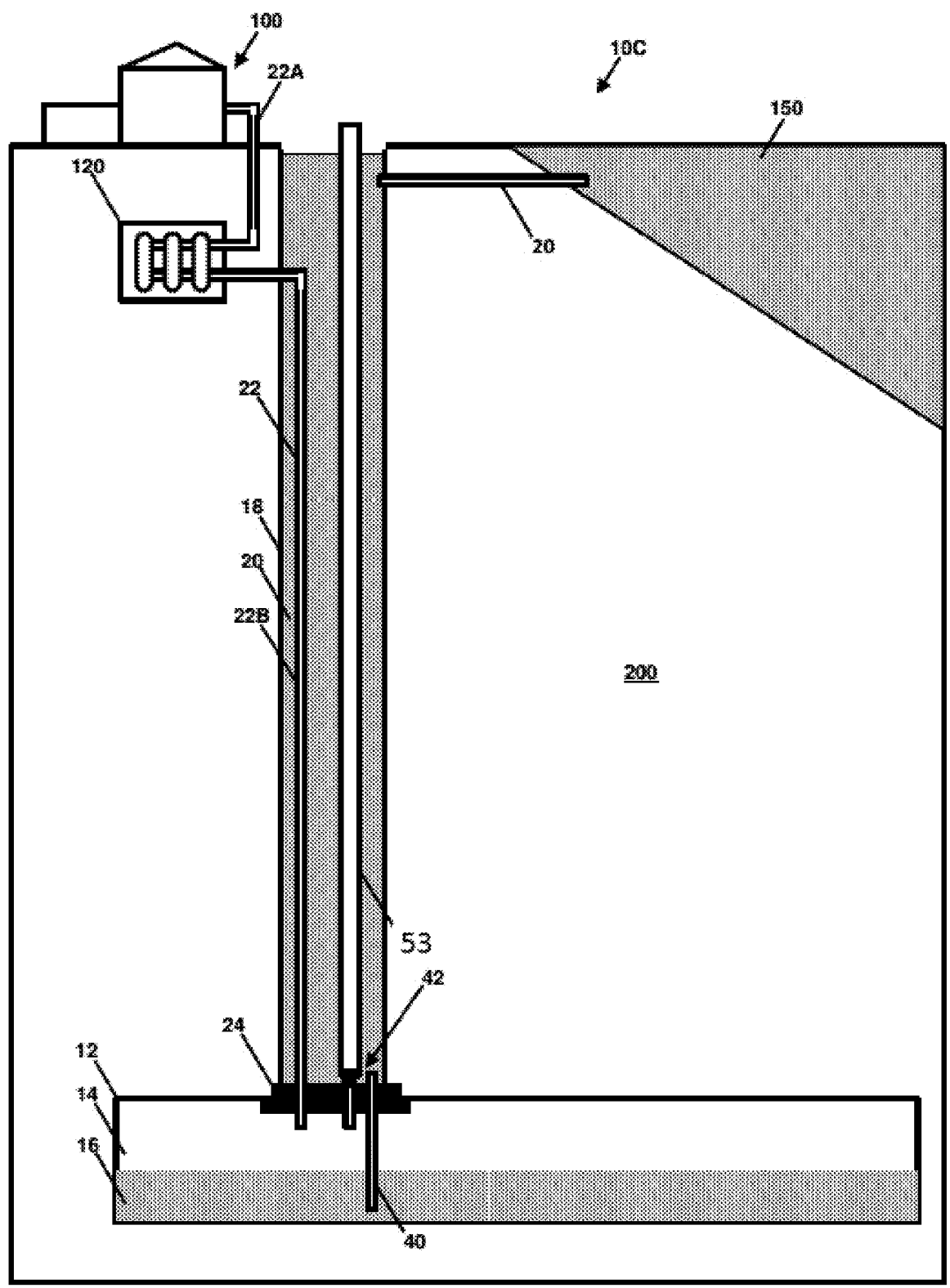
FIG. 9 is a schematic view of components of another example of a compressed gas energy storage system.

FIG. 9 is a schematic representation of a compressed gas energy storage system 10C, according to an alternative embodiment. Compressed gas energy storage system 10C is similar to the other compressed gas energy storage systems described herein, but is configured so that the upper portion 22A of the gas conduit 22 that conveys compressed gas between the thermal storage subsystem 120 and the compressor/expander subsystem 100 extends through the ground 200, and not through shaft 18 and water 20. Additional variations are possible.

Furthermore, while in embodiments illustrated the thermal storage subsystem 120 receives compressed gas from, or provides compressed gas to, the compressor/expander subsystem 100, alternatives are possible in which thermal storage is more tightly integrated with multiple stages of compressor 112 and multiple stages of expander 116 so as to store thermal energy between stages. This may be done to enable the pieces of equipment at downstream stages of compressor 112 and expander 116 to receive and handle compressed gas at a temperature that is within their most efficient operating ranges. For example, thermal storage subsystem 120 components may be positioned in the same or analogous manner as, and optionally in combination with, the heat exchangers 500a, 500b, 500c, etc. shown in the embodiments of FIGS. 11A-15 and as described herein. This may help facilitate heat transfer and/or storage at two or more stages in the process, which may help improve system efficiency.

Figure 16:
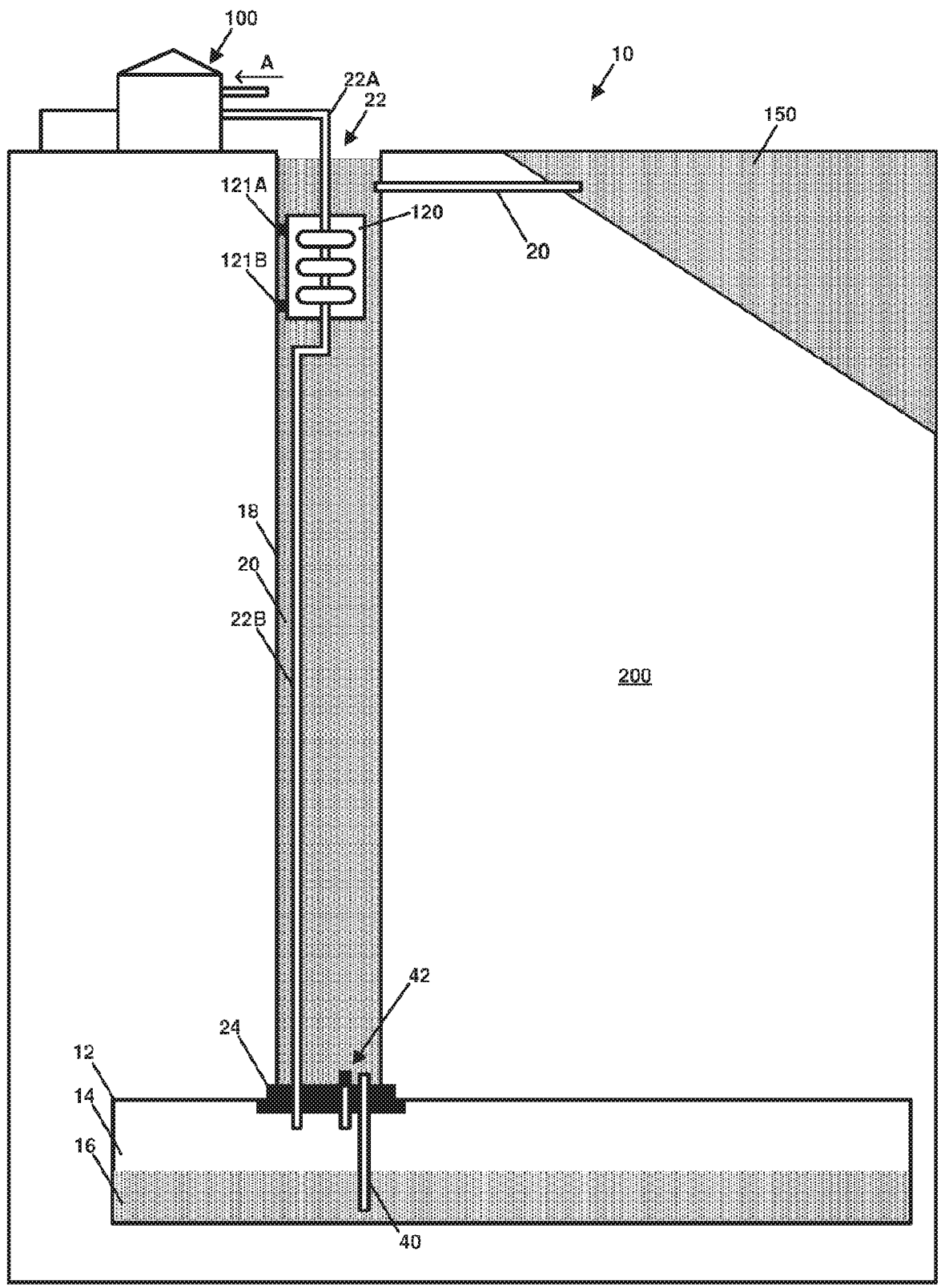
FIG. 16 is a schematic view of components of a compressed gas energy storage system, according to an embodiment.

Referring to FIG. 16, another example of a thermal storage subsystem 120 is immersed in the liquid 20 within the shaft 18 on supports 121A and 121B and conveys air from and to the compressor/expander subsystem 100 for storing and releasing heat from and to the conveyed air. In this arrangement, the thermal storage subsystem 120 exchanges heat between thermal storage material within the thermal storage subsystem 120 and the air being conveyed therethrough, thereby to deliver heat-exchanged air A' to the gas layer 14 in accumulator 12. In this embodiment, the thermal storage subsystem 120 has a single stage (for use with the single-stage compressor/expander subsystem 100) but includes a combination of multiple latent (L) and sensible (S) material sections.

In this embodiment, each of the latent material sections contains a respective amount of phase change material (PCM) and the sensible material section contains a respective amount of water or other liquid material, solid thermal mass or any other material that is suitable for absorbing heat. The amount and type of material is preferably established/selected for a given embodiment based on durations of storage and release phases of the specific compressed air energy storage system. This may help ensure that the time taken for the PCM to change phase or the liquid to heat up or cool down while storing or releasing heat is generally "matched" to the timing of the phase. This may help facilitate relatively efficient usage of the material itself for the heat storage and release function, as compared to using a PCM material that is too slow, or too quick to respond.

Figure 17:
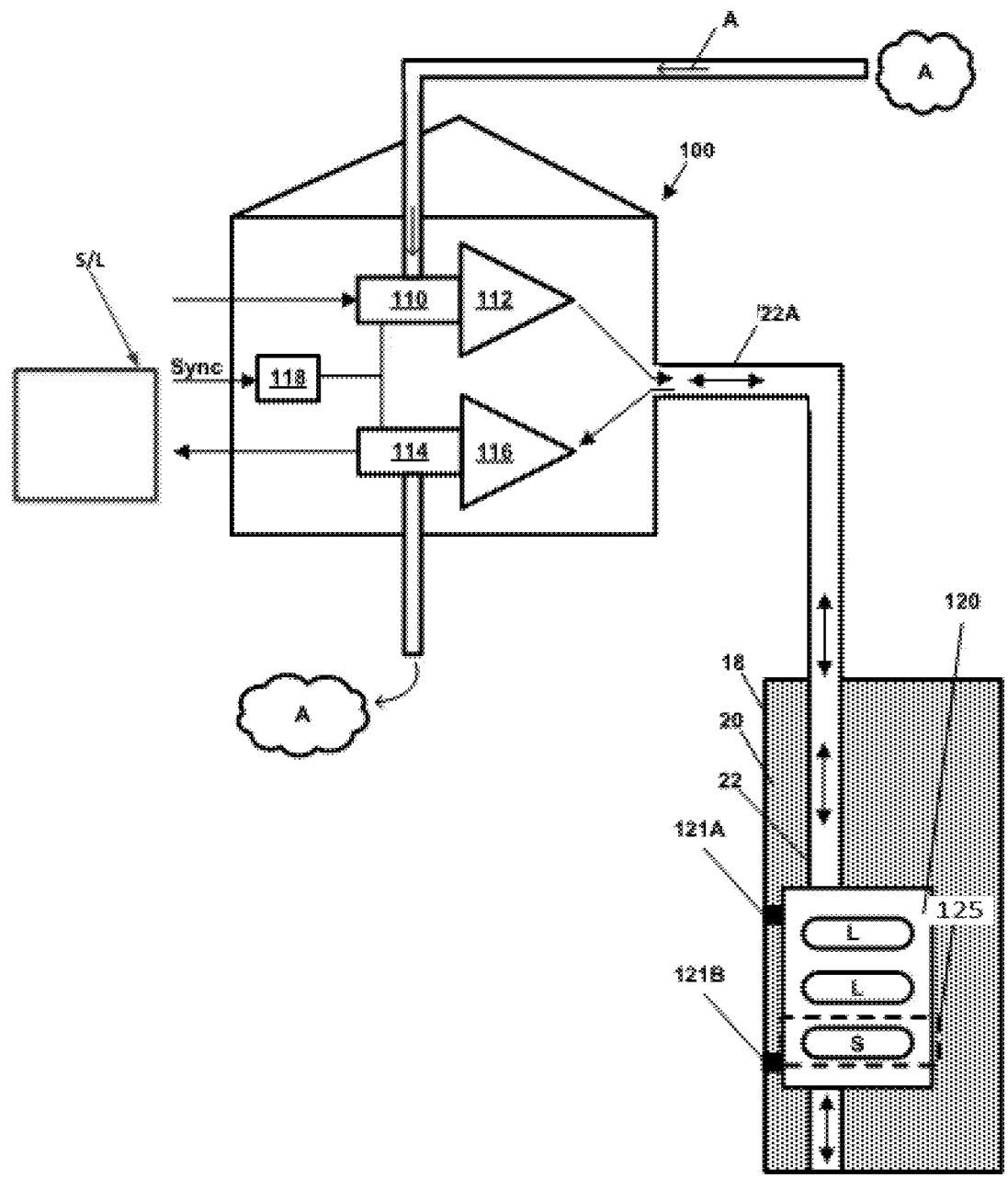
FIG. 17 is a schematic view of components of a compressor/expander subsystem for the compressed gas energy storage system, according to an embodiment.

Referring also to FIG. 17, optionally, an insulating "jacket" 125 (shown in dotted lines to not occlude portions of the thermal storage subsystem 120) can be wrapped around an upper portion of thermal storage subsystem 120 to provide some of thermal insulation between the liquid 20 in shaft 18 and the thermal storage subsystem 120 thereby to promote rapid heat stratification, which may help increase the performance of a PCM heat storage system. As described above, air A from the ambient entering compressor/expander subsystem 100 can be conditioned to become air A' (see FIGS. 11A and 11B) prior to its entry to the compressor 112 by passing the air through thermal storage subsystem 120 thereby to cause the air A' to be at a temperature suited for an efficient operating range of a particular stage of compressor 112.

Optionally, the controller 118 may also be configured to change the condition of the thermal storage subsystem 120 so as to change the nature of the heat being exchanged between air coming through the thermal storage subsystem 120 into the compressor 112 and the thermal storage material in the thermal storage subsystem 120, or to change routing of air to the compressor 112 so that it is not passing through thermal storage subsystem 120.

Figure 18:
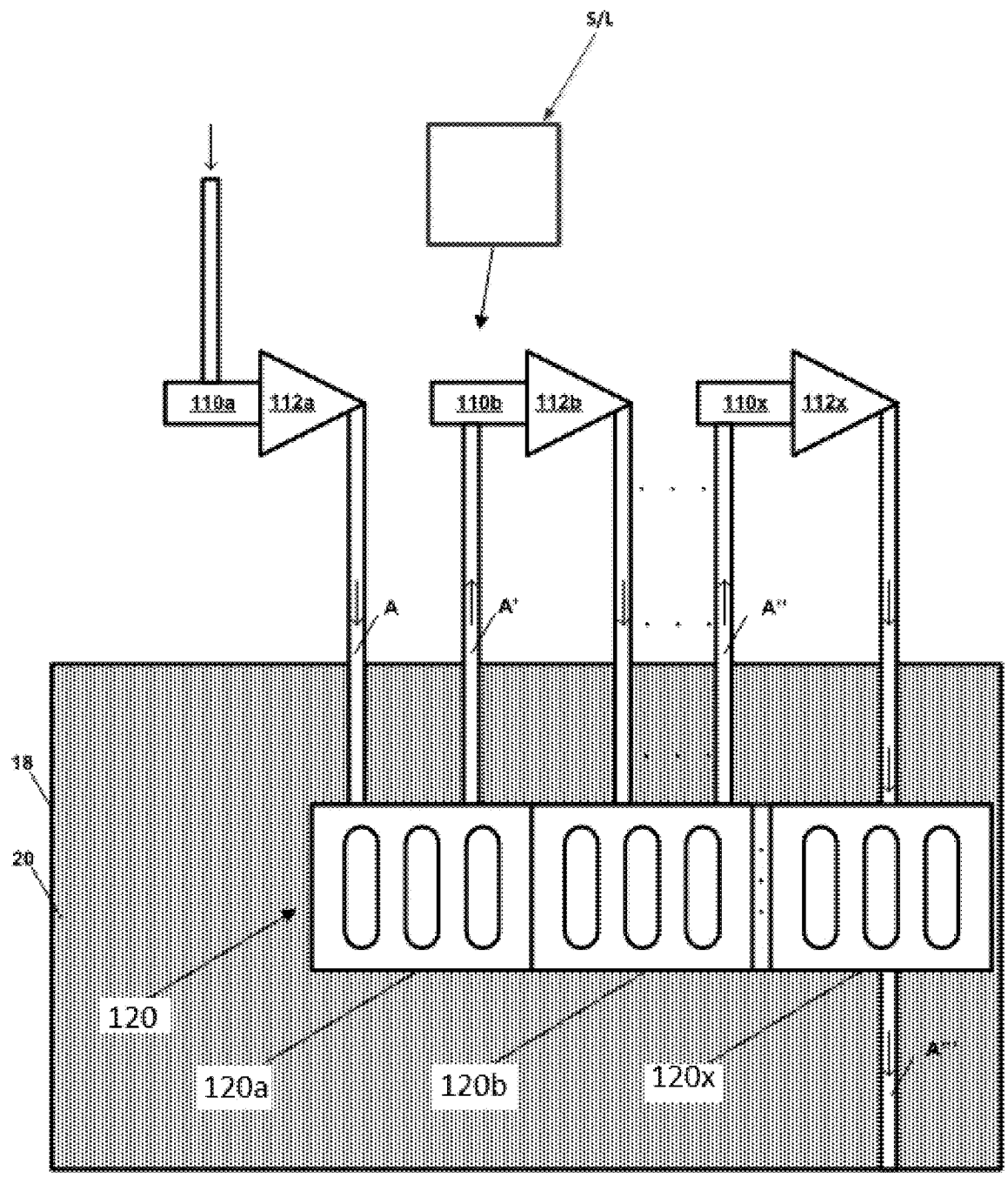
FIG. 18 is a schematic view of components of an alternative compressor/expander subsystem for a compressed gas energy storage system, with multiple compression stages each associated with a respective stage of a thermal storage subsystem.

FIG. 18 is a schematic view of components of an alternative compressor/expander subsystem 100 for a compressed gas energy storage system 10, with multiple compression stages and each is associated with a respective stage of a thermal storage subsystem 120. In particular, during a compression (storage) phase, incoming air from the ambient A is conveyed first, optionally via a heat exchanger to modify the temperature of the incoming air, into compressor 112a driven by motor 110a for a first stage of compression. Following the first stage of compression, air A is then conveyed through a first stage 120a of a thermal storage subsystem 120 to store heat removed from air A, thereby to be conditioned to be air A' which is then conveyed into compressor 112b driven by motor 110b for a second stage of compression. Following the second stage of compression, air A' is then conveyed through any additional stages of the thermal storage subsystem 120 such as second stage 120b of thermal storage subsystem 120 to store heat in the respective stages to be conditioned to be air A". A last stage of the thermal storage subsystem 120 is represented in this example as stage 120x which stores heat from the compressed air compressed by compressor 112x driven by motor 110x thereby to be conditioned to be air A'''. Following this $x^{th}$ stage of compression and thermal storage, the air A''' is conveyed down into accumulator 12 as has been described above with respect to other embodiments. The heat stored in the stages of the thermal storage subsystem 120 during a storage phase may be stored entirely for re-incorporating into air being released during a release phase as will be described, but may in some capacity or quantity be employed for some other purposes of the compressed gas energy storage system such as for helping to regulate temperature of another subsystem. It should be noted that, while three stages of compression with respective thermal storage stages are shown in FIG. 6, a compressed gas energy storage system according to this embodiment of the invention may have only two, or more than three stages of compression with respective thermal storage stages. Furthermore, in alternative embodiments a given stage of compression is not necessarily always followed by a stage of thermal storage. Furthermore, in alternative embodiments, incoming air that has not yet been compressed in the compressed gas energy storage system may first pass through a thermal storage subsystem or stage thereof to reduce its heat content prior to entering a compressor, rather than a heat exchanger that might dissipate the heat from the system.

Figure 19:
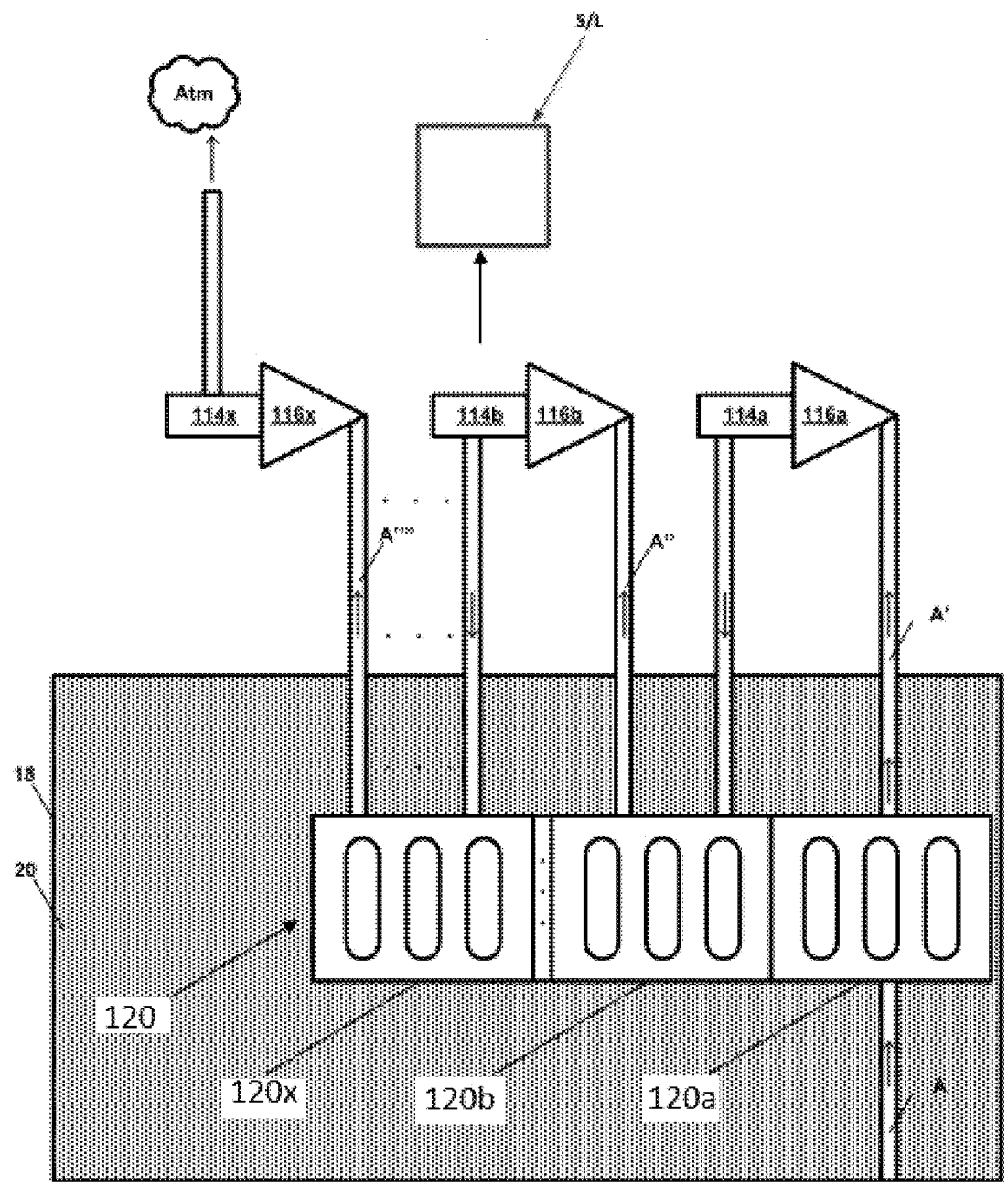
FIG. 19 is a schematic view of components of an alternative compressor/expander subsystem for a compressed gas energy storage system, with multiple expansion stages each associated with a respective stage of a thermal storage subsystem.

FIG. 19 is a schematic view of components of an alternative compressor/expander subsystem for a compressed gas energy storage system, with multiple expansion stages each associated with a respective stage of a thermal storage subsystem 120. In particular, during an expansion (release) phase, compressed air A released from accumulator 12 is first conveyed through a first stage 120a of a thermal storage subsystem 120 to incorporate heat from stage 120a into the air being conveyed thereby to be conditioned as air A'. Air A' is presented to a first expander 116a driving a generator 114a for a first stage of expansion. Following the first stage of expansion, air A' is then conveyed through a second stage 120b of thermal storage subsystem 120 to incorporate stored heat into the air being conveyed thereby to be conditioned to be air A", which is then conveyed into expander 116b driving generator 114b for a second stage of expansion. Following the second stage of compression, air A" is then conveyed through any additional stages of the thermal storage subsystem 120. A last stage of the thermal storage subsystem 120 is represented in this example as stage 120x which stores heat and releases the stored heat into compressed air being conveyed through stage 120x thereby to be conditioned to be air A'''. Following this $x^{th}$ stage of expansion and heat release from thermal storage, the air A''' is conveyed to the ambient atmosphere A as has been described above with respect to other embodiments. The heat stored in the stages of the thermal storage subsystem 120 may have been stored from incoming air being compressed during a storage phase of the compressed gas energy storage system, but alternatively or in some combination may have been stored during operation of another aspect or subsystem of the compressed gas energy storage system, such as during temperature regulation of another subsystem. It should be noted that, while three stages of expansion with respective thermal storage stages are shown in FIG. 19, a compressed gas energy storage system according to this embodiment of the invention may have only two, or more than three stages of expansion with respective thermal storage stages. Furthermore, in alternative embodiments a given stage of expansion is not necessarily always preceded in the processing chain by a stage of release of heat from thermal storage. Furthermore, in alternative embodiments, air being expanded (decompressed) may pass through heat exchanger as described herein, to gather heat rather than through a thermal storage subsystem or stage thereof to increase its heat content prior to entering an expander.

Figure 20:
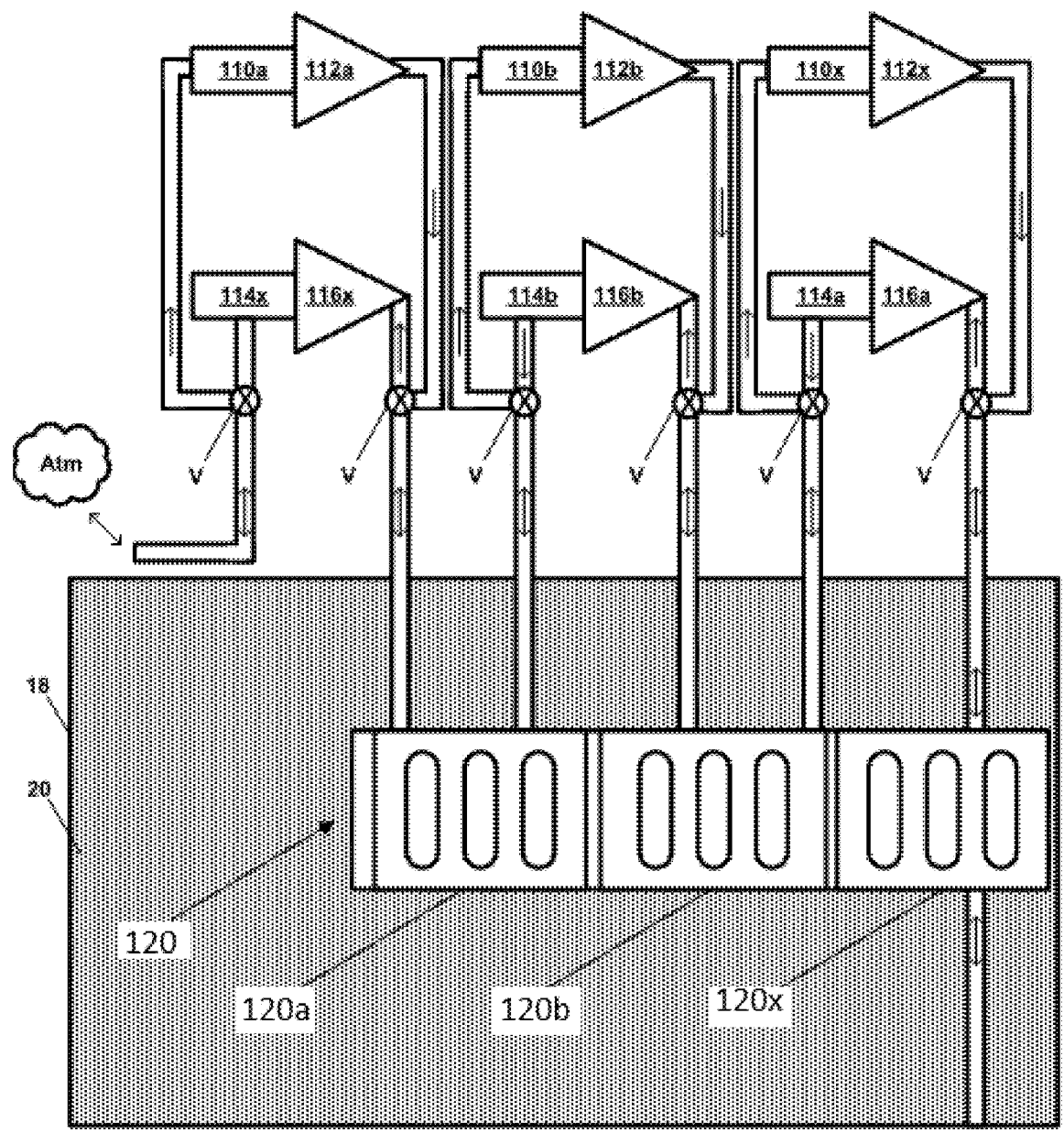
FIG. 20 is a schematic view of components of an alternative compressor/expander subsystem for a compressed gas energy storage system, with pairs of compression and expansion stages each associated with a respective stage of a thermal storage subsystem.

FIG. 20 is a schematic view of components of an alternative compressor/expander subsystem for a compressed gas energy storage system, with pairs of compression and expansion stages each associated with a respective stage of the thermal storage subsystem 120. In this embodiment, a given phase of the thermal storage subsystem 120 is used during both the compression and expansion stages, by routing air being conveyed into the accumulator 12 through the thermal storage subsystem 120 to remove heat from the air either prior to a subsequent stage of compression or prior to storage, and routing air being conveyed out of accumulator 12 through the thermal storage subsystem 120 to add heat to the air either after release from accumulator or after a stage of expansion. In a sense, therefore, pairs of compression and expansion stages share a stage 120a, 120b, 120x of the thermal storage subsystem 120 and airflow is controlled using valves V, as shown in the Figure. This embodiment is appropriate where the "same" heat stored from compressed air being conveyed towards the accumulator 12 during a storage phase is to be released into the air being released from the accumulator 12 during a release phase.

Figure 21:
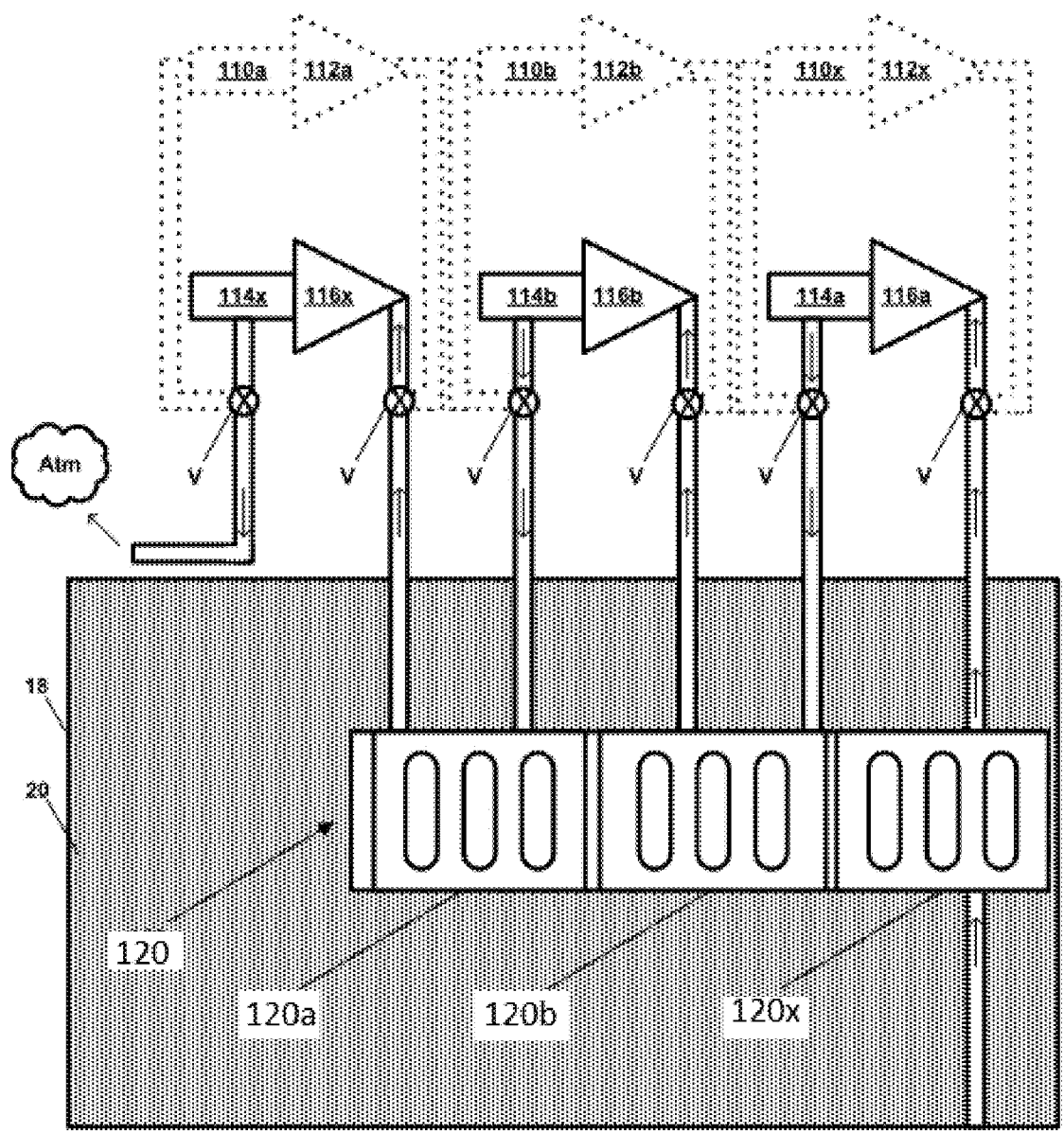
FIG. 21 is a schematic view of components of the alternative compressor/expander subsystem of FIG. 20, showing airflow during an expansion (release) phase from storage through multiple expanders and respective stages of a thermal storage subsystem.

FIG. 21 is a schematic view of components of the alternative compressor/expander subsystem of FIG. 20, showing airflow during an expansion (release) phase from storage through multiple expander stages and multiple respective stages of the thermal storage subsystem 120. In this phase, through control of valves V, airflow is directed through multiple expansion stages in a manner similar to that shown in FIG. 19. The dashed lines show multiple compression stages to which is prevented during an expansion phase by the control of valves V.

Figure 22:
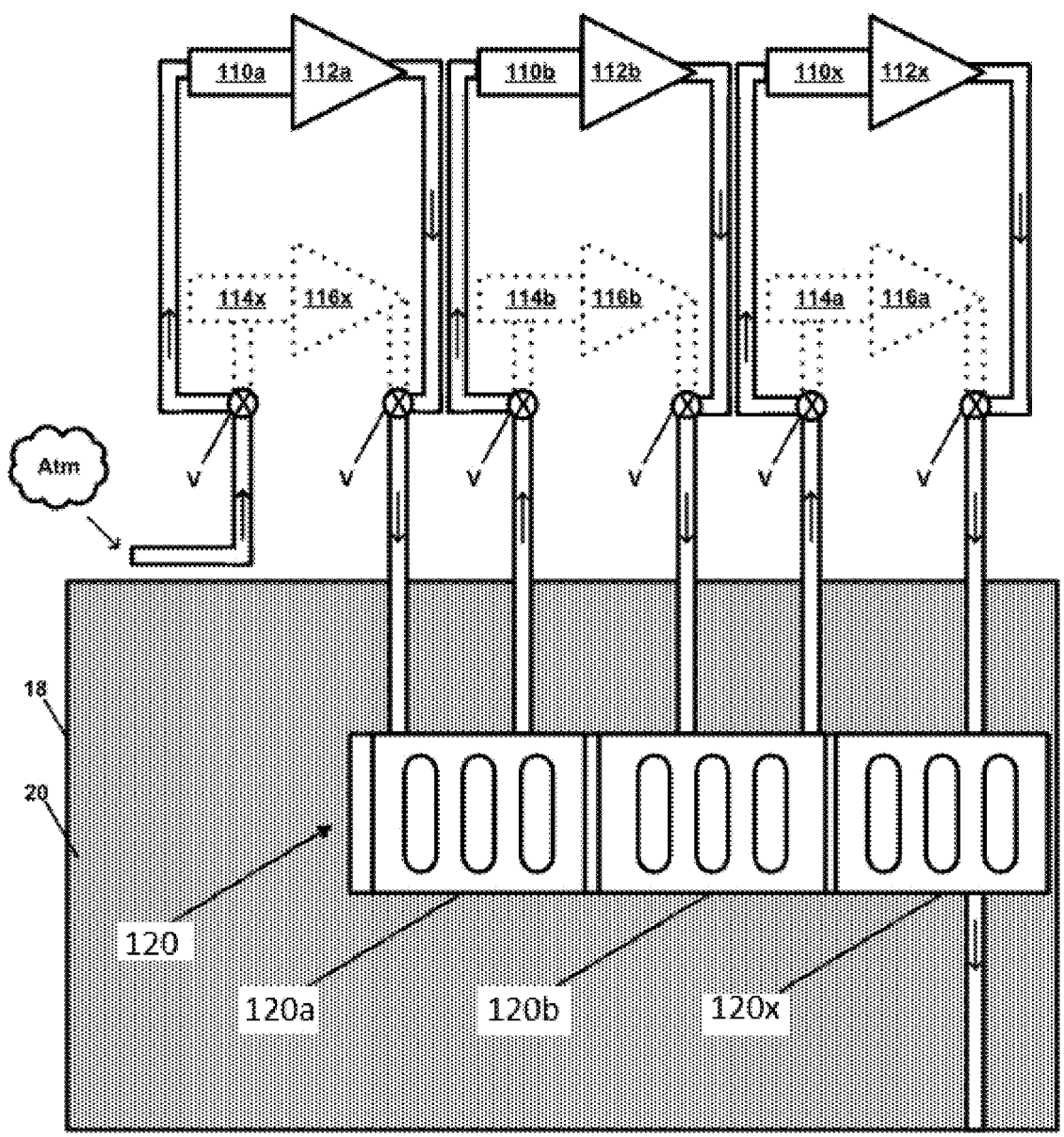
FIG. 22 is a schematic view of components of the alternative compressor/expander subsystem of FIG. 20, showing airflow during a compression (storage) from the ambient through multiple compressors and respective stages of a thermal storage subsystem.

FIG. 22 is a schematic view of components of the alternative compressor/expander subsystem of FIG. 20, showing airflow during a compression (storage) phase from the ambient A through multiple compressor stages and multiple respective stages of the thermal storage subsystem 120. In this phase, through control of valves V, airflow is directed through multiple compression stages in a manner similar to that shown in FIG. 18. The dashed lines show multiple expansion stages the airflow to which is prevented during the compression phase by the control of valves V.

Figure 23:
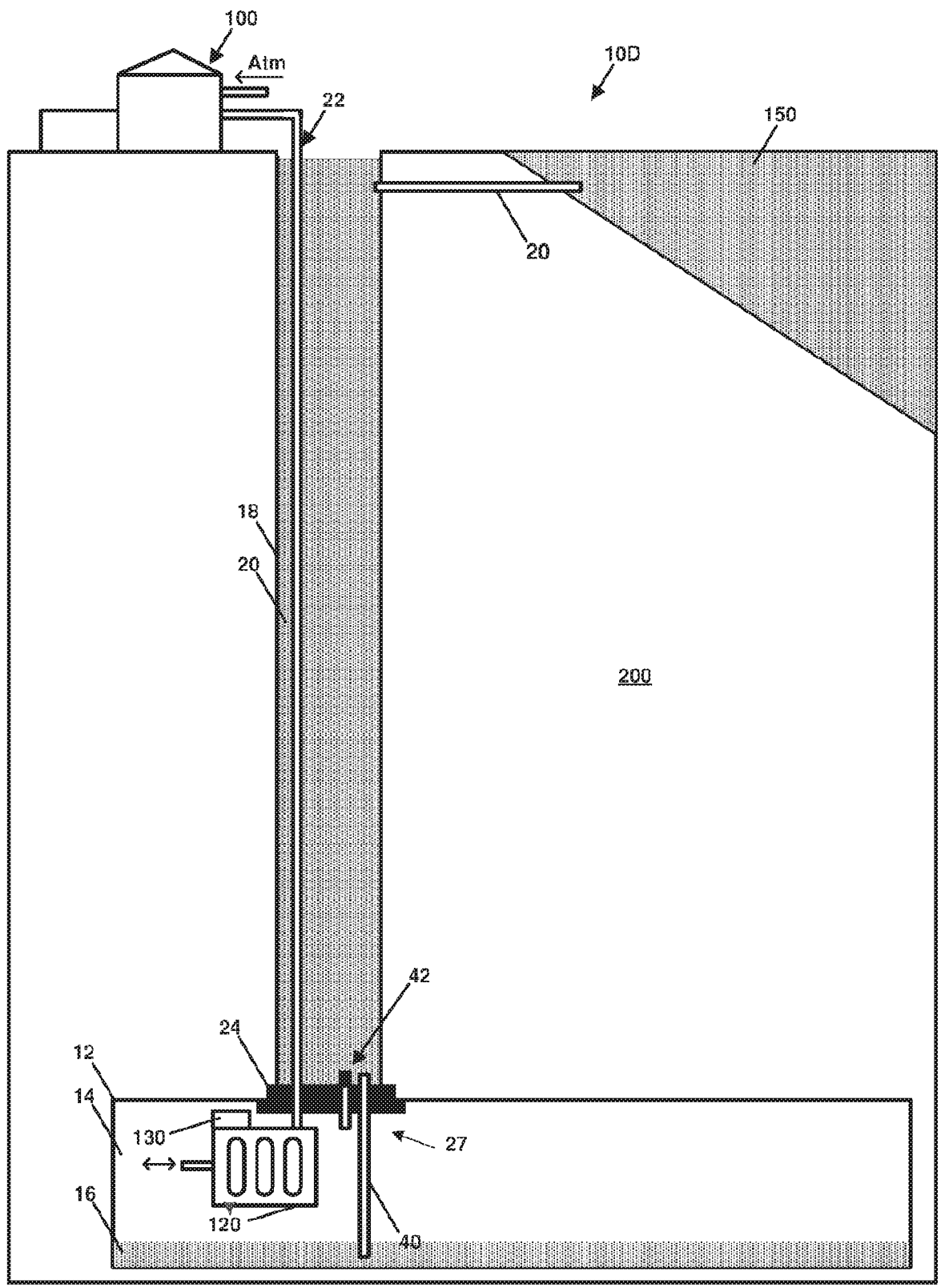
FIG. 23 is a schematic view of components of a compressed gas energy storage system, according to an alternative embodiment.

FIG. 23 is a sectional view of components of an alternative compressed gas energy storage system 10D, according to an embodiment. In this embodiment, compressed gas energy storage system 10D is similar to the other embodiments of the compressed gas energy storage systems described herein. However, in this embodiment the thermal storage subsystem 120 is located within the accumulator 12 and is immersed within the compressed gas in compressed gas layer 14. The thermal storage subsystem 120 may be positioned within the accumulator 12 during construction via the opening 27 that is thereafter blocked with bulkhead 24 prior to filling shaft 18 up with liquid 20. The thermal storage subsystem 120 can thus be designed to allow for the construction, insulation, etc. to be completed prior to placement within the accumulator 12 and/or is constructed in easily-assembled components within the accumulator 12. This allows for the units to be highly insulated and quality-controlled in their construction, which enables the thermal storage subsystem 120 to be generally independent of the accumulator 12, with the exception of anchoring support (not shown).

Optionally, a regulating valve 130 associated with the interior of thermal storage subsystem 120 may be provided and configured to open should the pressure within the thermal storage subsystem 120 become greater than the designed pressure-differential between its interior and the pressure of the compressed gas layer 14 in the surrounding accumulator 12. Pressure within the thermal storage subsystem 120 may be maintained at a particular level for preferred operation of the latent or sensible material. For example, heated water as a sensible material may be maintained at a particular pressure. The regulating valve 130 may open to allow the pressurized gas in the interior to escape to the accumulator 12 and can close once the pressure differential is lowered enough to reach a designated level. In an alternative embodiment, such a regulating valve may provide fluid communication between the interior of the thermal storage subsystem 120 and the ambient A at the surface thereby to allow gas to escape to the ambient rather than into the accumulator 12. While thermal storage subsystem 120 is shown entirely immersed in the compressed gas layer 14, alternative thermal storage subsystems 120 may be configured to be immersed partly or entirely within liquid layer 16.

Figure 24:
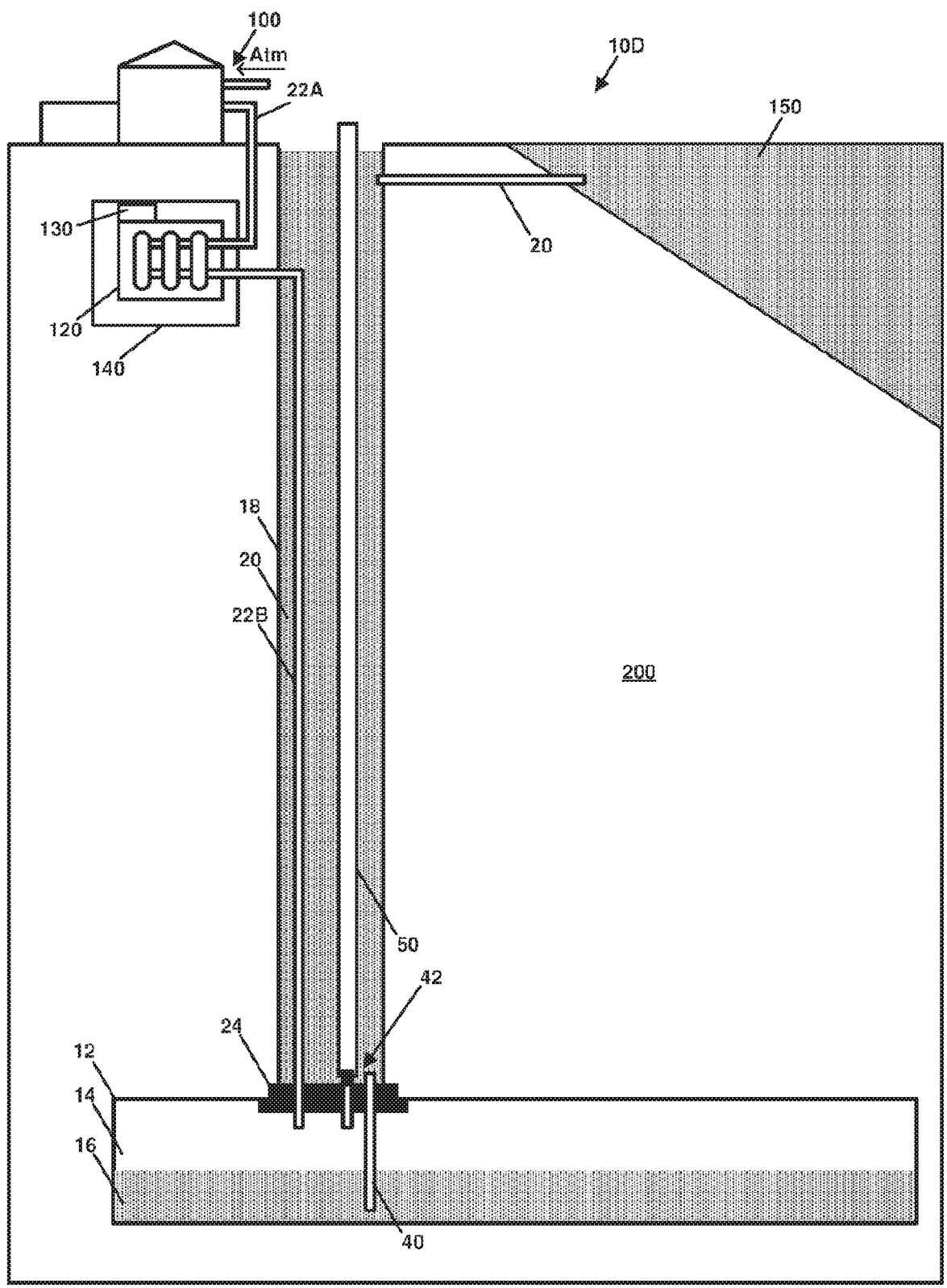
FIG. 24 is a schematic view of components of an alternative compressed gas energy storage system, according to another alternative embodiment.

FIG. 24 is a sectional view of components of an alternative compressed gas energy storage system 10E, according to another alternative embodiment. In this embodiment, compressed gas energy storage system 10E is similar to above-described compressed gas energy storage systems. However, the thermal storage subsystem 120 is located within an isobaric pressurized chamber 140 within ground 200 that may be maintained at the same pressure as is accumulator 12, or a pressure that is substantially similar to the accumulator pressure or optionally at a pressure that is less than or greater than the accumulator pressure. Optionally, the thermal storage subsystem 120 may be positioned within the pressurized chamber 140 during construction via an opening that is thereafter blocked so the chamber 140 may be pressurized to a working pressure that is, preferably, greater than atmospheric pressure. The thermal storage subsystem 120 can thus be designed to allow for the construction, insulation, etc. to be completed prior to placement within the chamber 140 and/or is constructed in easily-assembled components within the chamber 140. This allows for the units to be highly insulated and quality-controlled in their construction, which enables the thermal storage subsystem 120 to be generally independent of the chamber 140, with the exception of anchoring support (not shown). A regulating valve 130 associated with the interior of thermal storage subsystem 120 is provided and configured to open should the pressure within the thermal storage subsystem 120 become greater than the designed pressure-differential between the interior and the surrounding pressurized chamber 140. Pressure within the thermal storage subsystem 120 may be required to be maintained at a particular level for optimal operation of the latent or sensible material. For example, heated water as a sensible material may be required to be maintained at a particular pressure. The regulating valve 130 opens to allow the pressurized gas in the interior to escape to the pressurized chamber 140 and will close once the pressure differential is lowered enough to reach a designated level. In an alternative embodiment, such a regulating valve 130 may provide fluid communication between the interior of the thermal storage subsystem 120 and the ambient A at the surface thereby to allow gas to escape to the ambient rather than into the pressurized chamber 140.

Locating the thermal storage subsystem 120 above the accumulator 12, and thus physically closer to the compression/expansion subsystem 100, may help reduce the length of piping required, which may help reduce the costs of piping, installation and maintenance, as well as reduced fluid-transfer power requirements.

While the embodiment of compressed gas energy storage system 10E includes an isobaric pressure chamber 140, alternatives are possible in which the chamber 140 is not strictly isobaric. Furthermore, in alternative embodiments the pressurized chamber 140 may be in fluid communication with gas layer 14 and thus can serve as a storage area for compressed gas being compressed by compressor/expander subsystem 100 along with accumulator 12. In this way, the pressure of the gas in which the thermal storage subsystem 120 is immersed can be maintained through the same expansions and compressions of gas being conveyed to and from the accumulator 12.

Furthermore, while in embodiments described above thermal storage subsystem 120 is buried below-ground, it will be understood that such a thermal storage subsystem 120 may be above-ground in tanks and/or may be below ground in a cavern that is connected to shaft 18 but is partitioned off after construction.

Heat Exchangers

Optionally, the compressed gas storage systems 10 described herein may be provided with one or more heat exchangers (or the like) that can be incorporated into the compressor/expander subsystem 100, for example to help adjust the temperature of the gas as it passes through the compressor 112 and/or expander 116, and optionally as it travels between two or more compression and/or expansion stages. Such heat exchangers can be of any suitable type and can be placed in any suitable location within the system 10, and optionally can be positioned inside the shaft 18 and at least partially submerged within the water 20 therein such that the water 20 can operate as a heat source/sink for the exchangers.

Figure 10:
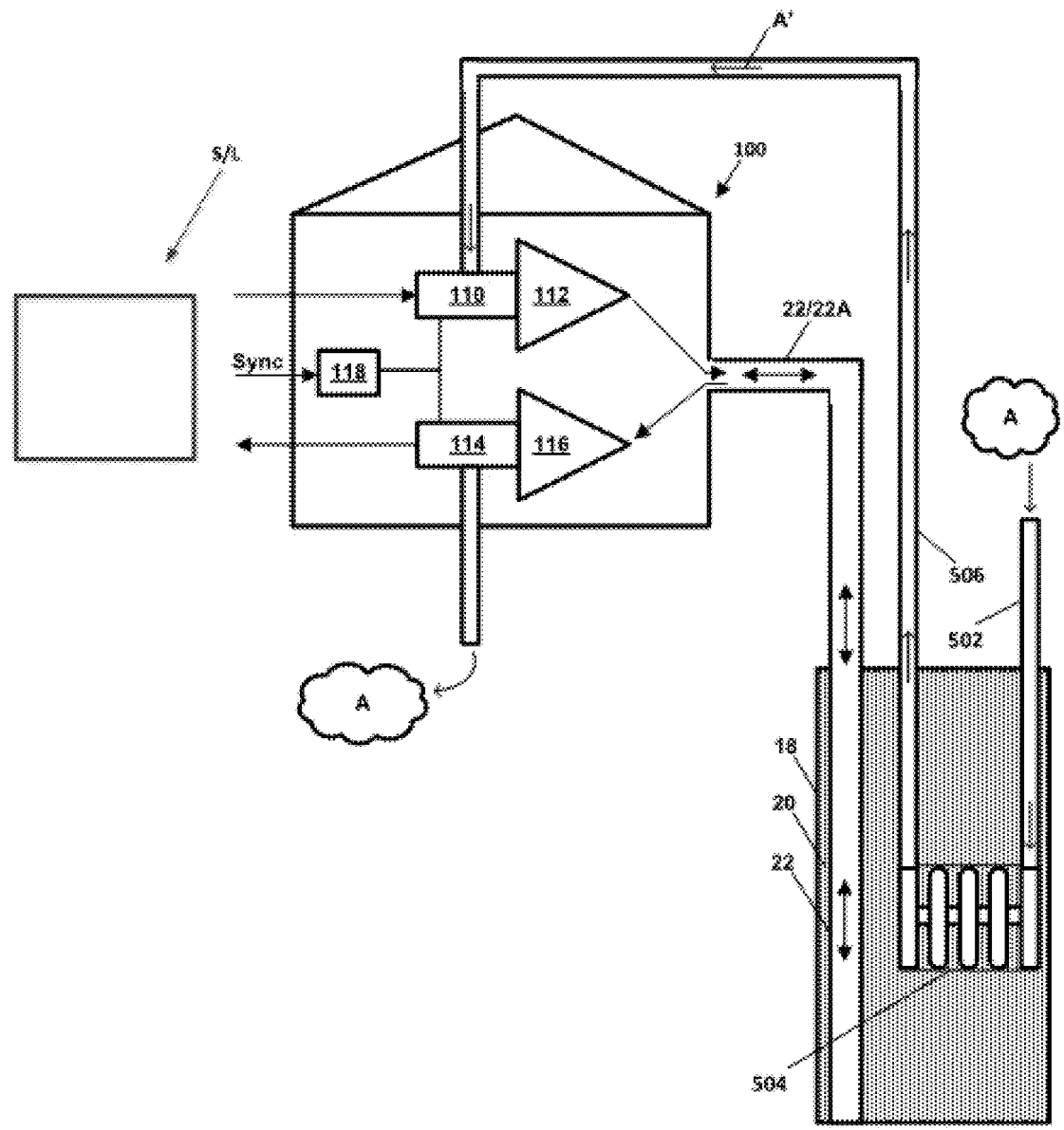
FIG. 10 is a schematic view of components of a compressor/expander subsystem for the compressed gas energy storage system, according to an embodiment.

As shown in FIG. 10, one example of a heat exchanger 500 is immersed in the liquid 20 within the shaft 18 and, and is positioned upstream from the compressor/expander subsystem 100—such that ambient air A to travels through the heat exchanger 500 prior to reaching the compressor/expander subsystem 100. The heat exchanger 500 exchanges heat between the liquid 20 in the shaft 18 and the air being conveyed by the heat exchanger 500, and can deliver heat-exchanged (i.e. warmed or cooled) air A' to the compressor/expander subsystem 100.

In this embodiment, the heat exchanger 500 comprises a radiator 504 having an air path immersed in the liquid 20 within the shaft 18. An air input conduit 502 extends from outside of the liquid 20 to the radiator 504 to receive and convey atmospheric air A to an air path of the radiator. In this embodiment, a rain cover and dust filter can be provided to protect the opening of air input conduit 502.

An air output conduit 506 extends from the radiator 504 to receive and convey the atmospheric air after heat exchange A' from the air path to the compressor/expander subsystem 100. In this embodiment, the radiator 504 is constructed of generally thermally conductive piping that can be suitable for exposure to the water 20 and for use in the expected temperature, flow and corrosion conditions. In this embodiment, the piping is made of stainless steel, but other materials may be used, such as other metals, plastic, combinations thereof and the like.

Optionally, the radiator 504 may be suspended within shaft 18 using suspension brackets (not shown) affixed to the inner surface of the wall of shaft 18. In this embodiment, radiator 504 is mounted on brackets with removeable pins, or other such detachable coupling, to allow for the removal of the radiators for servicing without the need to remove the liquid in shaft 18. In an alternative embodiment, radiator 504 may be hung from a weight-bearing bar or bars extending across the shaft 18, and can be un-hung and pulled out of shaft 18 for maintenance or replacement. In an embodiment, radiator 504 is preferably shaped so that, despite being placed in shaft 18, it does not unduly inhibit flow of water between accumulator 12 and replenishment conduit 58. As such, it may be generally vertically positioned in the shaft as shown in the figures thereby to take up little cross-sectional area of the shaft 18. However, in other embodiments the radiator 504 may be oriented horizontally to double as a grating of sorts to prevent large objects accidentally entering shaft 18 from above from sinking down to the bottom of shaft 18.

Optionally, in some embodiments the heat exchanger 500 that is provided upstream from the compressor 112 need not be positioned within the shaft 18, and may be located in another suitable location. In such embodiments, the heat exchanger 500 may still be fluidly connected to the interior 54 of the shaft 18, and may be configured to utilize water from within the shaft 18 as one stream in the heat exchanger 500. This can help facilitate the exchange of heat between the air entering the compressor 112 and the water within the shaft 18. The heat exchanger 500 in such embodiments may be any suitable type of heat exchanger that can facilitate transfer of heat between a gas stream and a liquid stream including, for example, a direct contact heat exchanger, a tube and shell heat exchanger, a plate and frame heat exchanger, boiler, evaporative cooler, spiral heat exchanger, hair pin heat exchanger and the like.

In the illustrated example, the compressor/expander subsystem 100 includes a compressor 112 of single or multiple stages, driven by a motor 110 that is controlled using controller 118. Compressor 112 is driven by motor 110 during an accumulation stage of operation, and draws in atmospheric air A, compresses the air, and forces it down into gas conduit 22/22A for storage in accumulator 12 (via thermal storage subsystem 120 in embodiments including same). Compressor/expander subsystem 100 also includes an expander 16 driven by compressed air exiting from gas conduit 22/22A during an expansion stage of operation and, in turn, driving generator 114 to generate electricity. After driving the expander 116, the expanded air is conveyed for exit to the atmosphere A. As described above, air A from the ambient entering compressor/expander subsystem 100 is conditioned to become air A' prior to its entry to the compressor 112 by passing the air through heat exchanger 500 thereby to cause the air A' to be at a temperature suited for an efficient operating range of a particular stage of compressor 112.

Controller 118 may also be configured to change the condition of the heat exchanger(s) 500 so as to change the nature of the heat being exchanged between air coming through the heat exchanger 500 into the compressor 112 and the liquid 20 in the shaft 18, or to change routing of air to the compressor 112 so that it is not passing through heat exchanger 500.

Figure 11A:
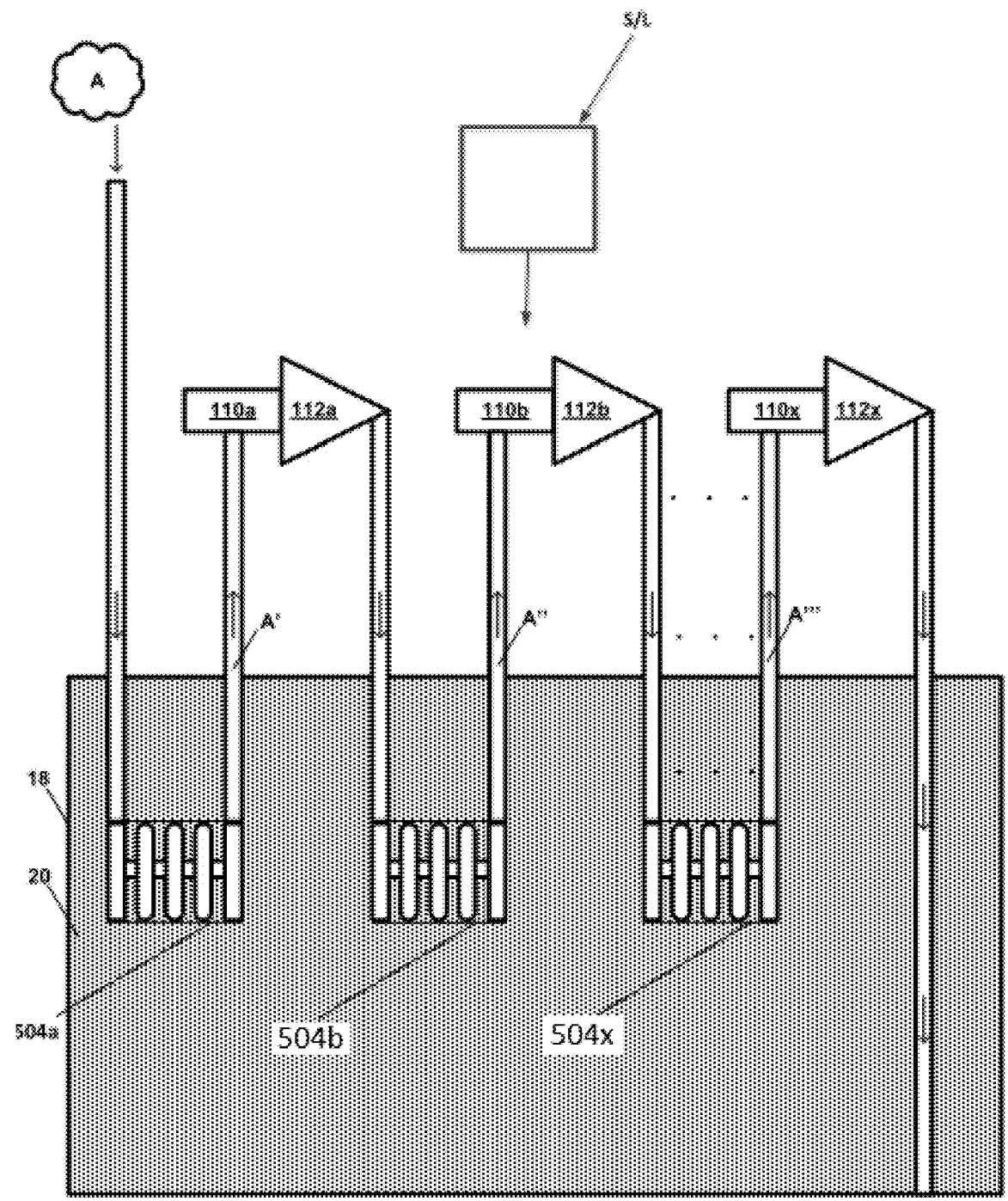
FIG. 11A is a schematic view of components of an alternative compressor/expander subsystem for a compressed gas energy storage system, with multiple compression stages each associated with a respective heat exchanger.

FIG. 11A is a schematic view of components of an alternative compressor/expander subsystem 100 for a compressed gas energy storage system, with multiple compression stages each associated with a respective heat exchanger. In particular, during a compression (storage) phase, incoming air from the ambient A is conveyed first through a first heat exchanger 504a to exchange heat with water 20 in shaft 18, thereby to be conditioned to be air A' which is then conveyed into compressor 112a driven by motor 110a for a first stage of compression. Following the first stage of compression, air A' is then conveyed through a second heat exchanger 504b to exchange heat with water 20 in shaft 18, thereby to be conditioned to be air A" which is then conveyed into compressor 112b driven by motor 110b for a second stage of compression. Following the second stage of compression, air A" is then conveyed through any additional compression stages including respective heat exchangers. A last heat exchanger is represented in this example as heat exchanger 504x which exchanges heat with water 20 in shaft 18, thereby to be conditioned to be air A''' which is then conveyed into compressor 112x driven by motor 110x for an "$x^{th}$" stage of compression. Following this $x^{th}$ stage of compression, the air is conveyed down into accumulator 12 as has been described above with respect to other embodiments.

Optionally, one or more heat exchangers 500 may be positioned in other locations within the fluid flow path, and need not be disposed within the shaft 18. In some configurations, a heat exchanger 500 that is external the shaft 18 may be fluidly connected to the shaft 18, such as via suitable fluid conduits, such that the heat exchanger 500 can still be configured to exchange heat between the air and the water 20 within the shaft 18. For example, as shown in the alternative embodiment of FIG. 11B.

Figure 11B:
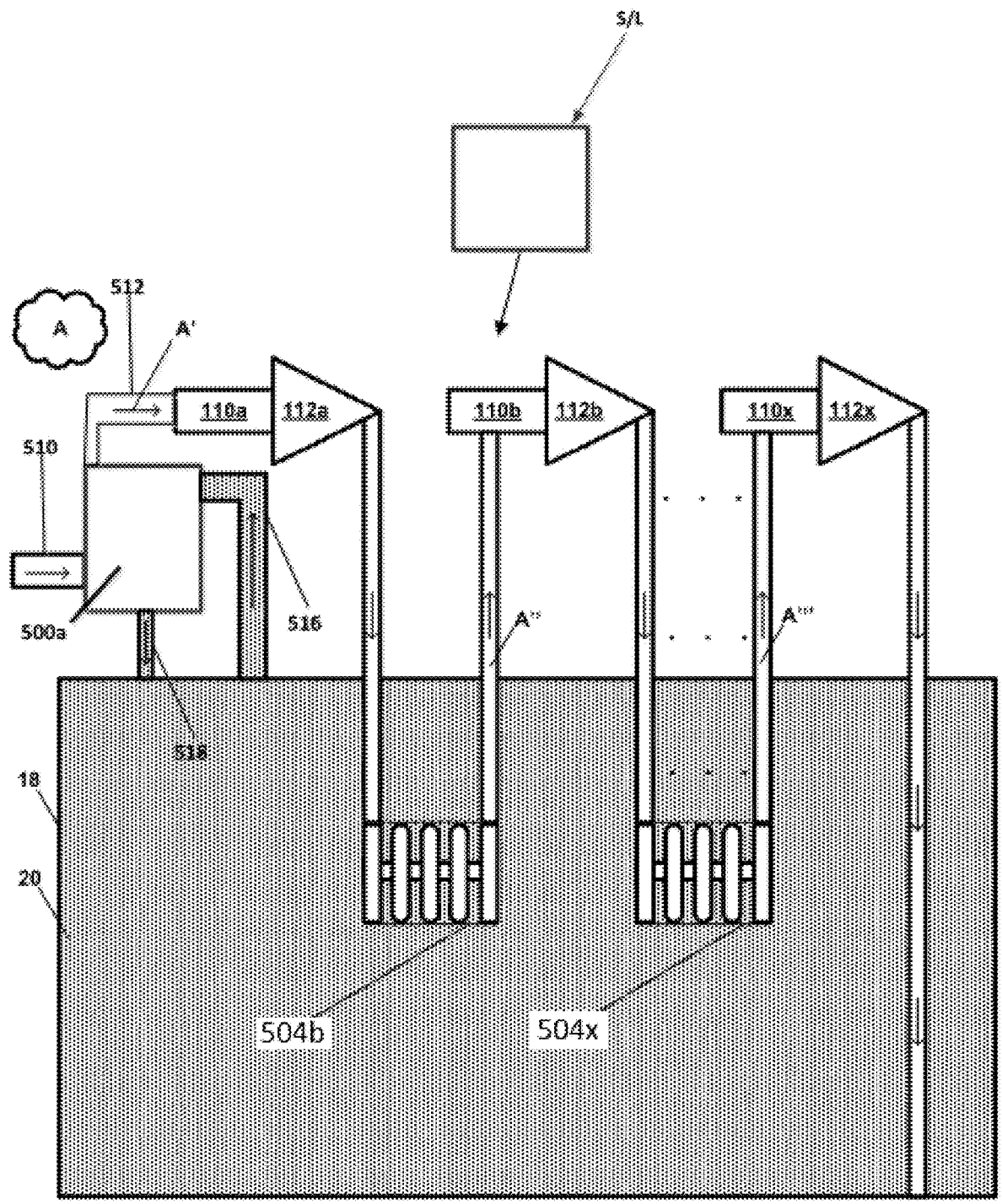
FIG. 11B is a schematic view of components of an alternative compressor/expander subsystem for a compressed gas energy storage system, with multiple compression stages each associated with a respective heat exchanger

It should be noted that, while three stages of compression with respective heat exchangers are shown in FIGS. 11A and 11B, it will be understood that a compressed gas energy storage system according to this embodiment of the invention may have only two, or more than three stages of compression with respective heat exchangers. The heat exchangers used in such embodiments may be of any suitable type, including direct contact, tube and shell and plate frame heat exchangers.

Referring to FIG. 11B, in this example the heat exchanger 500a is outside the shaft 18 and is not submerged in the water 20. Preferably the heat exchanger 500a can be located proximate the first compressor 112a. This heat exchanger 500a is preferably configured as a direct contact heat exchanger, in which air that is drawn in from the ambient environment A is brought into direct physical contact with liquid, which in this case is water 20 drawn from the shaft 18. A gas inlet 510 is configured to draw in air from the environment, and a gas outlet 512 is connected in fluid connection upstream from the first compressor 112a. A water inlet is fluidly connected to the water 20 via an inlet conduit 516 to draw water from the shaft 18. Preferably, water exiting the heat exchanger 504a, via a water outlet conduit, can be returned to the shaft 18 via an outlet conduit 520. Alternatively, water can be supplied to the heat exchanger 504a from a source other than the shaft 18, and water exiting the heat exchanger 504a may be directed to an alternative drain or sink, rather than being returned to the shaft 18. The direct contact heat exchanger 504a can be configured as a co-flow (air and water flow in the same direction) or counterflow (air and water flow in opposite directions) heat exchanger, and may include two or more stages if desired.

Figure 12:
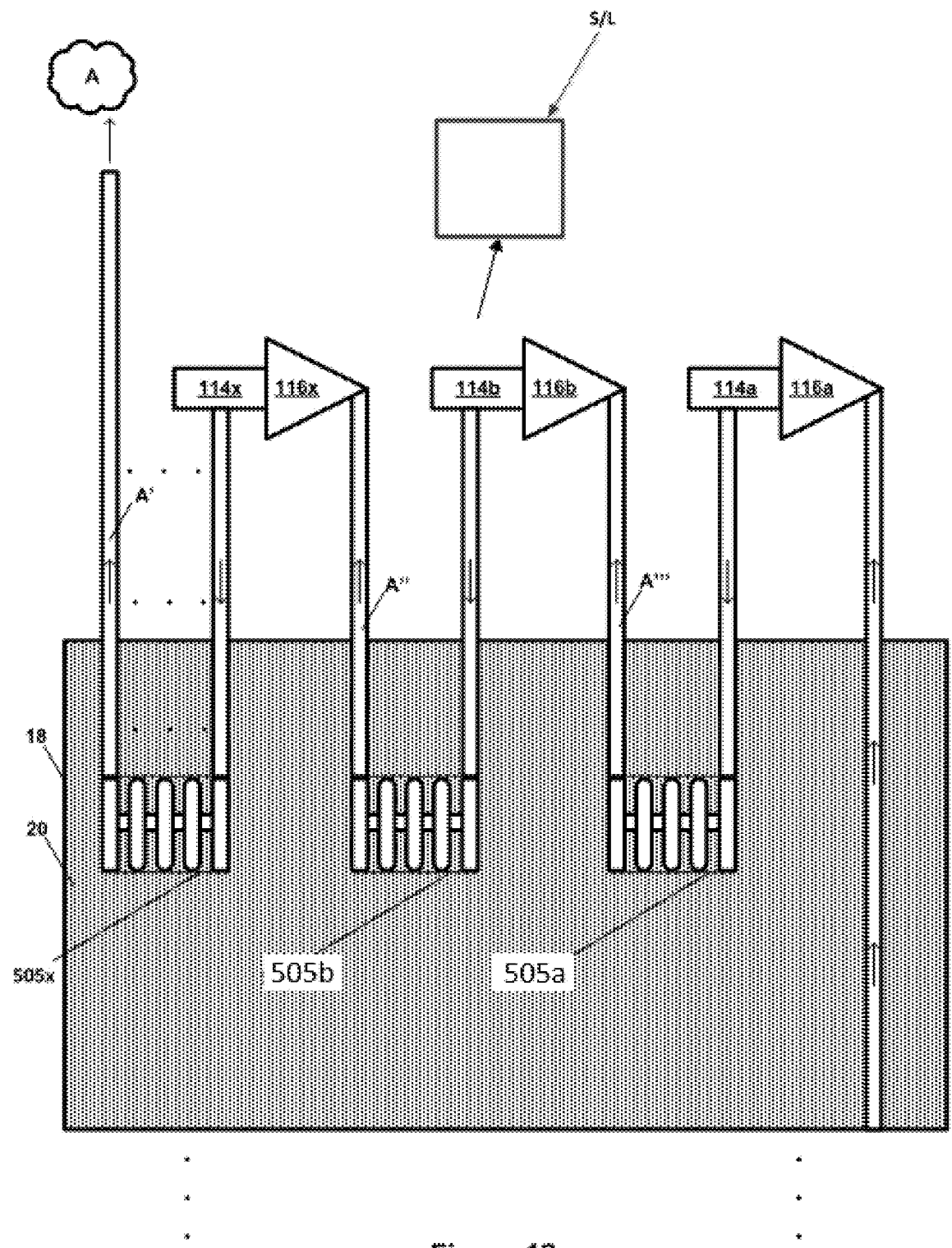
FIG. 12 is a schematic view of components of an alternative compressor/expander subsystem for a compressed gas energy storage system, with multiple expansion stages each associated with a respective heat exchanger.

FIG. 12 is a schematic view of components of an alternative compressor/expander subsystem for a compressed gas energy storage system, with multiple expansion stages each associated with a respective heat exchanger. In particular, during an expansion (e.g. release) phase, compressed air released from accumulator 12 is conveyed first through a first expander 116a driving generator 114a and then through a first heat exchanger 505a to exchange heat with water 20 in shaft 18, thereby to be conditioned to be air A'''. Following the first stage of expansion, air A''' is then conveyed through a second expander 116b driving generator 114b and then through a second heat exchanger 505b to exchange heat with water 20 in shaft 18, thereby to be condition to be air A''. Following the second stage of expansion, air A'' is then conveyed through any additional expansion stages including respective heat exchangers. A last heat exchanger is represented in this example as heat exchanger 505x which enables air A'' to exchange heat with water 20 in shaft 18 after an "xth" stage of expansion, namely passing through expander 116x driving generator 114x, thereby to be conditioned to be air A' which is then conveyed out of the system into the ambient A. It should be noted that, while three stages of compression with respective heat exchangers are shown in FIG. 12, it will be understood that a compressed gas energy storage system according to this embodiment of the invention may have only two, or more than three stages of expansion with respective heat exchangers.

Figure 13:
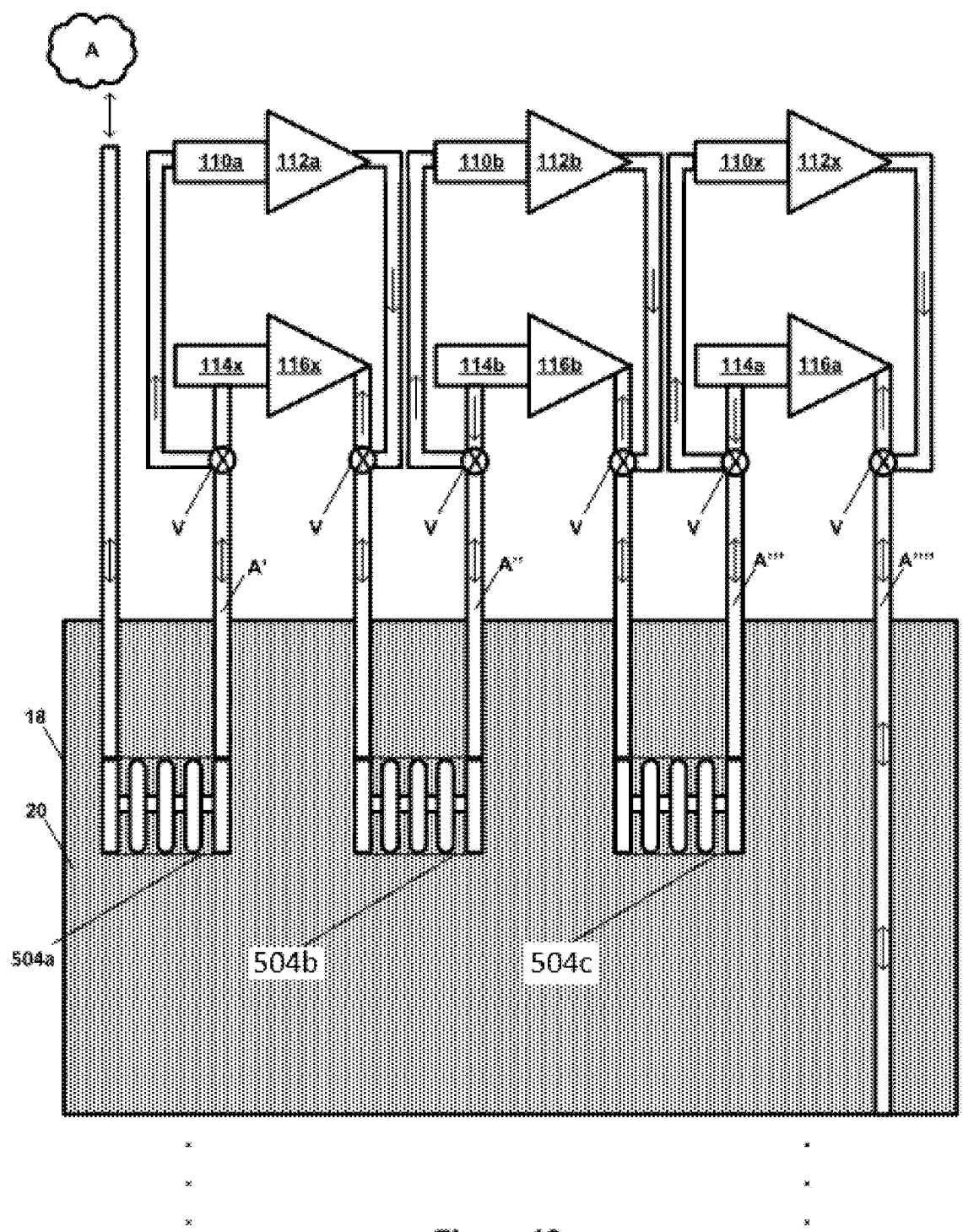
FIG. 13 is a schematic view of components of an alternative compressor/expander subsystem for a compressed gas energy storage system, with pairs of compression and expansion stages each associated with a respective heat exchanger.

FIG. 13 is a schematic view of components of an alternative compressor/expander subsystem for a compressed gas energy storage system, with pairs of compression and expansion stages each associated with a respective heat exchanger. In this embodiment, a common heat exchanger 504a, 504b, 504c, is used during both the compression and expansion stages for each compression/expansion stage, respectively, for example by routing air being conveyed into accumulator through the heat exchanger and routing air being conveyed out of accumulator through the heat exchanger. In a sense, therefore, pairs of compression and expansion stages share a heat exchanger and airflow is controlled using valves V, as shown in the Figure.

Figure 14:
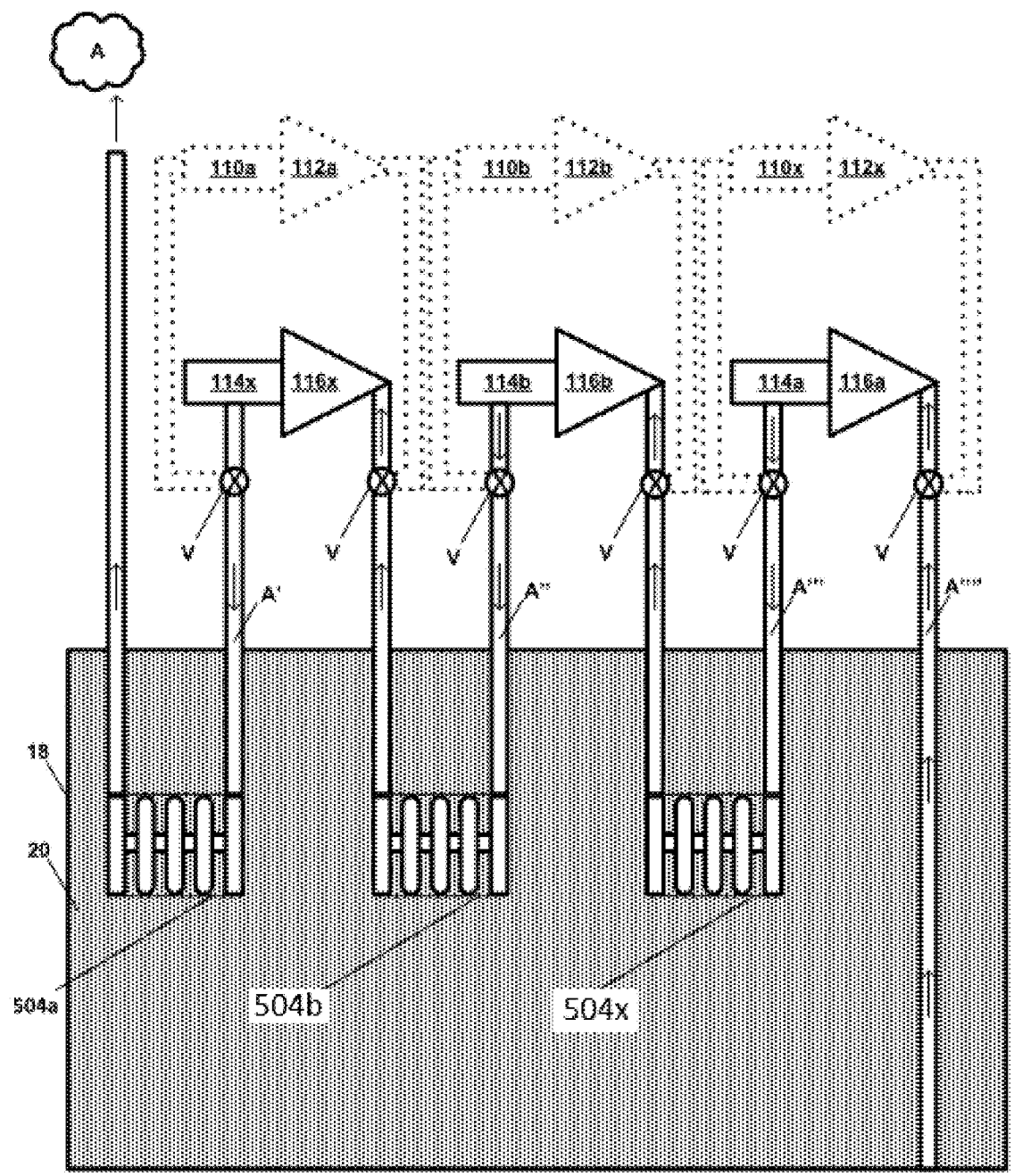
FIG. 14 is a schematic view of components of the alternative compressor/expander subsystem of FIG. 13, showing airflow during an expansion (release) phase from storage through multiple expanders and heat exchangers.

FIG. 14 is a schematic view of components of the alternative compressor/expander subsystem of FIG. 13, showing airflow during an expansion (release) phase from storage through multiple expanders and heat exchangers. In this phase, through control of valves V, airflow is directed through multiple expansion stages in a manner similar to that shown in FIG. 12. The dashed lines show multiple compression stages the airflow to which is prevented during an expansion phase by the control of valves V.

Figure 15:
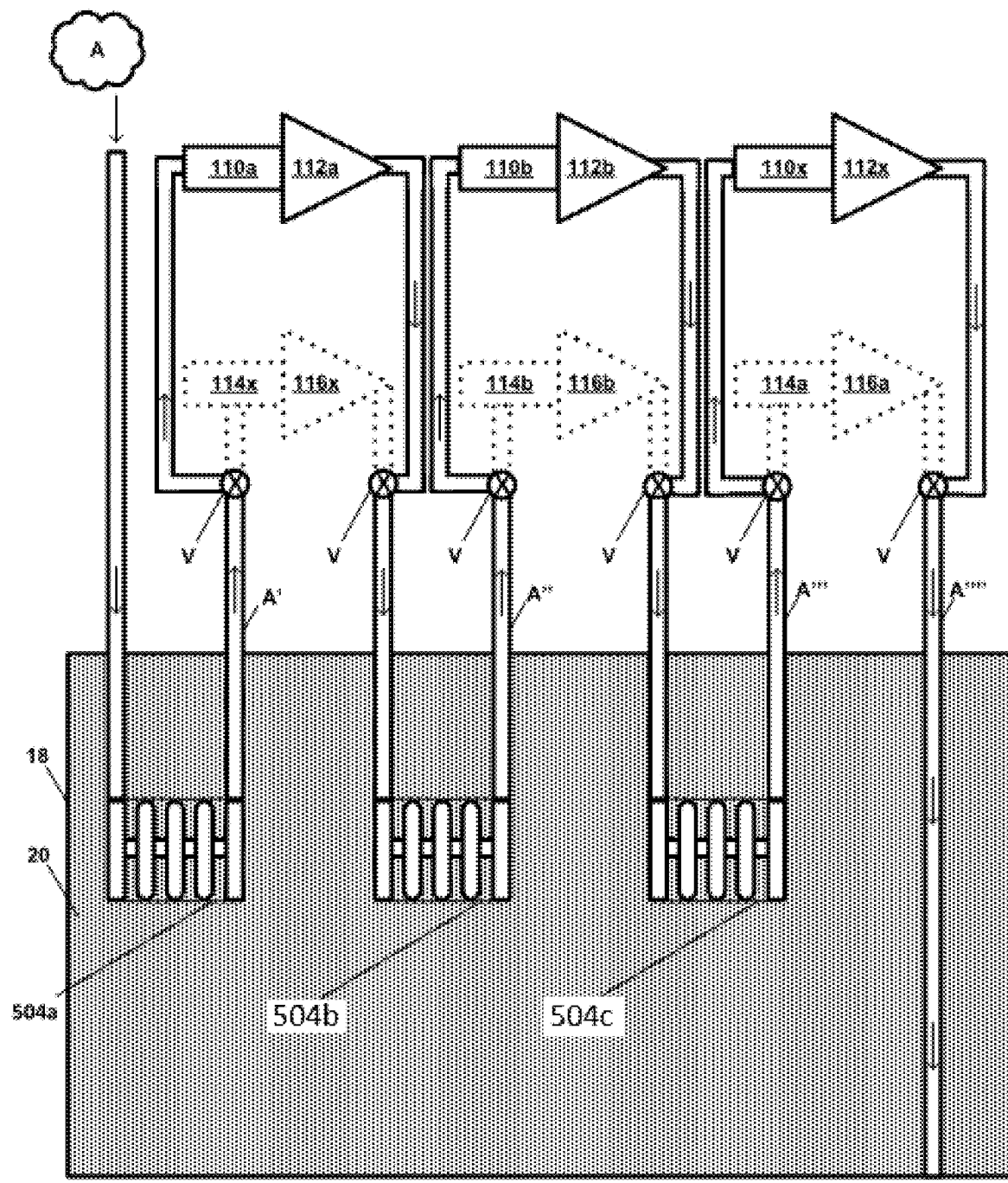
FIG. 15 is a schematic view of components of the alternative compressor/expander subsystem of FIG. 13, showing airflow during a compression (storage) from the ambient through multiple compressors and heat exchangers.

FIG. 15 is a schematic view of components of the alternative compressor/expander subsystem of FIG. 13, showing airflow during a compression (storage) from the ambient through multiple compressors and heat exchangers. In this phase, through control of valves V, airflow is directed through multiple compression stages in a manner similar to that shown in FIGS. 11A and 11B. The dashed lines show multiple expansion stages the airflow to which is prevented during the compression phase by the control of valves V.

The various configurations for exchanging more or less heat described above may be used in various combinations with each other or with other configurations for achieving a desired heat transfer.

Furthermore, alternatives are possible in which the air being conveyed from the ambient A to the compressor/expander subsystem 100 may be routed from time to time, perhaps in view of weather changes or the needs of the operation, so as to bypass any heat exchanger that is immersed in the liquid within the shaft and instead be conveyed more directly from the ambient to the compressor/expander subsystem 100.

In embodiments disclosed herein, the compressed gas energy storage system is operated as an isobaric or near-isobaric whereby a differential between the pressure being exerted by the quantity of liquid within the shaft downwards on the bulkhead and the pressure exerted by the compressed gas within the accumulator upwards on the bulkhead is maintained below a threshold level by conveying compressed gas between the compressor/expander subsystem and the gas layer and by conveying liquid between the shaft and the liquid layer. However, alternatives are possible in which the bulkhead or other dividing structure between the accumulator and the shaft is strong and sufficiently affixed in place such that the pressure differential can be larger.

Multiple Gas Access Points

Optionally, embodiments of the compressed gas energy storage system may be configured to have two or more gas inlet/outlet points. For example, two, three, or more gas supply conduits 22 could be associated with a common accumulator 12, and could be in communication with a common compressed gas layer 14. Preferably, the two or more gas supply conduits can be spaced apart from each other so as to provide access to the compressed gas layer 14, and the energy stored therein, from multiple physical locations on the surface, such as in different areas of an industrial facility, neighbourhood, city, county or the like (depending on the size of the underlying accumulator 12, which may be several kilometers in length in some examples). This may help facilitate connection to one or more power sources and/or power loads that are spaced apart from each other, and may help provide access to the compressed gas layer 14 at a desired location that is proximate where the electrical energy can be provided to, or drawn from, the grid G.

Optionally, one or more of the gas supply conduits 22 may be spaced apart from the water supply/replenishment conduit 58 and/or the water source/sink 150. For example, in some circumstances the location of the water source/sink 150 may be impossible or impractical to change, such as if the source/sink 150 is a naturally occurring lake as shown. To help provide the water used by the system, the water supply/replenishment conduit 58 may be provided at one end of the accumulator 12 that is physically proximate the lake, or is otherwise well suited to facilitate the liquid transfer between the shaft 18 and lake 150 (such as where flow form the source/sink lake 150 into the shaft 18 is driven by gravity). However, it may be desirable to provide at least one gas inlet/outlet point in another portion of the accumulator 12, that is close to a connection to the grid G and is relatively remote from the lake 150. As the water within the accumulator 12, forming layer 16, may tend to flow relatively freely within the interior 23 of the accumulator 12, it may be reasonable in most embodiments to utilize a single shaft 18 and water supply/replenishment conduit 58 to provide substantially all of the water required for the entire accumulator 12. Alternatively, two or more shafts 18, and associated water supply/replenishment conduits 58, may be provided.

Optionally, the components of the compressor/expander subsystem 100 may be positioned together in the same physical location, as shown in some of the embodiments herein. Alternatively, the components of the compressor/expander subsystem 100 may be separated from each other, and provided in different locations. For example, the compressor 112 may be located in one location (such as in a region with relatively clean air that is suitable to draw in for compression) and may be connected to the gas layer 14 by a first gas conduit 22, while the expander 116 may be located in another location (such as in the interior of a city and close to a grid connection) and may be connected to the gas layer 14 by a separate, second gas conduit 22. In some embodiments, multiple compressors 112 and/or expanders 116 may be provided at multiple different locations, and each may be connected to the gas layer 14 via respective gas conduits 22.

Figure 25:
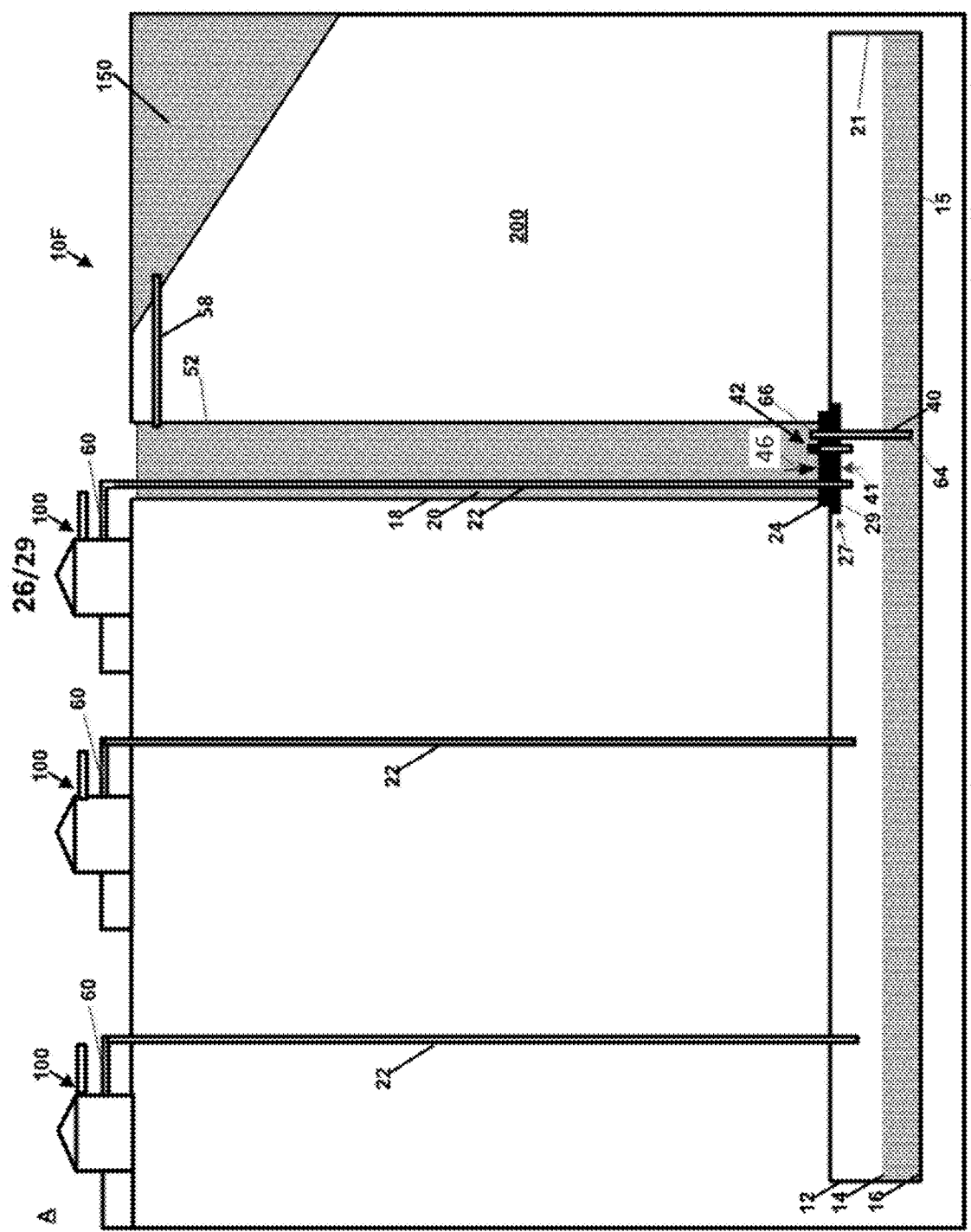
FIG. 25 is a schematic view of components of another example of a compressed gas energy storage system.

For example, FIG. 25 is a schematic representation of another embodiment of a compressed gas energy storage system 10F, that is analogous to the other compressed gas energy storage systems described herein, and which includes three, spaced apart gas supply conduits 22 that are in communication with a common accumulator 12. In this example, one of the gas supply conduits 22 (on the right as illustrated) is provided within the shaft 18 and close to the water supply/replenishment conduit 58, whereas the other two gas supply conduits 22 are spaced apart from each other and are do not pass through the shaft 18.

Figure 26:
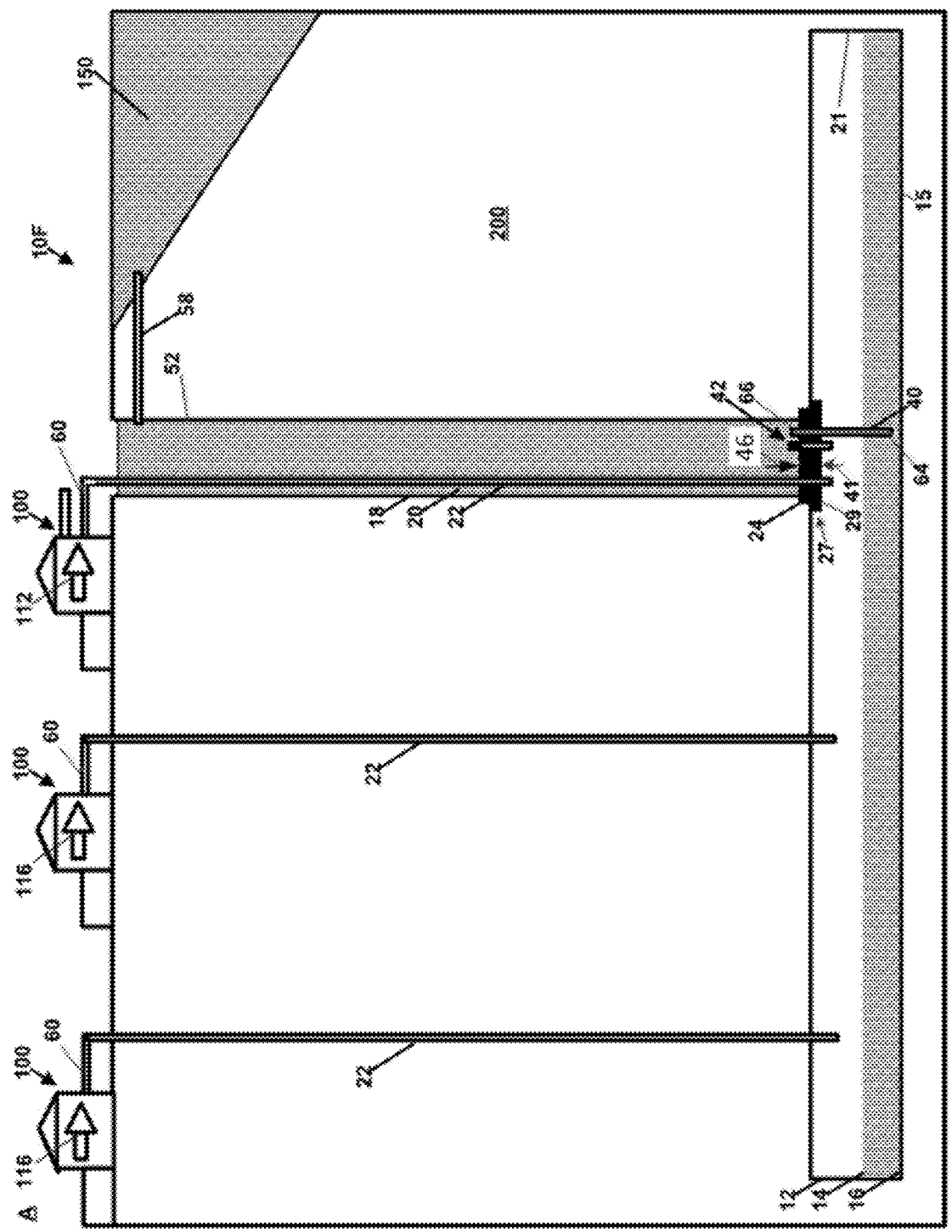
FIG. 26 is a schematic representation of another embodiment of a compressed gas energy storage system.

FIG. 26 is a schematic representation of another embodiment of a compressed gas energy storage system 10G, that is analogous to the other compressed gas energy storage systems described herein, and in which the components of the compressor/expander subsystem 100 are separated and distributed across the surface. In this example, a compressor 112, and associated equipment, is provided proximate to the shaft 18, and compressed gas is forced down the associated gas supply conduit 22 and into the gas layer 14. The other two gas conduits 22 are each connected to a respective expander 116 to extract gas from the gas layer 14. In this example, gas is supplied into the accumulator through one gas conduit 22, and extracted via other conduits 22. In some embodiments, one gas conduit 22 and expander 116 may be provided at each location where it would be desirable to extract energy and/or connect to the grid (such as providing one gas conduit 22 and expander 116 for each building that requires power, etc.), without needing to provide multiple compressors 112 and draw in air from multiple locations. In such examples, the capacity of the compressor 112 (or multiple compressors/stages at a given location) may be greater than the capacity of any one of the multiple expanders 116 provided. Optionally, each compressor 112 and/or expander 116 may be independently operable.

We claim:

1. A compressed gas energy storage system comprising:
   a) an accumulator having a primary opening, an upper wall, a lower wall and an accumulator interior at least partially bounded by the upper wall and lower wall, the accumulator containing a layer of compressed gas atop a layer of liquid;
   b) a gas compressor and expander subsystem having a least a first compression stage that is spaced apart from the accumulator and a first expansion stage,
   c) a first gas supply conduit having an upper end in communication with the first compression stage and a lower end in communication with a first location in the accumulator interior for conveying compressed gas into the compressed gas layer;
   d) a shaft having a lower end adjacent the primary opening, an upper end spaced apart from the lower end, and a shaft sidewall extending upwardly from the lower end to the upper end and at least partially bounding a shaft interior containing a quantity of a liquid, the shaft being fluidly connectable to a liquid source/sink via a liquid supply conduit and wherein at least the first gas supply conduit passes through the shaft interior and is at least partially submerged in the quantity of the liquid; and
   e) a partition positioned at the lower end of the shaft and covering the primary opening and separating the accumulator interior from the shaft interior, the partition having an outer surface in communication with the shaft interior and an opposing inner surface in communication with the accumulator interior;
   wherein at least one of the layer of compressed gas and the layer of liquid bears against and exerts an accumulator force on the inner surface of the partition and the quantity of liquid within the shaft bears against and exerts a counter force on the outer surface of the partition, whereby a net force acting on the partition while the compressed gas energy storage system is in use is a difference between the accumulator force and the counter force and is less than the accumulator force.

2. The compressed gas energy storage system of claim 1, further comprising a second gas conduit that is spaced apart from the first gas conduit, the second gas conduit having a lower end in communication with a second location in the accumulator interior and an upper end that is spaced apart from the upper end of the first gas conduit and is in fluid communication with the first expansion stage.

3. The compressed gas energy storage system of claim 2, further comprising a third gas conduit that is spaced apart from the first gas conduit and the second gas conduit, the third gas conduit having a lower end in communication with a third location in the accumulator interior and an upper end that is spaced apart from the upper end of the first gas conduit and the upper end of the second gas conduit and is in fluid communication with a second expander that is spaced apart from the first expansion stage.

4. The compressed energy storage system of claim 1, wherein only the first gas conduit extends through the shaft interior and is submerged in the quantity of liquid contained in the shaft, and the second gas conduit and third gas conduit are external to the shaft.

5. The compressed gas energy storage system of claim 1, further comprising a liquid conduit providing fluid communication between the liquid in the shaft interior and the layer of liquid in the accumulator, whereby liquid can flow between the shaft interior and the layer of liquid in the accumulator in response to changes in the pressure of the layer of compressed gas.

6. The compressed gas energy storage system of claim 5, wherein an upper end of the liquid conduit is proximate the upper wall of the partition.

7. The compressed gas energy storage system of claim 5, wherein the liquid conduit passes through the partition.

8. The compressed gas energy storage system of claim 5, wherein a lower end of the liquid conduit is submerged in the layer of liquid within the accumulator and remains fluidly isolated from the layer of gas within the accumulator when the compressed gas energy storage system is in use.

9. The compressed gas energy storage system of claim 1, wherein when a pressure of the layer of compressed gas is increased by conveying additional gas into the layer of compressed gas a magnitude of the gas force is increased and liquid is conveyed through the liquid conduit from the layer of liquid in the accumulator to the shaft interior, and when the pressure of the layer of compressed gas is decreased by releasing gas from the layer of compressed gas, the magnitude of the gas force is decreased and liquid is conveyed through the liquid conduit from the shaft interior to the layer of liquid in the accumulator.

10. The compressed gas energy storage system of claim 1, wherein at least the first gas supply conduit passes through the partition.

11. The compressed gas energy storage system of claim 1, further comprising a thermal storage subsystem provided in fluid communication downstream from the gas compressor and expander subsystem and upstream of the accumulator, whereby compressed gas exiting the gas compressor and expander subsystem at an exit temperature passes through the thermal storage subsystem whereby thermal energy is extracted from the compressed gas and stored in the thermal storage subsystem and the temperature of the gas exiting the thermal storage subsystem is reduced to a storage temperature that is less than the exit temperature.

12. A compressed gas energy storage system comprising:
a) an accumulator having a primary opening, an upper wall, a lower wall and an accumulator interior at least partially bounded by the upper wall and lower wall, the accumulator containing a layer of compressed gas atop a layer of liquid;
b) a gas compressor and expander subsystem having a least a first compression stage that is spaced apart from the accumulator and a first expansion stage,
c) a first gas supply conduit having an upper end in communication with the first compression stage and a lower end in communication with a first location in the accumulator interior for conveying compressed gas into the compressed gas layer;
d) a shaft having a lower end adjacent the primary opening, an upper end spaced apart from the lower end, and a shaft sidewall extending upwardly from the lower end to the upper end and at least partially bounding a shaft interior containing a quantity of a liquid, the shaft being fluidly connectable to a liquid source/sink via a liquid supply conduit and wherein at least the first gas supply conduit is external to the shaft;
e) a partition positioned at the lower end of the shaft and covering the primary opening and separating the accumulator interior from the shaft interior, the partition having an outer surface in communication with the shaft interior and an opposing inner surface in communication with the accumulator interior;
wherein at least one of the layer of compressed gas and the layer of liquid bears against and exerts an accumulator force on the inner surface of the partition and the quantity of liquid within the shaft bears against and exerts a counter force on the outer surface of the partition, whereby a net force acting on the partition while the compressed gas energy storage system is in use is a difference between the accumulator force and the counter force and is less than the accumulator force.

13. The compressed gas energy storage system of claim 12, further comprising a liquid conduit providing fluid communication between the liquid in the shaft interior and the layer of liquid in the accumulator, whereby liquid can flow between the shaft interior and the layer of liquid in the accumulator in response to changes in pressure of the layer of compressed gas.

14. The compressed gas energy storage system of claim 13, wherein an upper end of the liquid supply conduit is proximate the outer surface of the partition.

15. The compressed gas energy storage system of claim 13, wherein the liquid supply conduit passes through the partition.

16. The compressed gas energy storage system of claim 13, wherein a lower end of the liquid supply conduit is submerged in the layer of liquid within the accumulator and remains fluidly isolated from the layer of gas within the accumulator when the compressed gas energy storage system is in use.

17. The compressed gas energy storage system of claim 12, wherein when a pressure of the layer of compressed gas is increased by conveying additional gas into the layer of compressed gas a magnitude of the gas force is increased and liquid is conveyed through the liquid supply conduit from the layer of liquid in the accumulator to the shaft interior, and when the pressure of the layer of compressed gas is decreased by releasing gas from the layer of compressed gas the magnitude of the gas force is decreased and liquid is conveyed through the liquid supply conduit from the shaft interior to the layer of liquid in the accumulator.

18. The compressed gas energy storage system of claim 12, further comprising a thermal storage subsystem provided in fluid communication downstream from the gas compressor and expander subsystem and upstream of the accumulator, whereby compressed gas exiting the gas compressor and expander subsystem at an exit temperature passes through the thermal storage subsystem whereby thermal energy is extracted from the compressed gas and stored in the thermal storage subsystem and a temperature of the gas exiting the thermal storage subsystem is reduced to a storage temperature that is less than the exit temperature.

19. The compressed gas energy storage system of claim 12, further comprising a second gas conduit that is spaced apart from the first supply gas conduit, the second gas conduit having a lower end in communication with a second location in the accumulator interior and an upper end that is spaced apart from the upper end of the first supply gas conduit and is in fluid communication with the first expansion stage.

20. The compressed gas energy storage system of claim 19, further comprising a third gas conduit that is spaced apart from the first supply gas conduit and the second gas conduit, the third gas conduit having a lower end in communication with a third location in the accumulator interior and an upper end that is spaced apart from the upper end of the first supply gas conduit and the upper end of the second gas conduit and is in fluid communication with a second expander that is spaced apart from the first expansion stage.

\* \* \* \* \*